US012660748B2

(12) United States Patent
Cao et al.

(10) Patent No.: US 12,660,748 B2
(45) Date of Patent: Jun. 23, 2026

(54) GARDEN TOOL

(71) Applicant: Greenworks (Jiangsu) Co., Ltd.,
Changzhou (CN)

(72) Inventors: Jin Cao, Changzhou (CN); **Wanghao
Li, Changzhou (CN); Jie Gao,**
Changzhou (CN); Zhigao Pu,
Changzhou (CN)

(73) Assignee: Greenworks (Jiangsu) Co., Ltd.,
Changzhou (CN)

( * ) Notice: Subject to any disclaimer, the term of this
patent is extended or adjusted under 35
U.S.C. 154(b) by 519 days.

(21) Appl. No.: 18/297,646

(22) Filed: Apr. 10, 2023

(65) Prior Publication Data
US 2023/0240181 A1 Aug. 3, 2023

Related U.S. Application Data

(63) Continuation of application No.
PCT/CN2021/123571, filed on Oct. 13, 2021.

(30) Foreign Application Priority Data

| | | |
|---|---|---|
| Oct. 16, 2020 | (CN) | 202011107410.8 |
| Oct. 16, 2020 | (CN) | 202011107427.3 |
| Oct. 16, 2020 | (CN) | 202011107969.0 |
| Oct. 16, 2020 | (CN) | 202011107988.3 |
| Oct. 16, 2020 | (CN) | 202011108323.4 |
| Oct. 16, 2020 | (CN) | 202022304344.5 |

(Continued)

(51) Int. Cl.
*A01D 34/54* (2006.01)
*A01D 34/00* (2006.01)
(Continued)

(52) U.S. Cl.
CPC ........... *A01D 34/54* (2013.01); *A01D 34/008*
(2013.01); *A01D 34/58* (2013.01); *A01D
2101/00* (2013.01)

(58) Field of Classification Search
CPC ...... A01D 34/54; A01D 34/58; A01D 34/008;
A01D 2101/00
See application file for complete search history.

(56) References Cited

U.S. PATENT DOCUMENTS

| | | | | |
|---|---|---|---|---|
| 3,802,170 A | * | 4/1974 | Seifert | A01D 34/63 |
| | | | | 56/11.8 |
| 4,117,652 A | * | 10/1978 | Jones | A01D 34/69 |
| | | | | 192/69.62 |

(Continued)

FOREIGN PATENT DOCUMENTS

| | | | |
|---|---|---|---|
| CN | 103518487 A | * | 1/2014 |
| CN | 203814199 U | * | 9/2014 |

(Continued)

OTHER PUBLICATIONS

English Translation of CN-103518487-A (Year: 2014).*

(Continued)

*Primary Examiner* — Claude J Brown

(57) ABSTRACT

A garden tool includes a cutting assembly, a first driving device and a height adjustment assembly. The first driving assembly includes a prime mover fixedly mounted on a tool body and a transmission mechanism that transmits power output by the prime mover to the cutting assembly. The transmission mechanism is used to transmit the power output by the prime mover to the cutting assembly to drive the cutting assembly to work. The height adjustment assembly is used to drive the cutting assembly to move in a direction perpendicular to a working plane, so as to adjust a distance of the cutting assembly from the ground. The garden tool of the disclosure directly adjusts a height of a mower from the ground through the height adjustment assembly without adjusting a position of a heavy motor.

18 Claims, 44 Drawing Sheets

410

<table>
<tr><td>(30)</td><td colspan="3"><b>Foreign Application Priority Data</b></td></tr>
<tr><td>Oct. 16, 2020</td><td>(CN)</td><td>.........................</td><td>202022304352.X</td></tr>
<tr><td>Oct. 16, 2020</td><td>(CN)</td><td>.........................</td><td>202022304717.9</td></tr>
<tr><td>Oct. 16, 2020</td><td>(CN)</td><td>.........................</td><td>202022305746.7</td></tr>
<tr><td>Oct. 16, 2020</td><td>(CN)</td><td>.........................</td><td>202022307819.6</td></tr>
<tr><td>Dec. 7, 2020</td><td>(CN)</td><td>.........................</td><td>202011415056.5</td></tr>
<tr><td>Dec. 7, 2020</td><td>(CN)</td><td>.........................</td><td>202011415601.0</td></tr>
<tr><td>Dec. 7, 2020</td><td>(CN)</td><td>.........................</td><td>202022898255.8</td></tr>
<tr><td>Dec. 7, 2020</td><td>(CN)</td><td>.........................</td><td>202022900585.6</td></tr>
<tr><td>Dec. 24, 2020</td><td>(CN)</td><td>.........................</td><td>202011544801.6</td></tr>
<tr><td>Dec. 24, 2020</td><td>(CN)</td><td>.........................</td><td>202011544813.9</td></tr>
<tr><td>Dec. 24, 2020</td><td>(CN)</td><td>.........................</td><td>202011546626.4</td></tr>
<tr><td>Dec. 24, 2020</td><td>(CN)</td><td>.........................</td><td>202011557551.X</td></tr>
<tr><td>Dec. 24, 2020</td><td>(CN)</td><td>.........................</td><td>202023149711.5</td></tr>
</table>

(51) Int. Cl.
    *A01D 34/58*       (2006.01)
    *A01D 101/00*     (2006.01)

(56)         References Cited

U.S. PATENT DOCUMENTS 5,289,177 A * 2/1994 Wake ...................... B60R 25/04
                                340/5.67
2009/0183482 A1 * 7/2009 Cheung ................ A01D 34/824
                                56/17.1

2010/0192650 A1 * 8/2010 Fowler .................. E05B 63/006
                                70/357
2017/0181375 A1 * 6/2017 Hashimoto ............ A01D 34/74
2020/0170186 A1 * 6/2020 Curtis ..................... F16H 25/20
2020/0375091 A1 * 12/2020 Kuriyagawa .......... A01D 34/54

FOREIGN PATENT DOCUMENTS

| CN | 204191164 U | | 3/2015 | |
| CN | 206619621 U | * | 11/2017 | |
| CN | 207652994 U | * | 7/2018 | |
| CN | 209628110 U | | 11/2019 | |
| CN | 210470343 U | | 5/2020 | |
| EP | 3549428 A1 | * | 10/2019 | .......... A01D 34/008 |
| WO | WO-2019157841 A1 | * | 8/2019 | .......... A01D 34/412 |

OTHER PUBLICATIONS

English Translation of CN-207652994-U (Year: 2018).*
English Translation of CN-203814199-U (Year: 2014).*
English Translation of WO-2019157841-A1 (Year: 2019).*
English Translation of CN-206619621-U (Year: 2017).*

* cited by examiner sensing device working state     non-working state charging
control
terminal
power off the control center
control sensor to be in
a connection state whether the
mower is in
charging do not alarm do not alarm trigger the
sensing device do not trigger the
sensing device do not alarm alarm

410

410

420

420

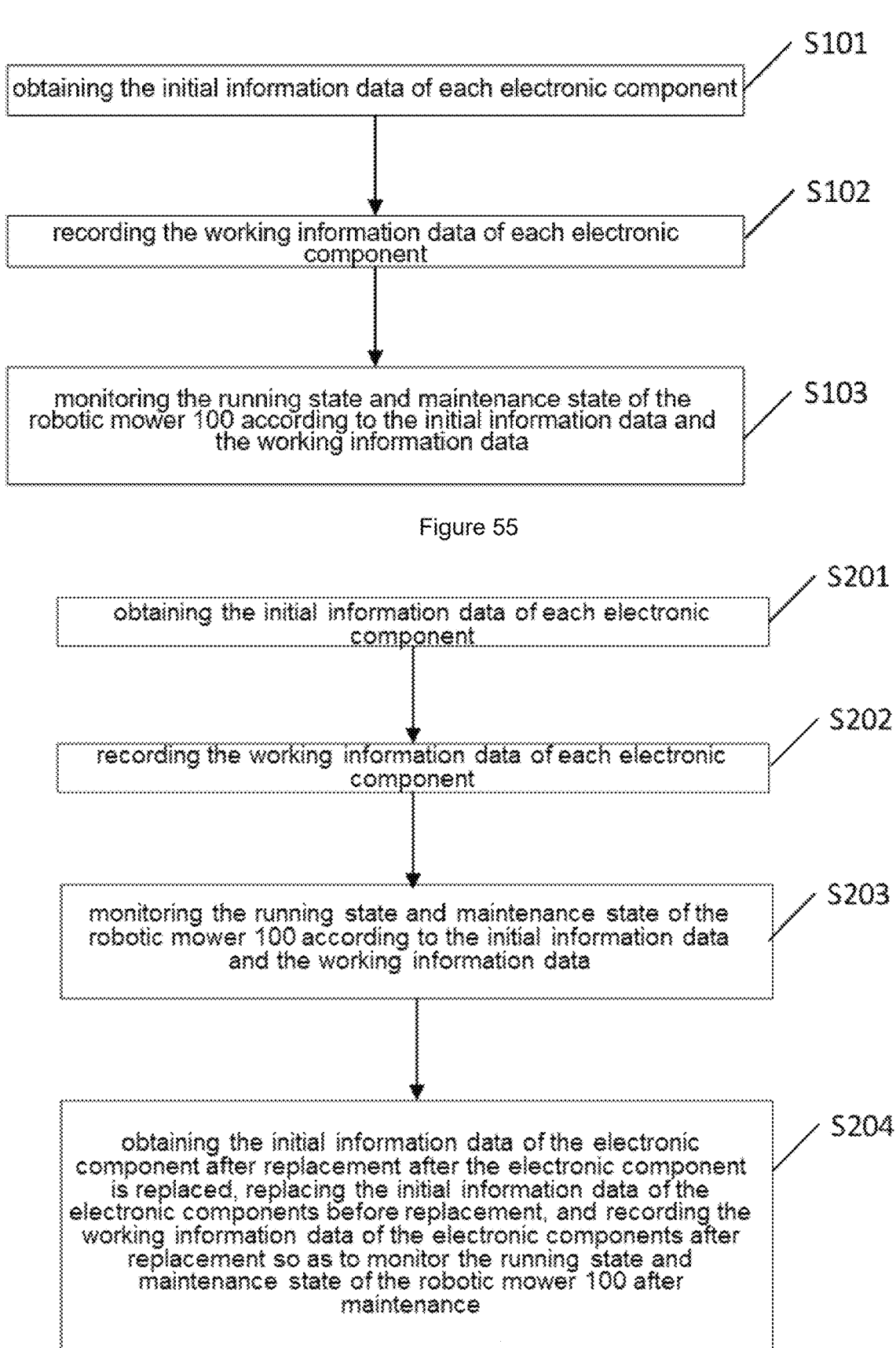

obtaining the initial information data of each electronic component ⟋ S101 recording the working information data of each electronic component ⟋ S102 monitoring the running state and maintenance state of the robotic mower 100 according to the initial information data and the working information data ⟋ S103

Figure 55 obtaining the initial information data of each electronic component ⟋ S201 recording the working information data of each electronic component ⟋ S202 monitoring the running state and maintenance state of the robotic mower 100 according to the initial information data and the working information data ⟋ S203 obtaining the initial information data of the electronic component after replacement after the electronic component is replaced, replacing the initial information data of the electronic components before replacement, and recording the working information data of the electronic components after replacement so as to monitor the running state and maintenance state of the robotic mower 100 after maintenance ⟋ S204

Figure 56 determining whether the machine is powered on

— S111 after turning on the machine and waiting for a preset time T1, self-checking the functional modules of the machine and obtaining self-check result information

Figures 59, 60:
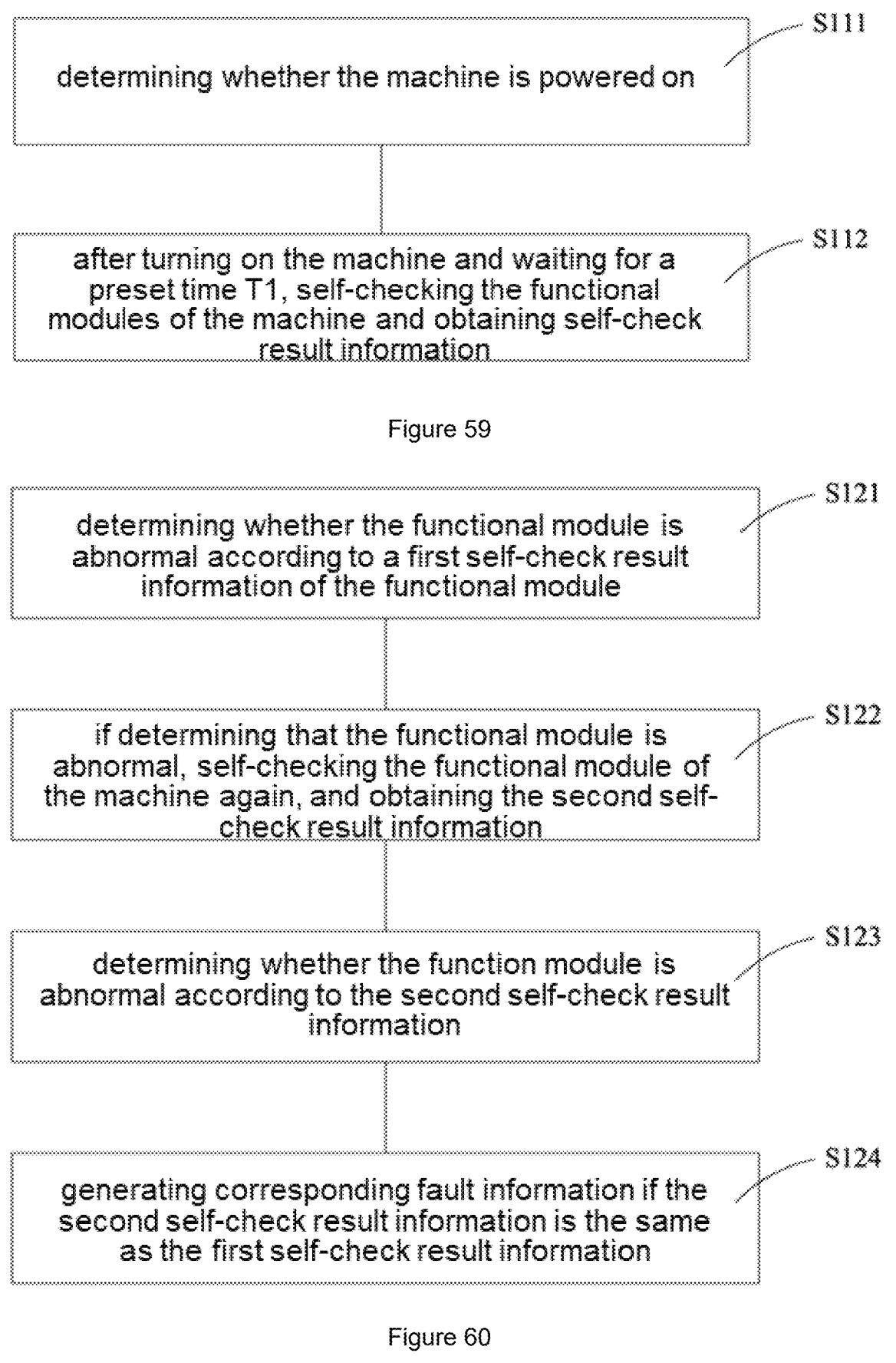

— S112

Figure 59 determining whether the functional module is abnormal according to a first self-check result information of the functional module

— S121 if determining that the functional module is abnormal, self-checking the functional module of the machine again, and obtaining the second self-check result information

— S122 determining whether the function module is abnormal according to the second self-check result information

— S123 generating corresponding fault information if the second self-check result information is the same as the first self-check result information

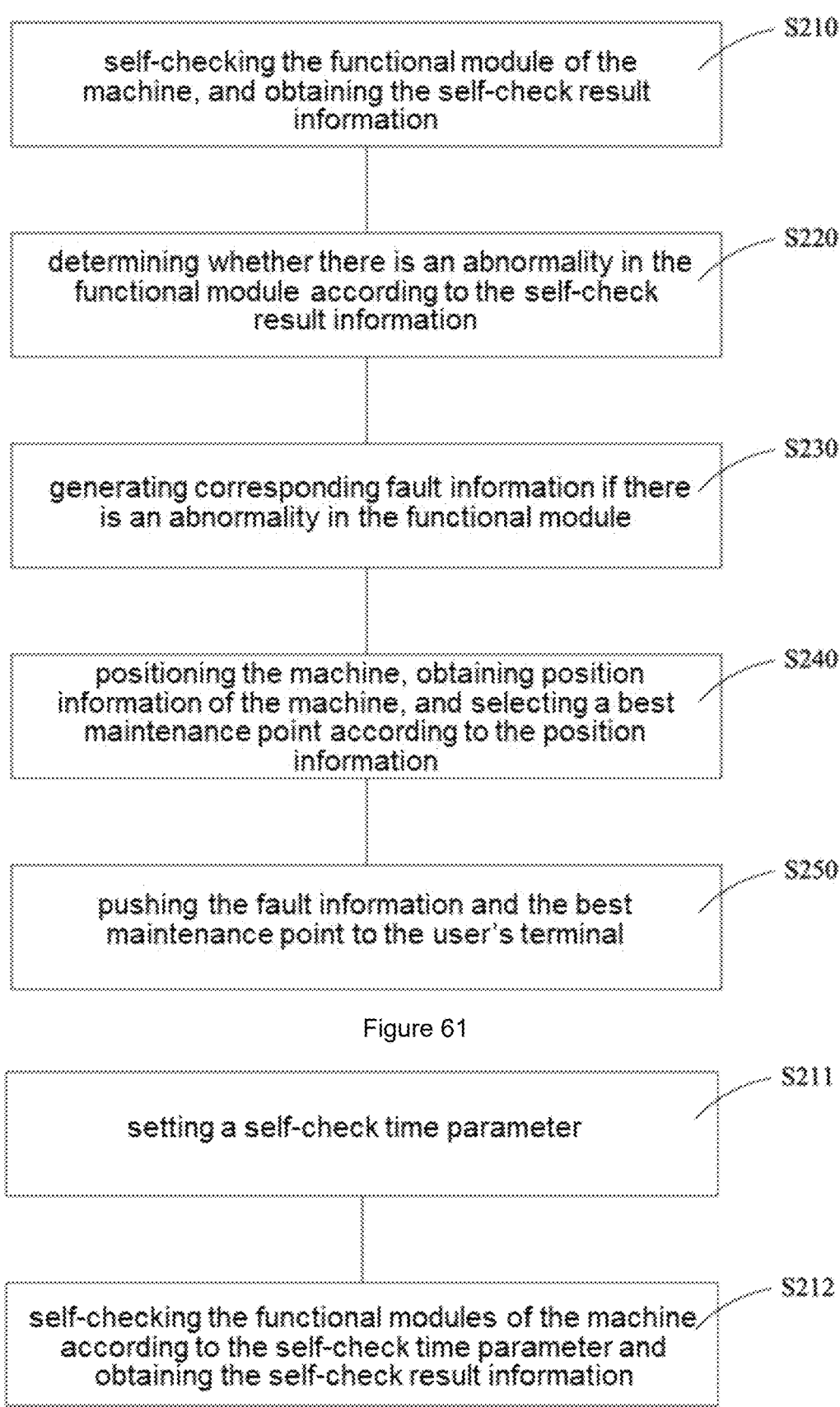

self-checking the functional module of the
machine, and obtaining the self-check result
information                                          — S210 determining whether there is an abnormality in the
functional module according to the self-check
result information                                    — S220 generating corresponding fault information if there
is an abnormality in the functional module           — S230 positioning the machine, obtaining position
information of the machine, and selecting a best
maintenance point according to the position
information                                           — S240 pushing the fault information and the best
maintenance point to the user's terminal             — S250

Figure 61 setting a self-check time parameter                  — S211 self-checking the functional modules of the machine
according to the self-check time parameter and
obtaining the self-check result information           — S212

Figure 62

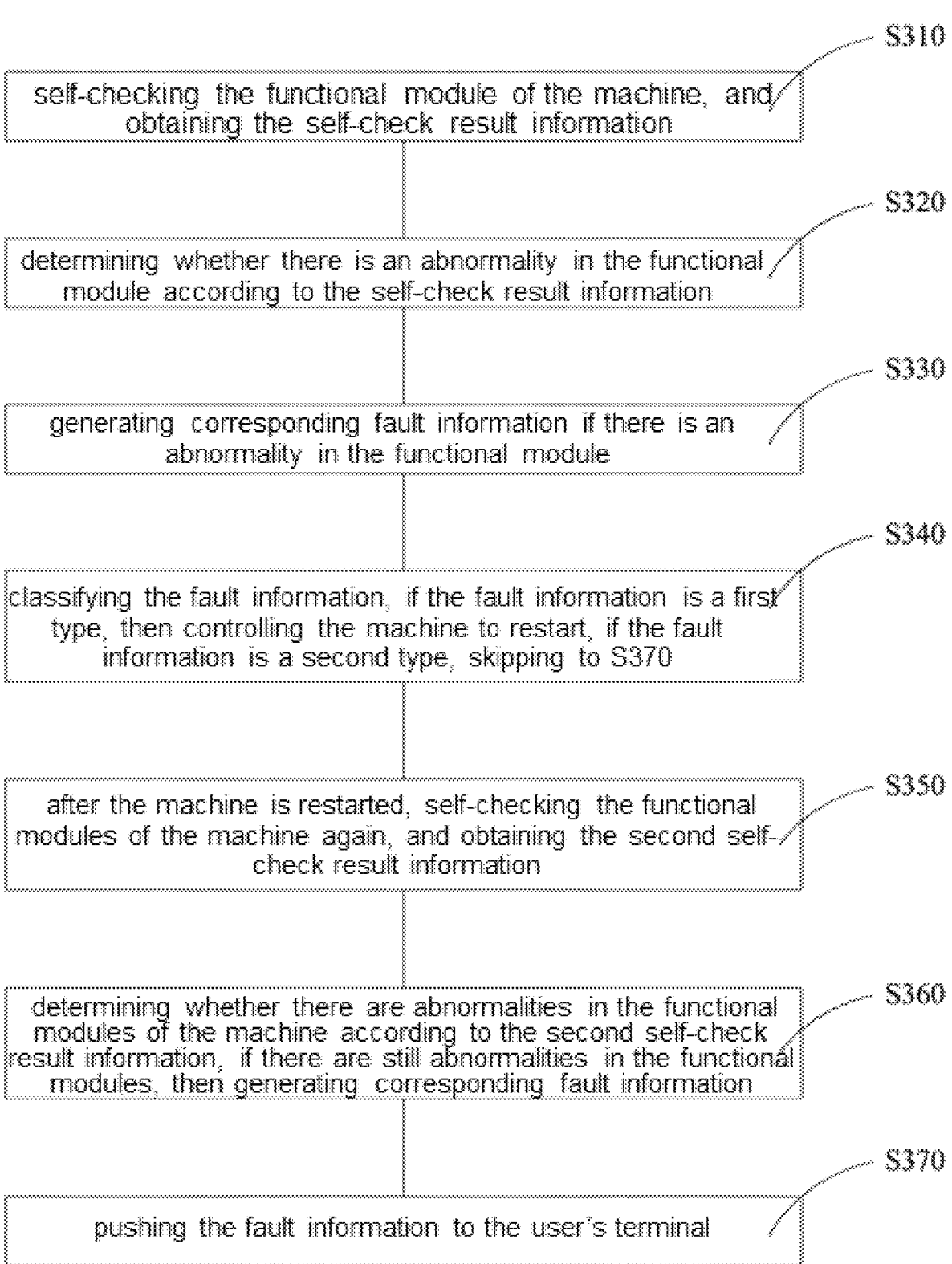

self-checking the functional module of the machine, and obtaining the self-check result information    S310 determining whether there is an abnormality in the functional module according to the self-check result information    S320 generating corresponding fault information if there is an abnormality in the functional module    S330 classifying the fault information, if the fault information is a first type, then controlling the machine to restart, if the fault information is a second type, skipping to S370    S340 after the machine is restarted, self-checking the functional modules of the machine again, and obtaining the second self-check result information    S350 determining whether there are abnormalities in the functional modules of the machine according to the second self-check result information, if there are still abnormalities in the functional modules, then generating corresponding fault information    S360 pushing the fault information to the user's terminal    S370

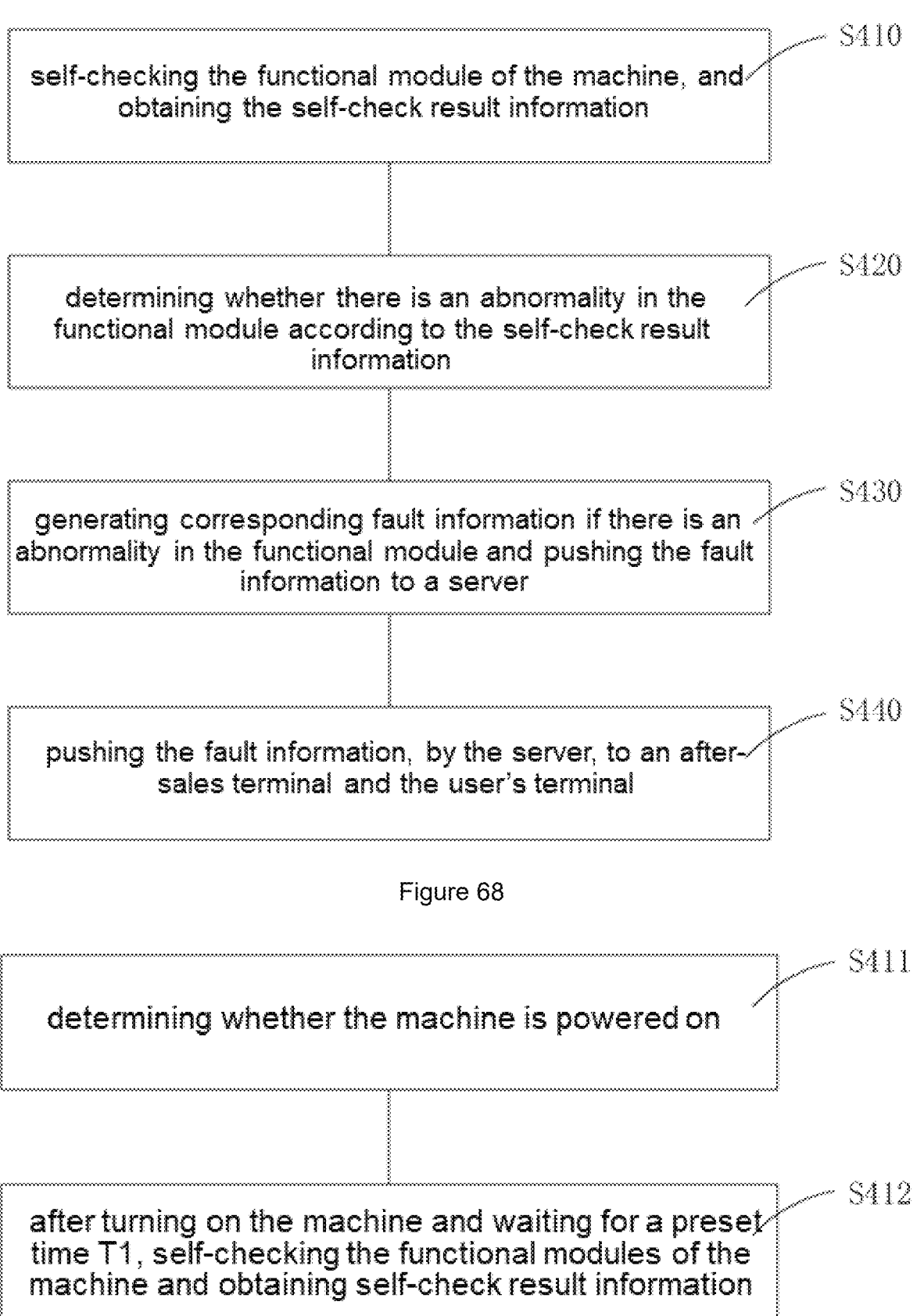

S410 self-checking the functional module of the machine, and obtaining the self-check result information

S420 determining whether there is an abnormality in the functional module according to the self-check result information

S430 generating corresponding fault information if there is an abnormality in the functional module and pushing the fault information to a server

S440 pushing the fault information, by the server, to an after-sales terminal and the user's terminal

Figure 68

S411 determining whether the machine is powered on

S412 after turning on the machine and waiting for a preset time T1, self-checking the functional modules of the machine and obtaining self-check result information

Figure 69

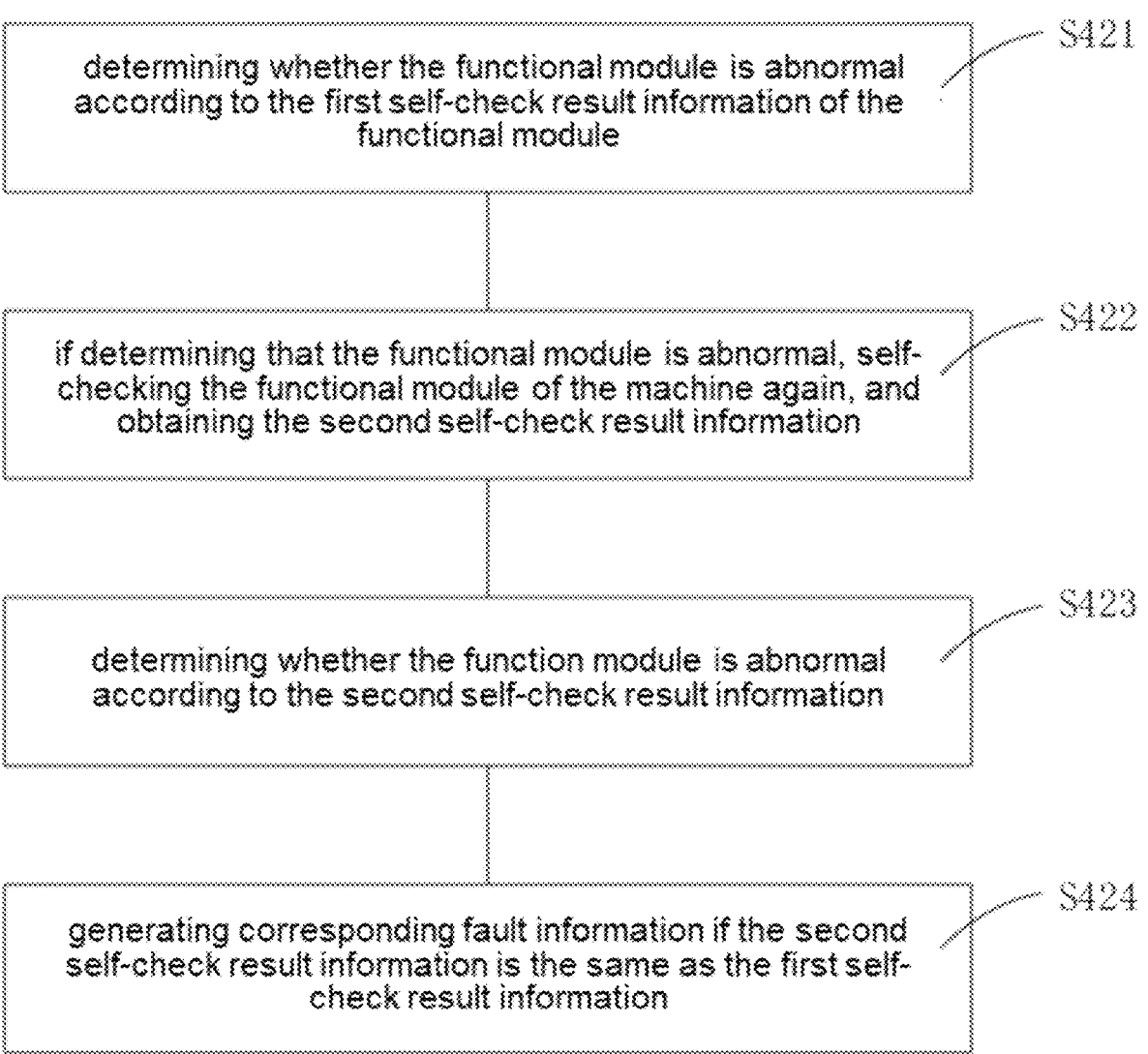

determining whether the functional module is abnormal
according to the first self-check result information of the
functional module
S421 if determining that the functional module is abnormal, self-
checking the functional module of the machine again, and
obtaining the second self-check result information
S422 determining whether the function module is abnormal
according to the second self-check result information
S423 generating corresponding fault information if the second
self-check result information is the same as the first self-
check result information
S424

Figure 70

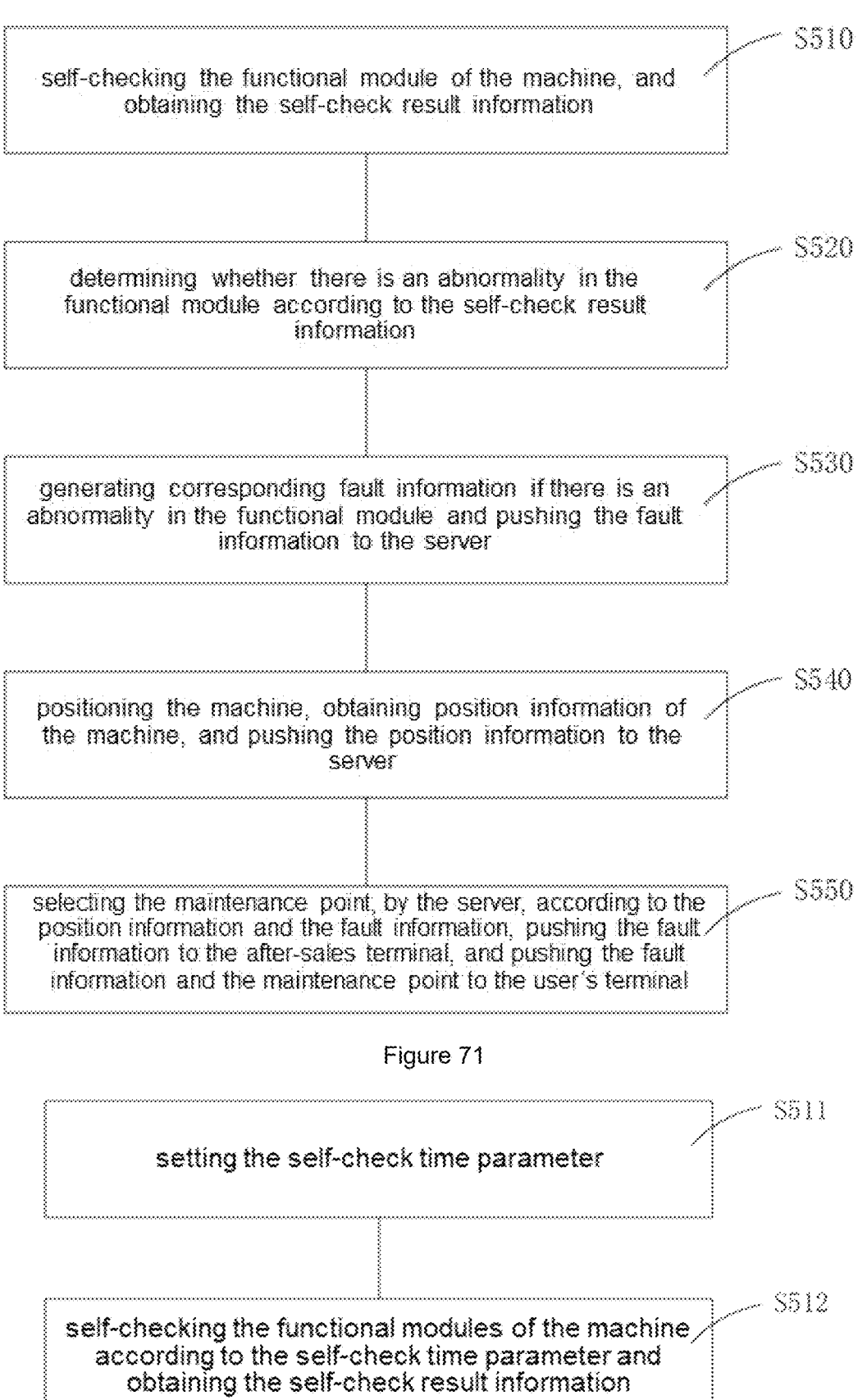

self-checking the functional module of the machine, and obtaining the self-check result information — S510 determining whether there is an abnormality in the functional module according to the self-check result information — S520 generating corresponding fault information if there is an abnormality in the functional module and pushing the fault information to the server — S530 positioning the machine, obtaining position information of the machine, and pushing the position information to the server — S540 selecting the maintenance point, by the server, according to the position information and the fault information, pushing the fault information to the after-sales terminal, and pushing the fault information and the maintenance point to the user's terminal — S550

Figure 71 setting the self-check time parameter — S511 self-checking the functional modules of the machine according to the self-check time parameter and obtaining the self-check result information — S512

Figure 72

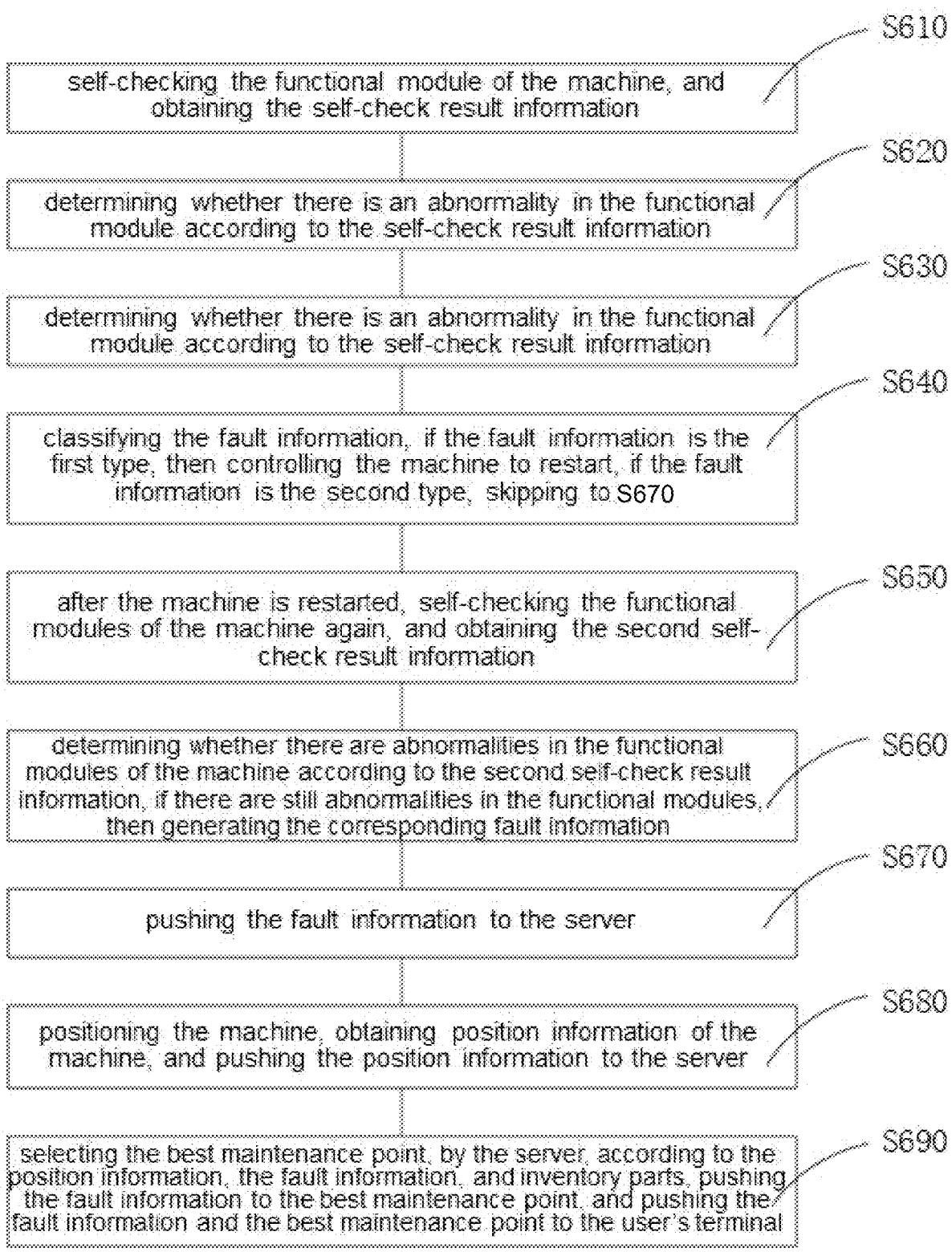

S610 self-checking the functional module of the machine, and obtaining the self-check result information

S620 determining whether there is an abnormality in the functional module according to the self-check result information

S630 determining whether there is an abnormality in the functional module according to the self-check result information

S640 classifying the fault information, if the fault information is the first type, then controlling the machine to restart, if the fault information is the second type, skipping to S670

S650 after the machine is restarted, self-checking the functional modules of the machine again, and obtaining the second self-check result information

S660 determining whether there are abnormalities in the functional modules of the machine according to the second self-check result information, if there are still abnormalities in the functional modules, then generating the corresponding fault information

S670 pushing the fault information to the server

S680 positioning the machine, obtaining position information of the machine, and pushing the position information to the server

S690 selecting the best maintenance point, by the server, according to the position information, the fault information, and inventory parts, pushing the fault information to the best maintenance point, and pushing the fault information and the best maintenance point to the user's terminal

Figure 74

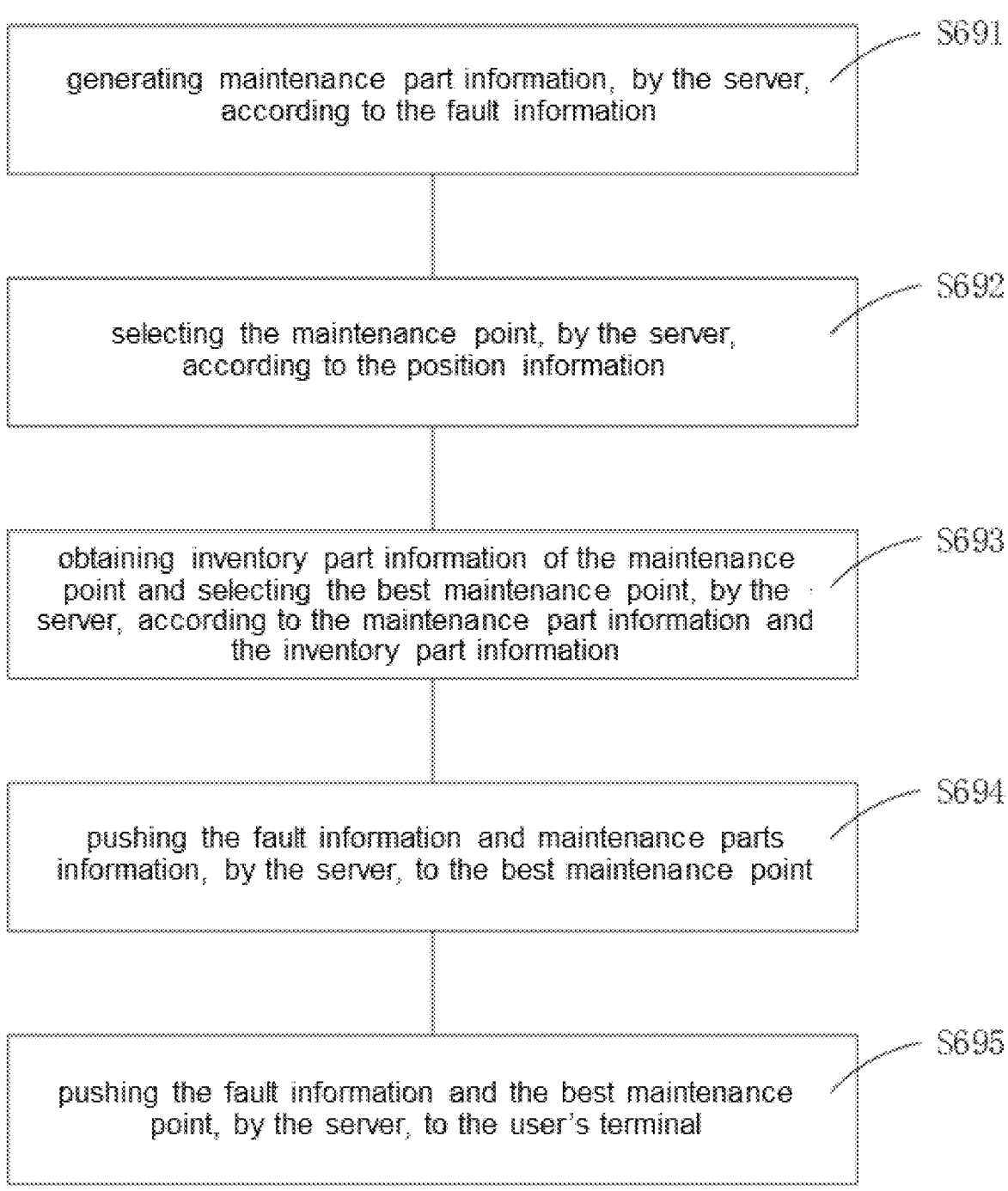

generating maintenance part information, by the server, according to the fault information — S691 selecting the maintenance point, by the server, according to the position information — S692 obtaining inventory part information of the maintenance point and selecting the best maintenance point, by the server, according to the maintenance part information and the inventory part information — S693 pushing the fault information and maintenance parts information, by the server, to the best maintenance point — S694 pushing the fault information and the best maintenance point, by the server, to the user's terminal — S695

Figure 75

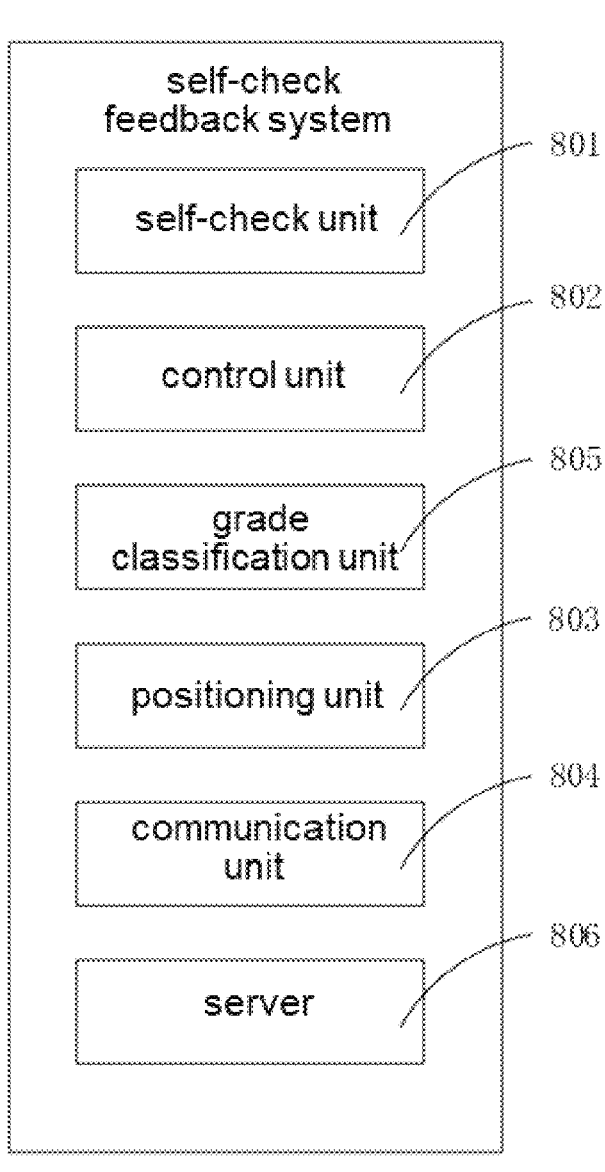
Figure 77

GARDEN TOOL

TECHNICAL FIELD

The disclosure relates to a garden tool, specifically relates to a self-propelled garden tool.

BACKGROUND

Robotic mowers are robotic garden tool for care the lawn, and they use lithium batteries as power source. As robotic mowers become more and more common in the market, so too is the competition. If more market share is wanted to be gained, there must be more advantages in terms of cost, design, and performance. As robotic mowers become more and more mature and widely used, all companies are facing problems such as high manufacturing costs, difficult technological innovation, and traditional design methods in robotic mowers.

The conventional mower usually drives the motor and the cutting blade to move together when adjusting the height, so that the mower needs to reserve a large space for the motor and the cutting blade to move. In this way, the overall volume of the mower is relatively large, thereby increasing the manufacturing, packaging and transportation costs of the mower.

SUMMARY

The disclosure provides a garden tool, the garden tool includes:

a tool body, a cutting assembly, being capable of moving along a direction perpendicular to a working plane, a first driving device, including a prime mover and a transmission mechanism, the prime mover being fixedly mounted on the tool body, and the transmission mechanism transmitting the power output by the prime mover to the cutting assembly;

a height adjustment assembly, when the height adjustment assembly driving the cutting assembly to move in the direction perpendicular to the working plane, a relative position between the cutting assembly and the prime mover being variable.

In an embodiment of the disclosure, the transmission mechanism includes a transmission rod and a transmission shaft, the transmission rod is matched with the prime mover, the transmission shaft is mounted on the transmission rod and may rotate under a drive of the transmission rod, the transmission shaft may slide along the transmission rod in an axial direction of the transmission shaft, and the cutting assembly is fixedly mounted on an end of the transmission shaft away from the transmission rod.

In an embodiment of the disclosure, the height adjustment assembly includes a height adjustment rod and a height adjustment knob, the height adjustment rod drives the transmission shaft to slide along the transmission rod, and the height adjustment knob is matched with the height adjustment rod, the height adjustment rod is provided with a first driving tooth, the height adjustment knob is provided with a second driving tooth, and the second driving tooth is matched with the first driving tooth, when the height adjustment knob is in a first state, the first driving tooth and the second driving tooth are engaged with each other, so that the height adjustment knob drives the height adjustment rod to work, when the height adjustment knob is in a second state, the first driving tooth and the second driving tooth are out of contact.

In an embodiment of the disclosure, the height adjustment knob is slidably mounted on the tool body, and may slide along an axial direction of the height adjustment rod; when the height adjustment knob is pushed toward the height adjustment rod, the height adjustment knob slides toward the height adjustment rod and resists against the height adjustment rod, so that the first driving tooth and the second driving tooth are engaged with each other, when the height adjustment knob is pushed in a direction away from the height adjustment rod, the first driving tooth and the second driving tooth are disengaged.

In an embodiment of the disclosure, the prime mover is provided with an output shaft and an output wheel, the output wheel is mounted on the output shaft, the transmission rod is provided with a transmission wheel, and the transmission wheel is matched with the output wheel, and the transmission rod is driven to rotate through a matching of the output wheel and the transmission wheel.

In an embodiment of the disclosure, the transmission mechanism includes a worm gear and a worm, the worm gear is matched with the prime mover, the worm is matched with the worm gear, and the cutting assembly is mounted on an end of the worm away from the worm gear.

In an embodiment of the disclosure, the garden tool further includes a second driving device and a walking device, the second driving device is mounted on the tool body, the second driving device includes a driving shaft and a driving gear arranged on the driving shaft, and the walking device includes a driving wheel mounted on the tool body, and the driving wheel may be driven by power output by the second driving device to drive the garden tool to walk, the driving wheel includes a hub, and an inner side of the hub is provided with internal teeth, wherein, the number of the driving gear is less than that of the internal teeth, and the driving gear is directly engaged with the internal teeth to drive the driving wheel to rotate.

In an embodiment of the disclosure, the driving gear is coaxially arranged on the driving shaft, and an axis of the driving shaft is parallel to an axis of a rotation shaft of the driving wheel and spaced from each other.

In an embodiment of the disclosure, the second driving device includes a pair of driving motors, each of the driving motors is provided with one driving shaft, each of the driving motors is provided with one driving gear, the driving wheel is also provided with a pair and each driving wheel is provided with one internal tooth, so that the driving gears respectively drive the corresponding driving wheels to rotate.

In an embodiment of the disclosure, a bottom of the tool body is provided with a battery pack compartment, and the battery pack system is pluggably housed in the battery pack compartment, the battery pack system comprises a first battery pack and a second battery pack connected in parallel with each other, and both the first battery pack and the second battery pack are battery panel packs.

In an embodiment of the disclosure, the battery pack compartment includes a compartment body and a compartment cover, the compartment body is integrated with the tool body, the compartment cover is configured to cover the compartment body from bottom to top, and the first battery pack and the second battery pack are fixedly housed in an accommodation space formed by the compartment body and the compartment cover.

In an embodiment of the disclosure, a sealing component is further arranged between the compartment body and the compartment cover to seal a gap between the compartment body and the compartment cover.

In an embodiment of the disclosure, the compartment cover is movably connected with the compartment body.

In an embodiment of the disclosure, the garden tool further includes a safety key assembly, the safety key assembly includes:

a housing, being part of the tool body,
a magnetic switch, connected with the housing and connected with the second driving device for control,
a connecting assembly, connected with the housing to position a mounting position of the safety key assembly, and
a key structure, including a twist handle and a plug-in part connected with one end of the twist handle,
wherein an end of the plug-in part far away from the twist handle is provided with a locking member and an unlocking member, the locking member is configured to disassemble or fasten the connecting assembly, along an insertion direction of the plug-in part and the garden tool, the locking member is located at an end of the plug-in part, the unlocking member and the locking member are arranged in a front and rear misalignment, and the plug-in part can be inserted into the housing and trigger the magnetic switch through the unlocking member.

In an embodiment of the disclosure, the connecting assembly includes a connecting base and a locking component, the locking component is threadedly matched with the connecting base, the locking component is provided with a locking structure, and the locking component is provided with a groove or a protrusion corresponding to the locking structure.

In an embodiment of the disclosure, the plug-in part is provided with an accommodation part, the unlocking member is housed in the accommodation part, and an extending direction of the unlocking member is perpendicular to an extending direction of the plug-in part.

In an embodiment of the disclosure, the unlocking member is a magnetic unlocking member, and an N pole and an S pole of the magnetic unlocking member are respectively located on both sides of the extending direction of the unlocking member.

In an embodiment of the disclosure, the twist handle is configured to drive the plug-in part to switch between a starting position and a shut-off position, a blocking plate is arranged between the twist handle and the plug-in part, and the blocking plate can resist against an edge of the housing.

In an embodiment of the disclosure, the garden tool further includes an information traceability system, the information traceability system includes:

a working module, including a plurality of electronic components with initial information data, and
a traceability management unit, connected with the working module with a signal, recording working information data of each electronic component, and obtaining the initial information data of each electronic component,
wherein, the traceability management unit monitors a running status and a maintenance status of the garden tool according to the initial information data and the working information data.

In an embodiment of the disclosure, the garden tool further includes a self-check feedback system, the self-check feedback system includes:

a self-check unit, configured to perform a self-check on a functional module of the garden tool and obtain self-check result information,
a control unit, determining whether the functional module of the garden tool is abnormal according to the self-check result information, if the functional module being abnormal, then generating corresponding fault information, and
a communication unit, sending the fault information to a user terminal.

The garden tool of the disclosure directly adjusts a height of a mowing device from the ground through the height adjustment assembly without adjusting a position of a heavy motor, thereby reducing a bearing capacity of the height adjustment assembly and enabling the height adjustment assembly less likely to be damaged. Moreover, such arrangement may effectively reduce an overall volume of the garden tool, thereby reducing manufacturing, packaging and transportation costs of the mower. In addition, the height adjustment assembly controls the height adjustment rod to work through an engagement of the first driving tooth and the second driving tooth, which has a simple structure and high reliability.

The outdoor work tool of the disclosure drives the driving wheel to rotate through a direct engagement of the driving gear with the internal teeth, which realizes a self-propelled outdoor work tool and has advantages of less parts, simple structure and low cost.

On the one hand, the outdoor work tool of the disclosure is provided with a battery pack compartment at the bottom of the tool body, so that the battery pack system may be pluggably housed in the battery pack compartment, which facilitates a mounting and disassembly of the battery pack system. On the other hand, through arranging the first battery pack and the second battery pack in parallel, not only a power storage capacity of a power supply is increased, but also the battery pack system may be used in other products that use lithium batteries as energy sources, which expands a range of use of the battery pack system.

The safety key assembly of the disclosure arranges the locking member and the unlocking member in the key structure at the same time, so that the safety key assembly of the disclosure can be used to control a start and stop of the driving devices of the outdoor work tool driving assembly. It may also be used to connect or release the housing assembly of the outdoor work tool, which effectively improves a practicability of the safety key assembly, and at the same time enables the outdoor work tool using the safety key assembly not only to have good practicability, but also to have better safety in use.

The information traceability system of the disclosure arranges the traceability management unit, the traceability management unit is connected with the working module, and the traceability management unit obtains the initial information data and the working information data of each electronic component in the outdoor work tool in order to monitor an operation and use status of each electronic component in real time and monitor a maintenance and upgrade of each electronic component in the outdoor work tool, which improves the practicability of the outdoor work tool using the information traceability system. The information traceability system of the disclosure can still carry out information tracing on replaced electronic components of the repaired outdoor work tool, and obtain a working status of the outdoor work tool at any time. The information traceability system of the disclosure can obtain the initial information data (for example, delivery time, delivery status, etc.) of outdoor work tool at any time, and may analyze a maintenance status of outdoor work tool according to the initial information data. When an abnormality occurs in the information traceability system of the disclosure, the traceability management unit may perform a comparative analysis of damage reasons and reduce a difficulty of troubleshooting according to the initial information data and working information data. The information traceability system of the disclosure greatly improves an efficiency of after-sales service, improves user's experience of the product, and thus obtains more sales markets.

The self-check feedback system of the disclosure may detect abnormalities of functional modules in time, actively push fault information to users and notify users to repair in time.

BRIEF DESCRIPTION OF THE DRAWINGS

FIG. 55 is a flowchart of a method for tracing information of the electronic component in a specific embodiment of the disclosure.

FIG. 56 is a flowchart of a method for tracing the information of the electronic component in another specific embodiment of the disclosure.

FIG. 59 is a schematic flowchart of S110 of the self-check feedback method shown in FIG. 58.

FIG. 60 is a schematic flowchart of S120 of the self-check feedback method shown in FIG. 58.

FIG. 61 is a schematic flowchart of the self-check feedback method of a second example of the first embodiment of the disclosure.

FIG. 62 is a schematic flowchart of S210 of the self-check feedback method shown in FIG. 61.

FIG. 64 is a schematic flowchart of the self-check feedback method of a third example of the first embodiment of the disclosure.

FIG. 68 is a schematic flowchart of the self-check feedback method of a first embodiment of the second embodiment of the disclosure.

FIG. 69 is a schematic flowchart of S410 of the self-check feedback method shown in FIG. 68.

FIG. 70 is a schematic flowchart of S420 of the self-check feedback method shown in FIG. 68.

FIG. 71 is a schematic flowchart of the self-check feedback method of a second example of the second embodiment of the disclosure.

FIG. 72 is a schematic flowchart of S510 of the self-check feedback method shown in FIG. 71.

FIG. 74 is a schematic flowchart of the self-check feedback method of a third example of the second embodiment of the disclosure.

FIG. 75 is a schematic flowchart of S690 of the self-check feedback method shown in FIG. 74.

FIG. 77 is a module schematic view of the self-check feedback system of the second example of the second embodiment of the disclosure.

Figures 1, 2:
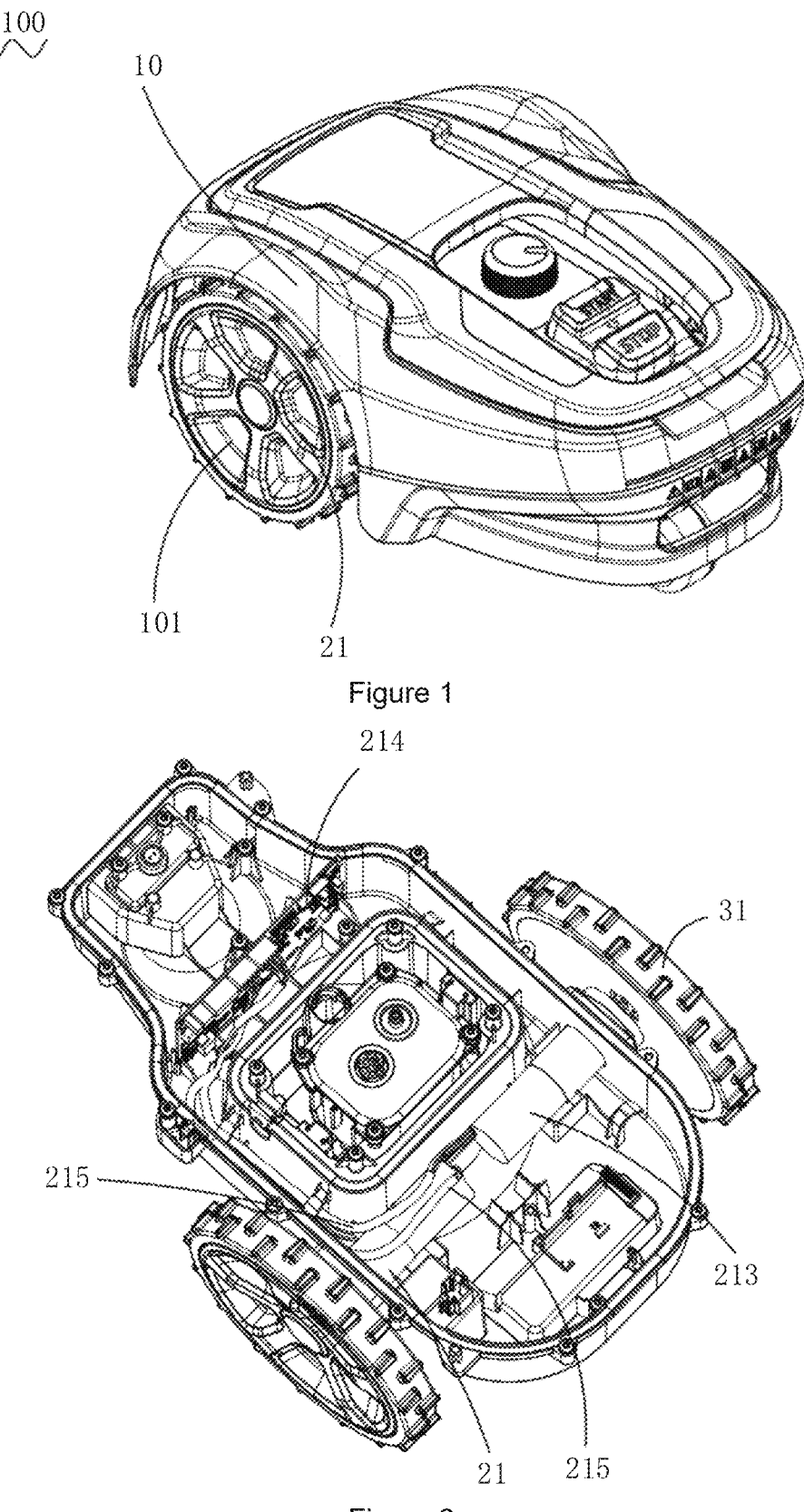
FIG. 1 is a perspective view of an outwork door tool of the disclosure.
FIG. 2 is a perspective view of the outwork door tool shown in FIG. 1 with its inner structure exposed.
Figure 3:
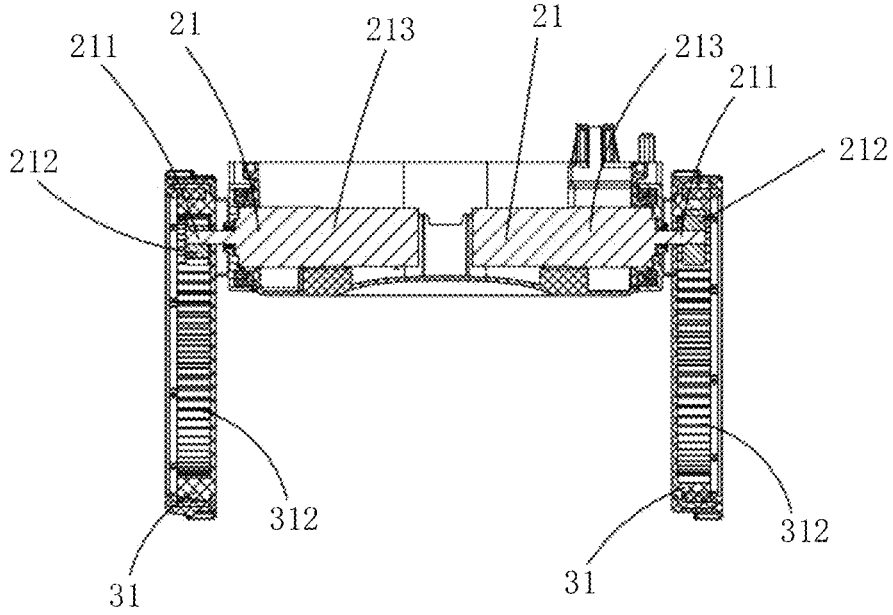
FIG. 3 is a cross-sectional view of a driving structure of the outwork door tool shown in FIG. 1.
Figure 4:
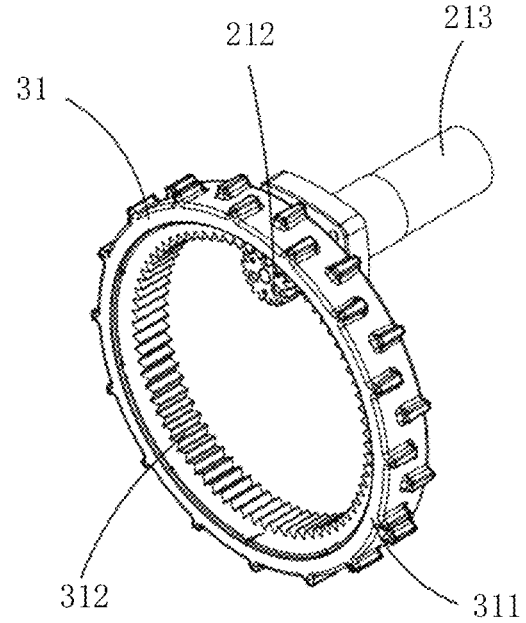
FIG. 4 is a perspective view of a second driving device of a power output module of the driving structure shown in FIG. 3 when it is engaged with a driving wheel.
Figure 5:
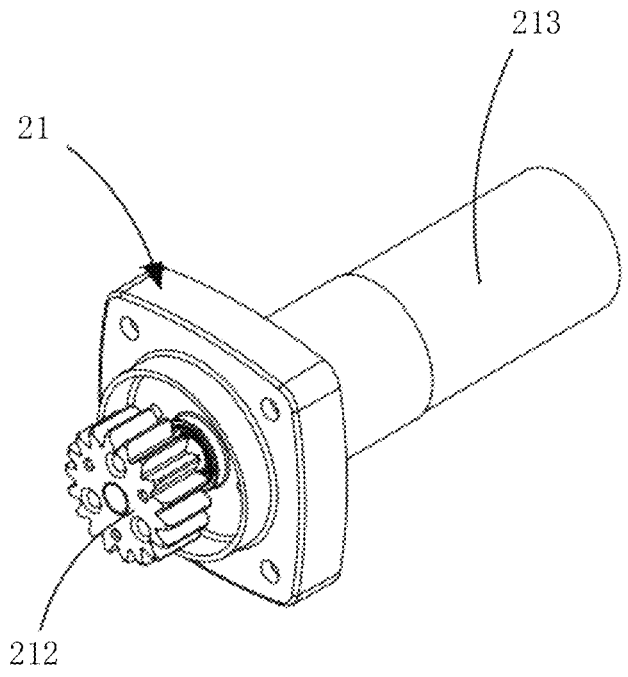
FIG. 5 is a perspective view of the second driving device of the power output module of the driving structure shown in FIG. 4.
Figure 6:
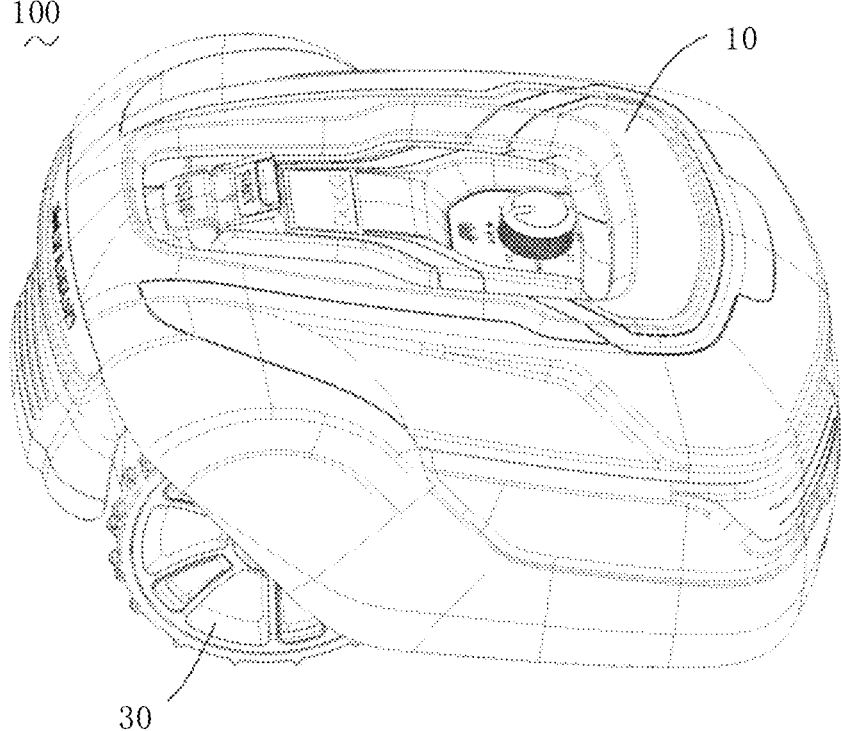
FIG. 6 is a schematic structural view of another embodiment of the outwork door tool of the disclosure.
Figure 7:
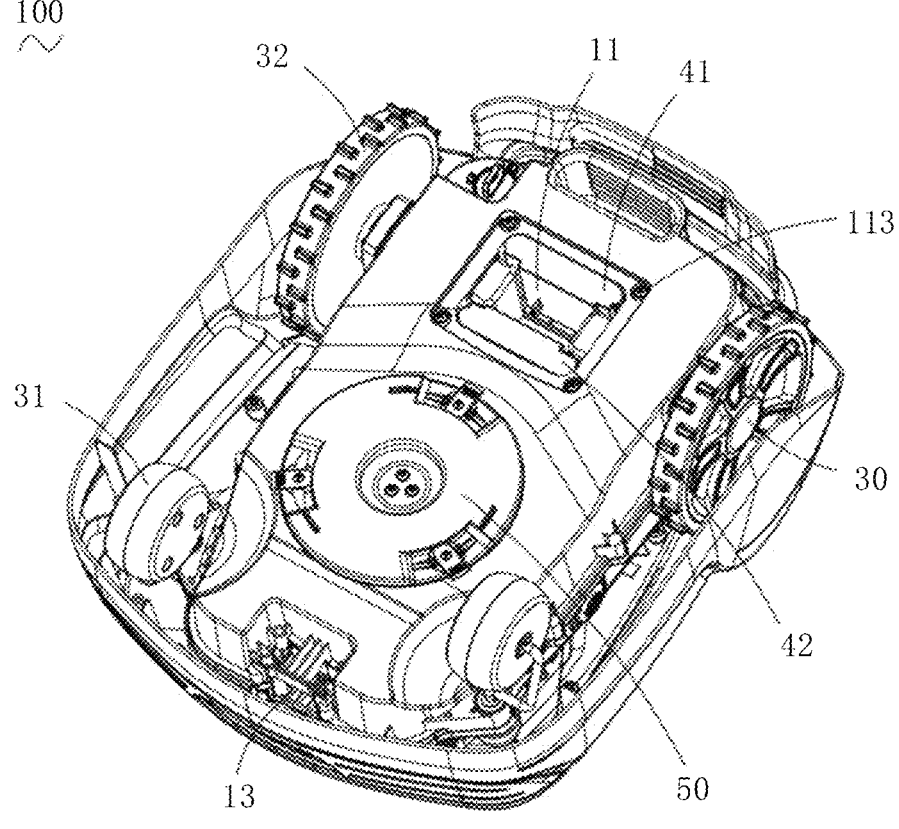
FIG. 7 is a schematic structural view of another angle of the outwork door tool shown in FIG. 6.
Figure 8:
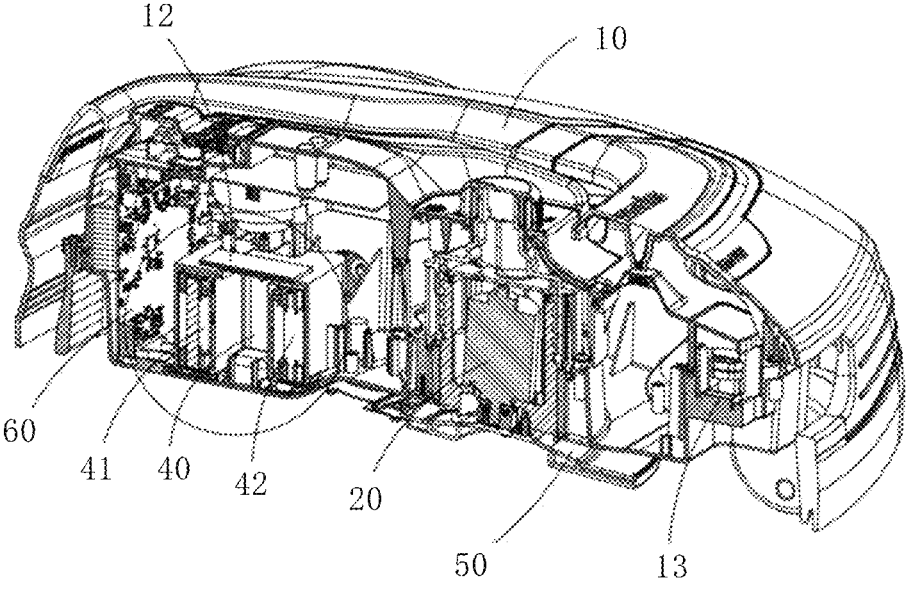
FIG. 8 is a cross-sectional view of the outwork door tool shown in FIG. 6.

PART NUMBER DESCRIPTION electric tool—1000, smart mower—100, driving structure—101, lifting detection device—102, collision detection device—103, boundary signal detection device—104, tool body—10, battery pack compartment—11, accommodation space—110, compartment body—111, compartment cover—112, fixing hole—113, screw—114, sealing component—115, opening—116, clipping groove—117, circuit board—12, charging port—13, housing assembly—14, lower housing—141, upper housing—142, control component—1421, outer housing—143, through hole—1431, connecting column—15, driving device—20, second driving device—21, driving shaft—211, driving gear—212, driving motor—213, first control panel—214, cable—215, first driving device—22, motor—221, output shaft—222, prime mover—223, output shaft—2231, output gear—2233, transmission mechanism—224, transmission rod—2241, transmission shaft—2242, guiding part—22421, through groove—2243, guiding rail—2244, transmission wheel—2245, transmission wheel tooth—2246, first locking tooth—2247, first matching tooth—2248, internal height adjustment thread—2249, walking device—30, driving wheel—31, wheel hub—311, internal tooth—312, steering wheel—32, battery pack system—40, first battery pack—41, second battery pack—42, mowing device—50, cutting blade—51, cutting blade base—511, protruding platform—512, blade mounting part—513, fixing component—514, connecting component—515, matching surface—516, blade—52, first connecting assembly—53, first connecting component—531, second connecting component—532, first mounting surface—5321, second mounting surface—5322, cylinder body—5323, second base—5324, docking surface—5325, first mounting hole—5326, second mounting hole—5327, fixing hole—5328, second connecting assembly—54, body part—541, protruding column—542, third mounting surface—543, fourth mounting surface—544, third mounting hole—545, fourth mounting hole—546, control device—60, safety key assembly—70, housing—71, housing groove—711, magnetic switch—72, connecting assembly—73, first base—731, locking component—732, rotating member—733, key structure—74, twist handle—741, plug—in part—742, locking member—743, unlocking member—744, housing part—745, blocking plate—746, pointing structure—747, height adjustment assembly—80, height adjustment rod—81, external height adjustment thread—811, first driving tooth—812, second matching tooth—813, height adjustment knob—82, second driving tooth—821, second elastic component—83, locking knob—84, second locking tooth—841, housing groove—842, charging station—200, bottom plate—201, charging center—202, anti—theft alarm system—300, state analysis device—301, sensing device—302, movable part, rotatable part—3021, sensor—3022, pin connecting shaft—3023, sensing component—3024, third elastic component—3025, housing cavity—3026, alarm device—303, communication device—304, second control panel—305, information traceability system—410, 420, 430, traceability management unit—411, 421, 431, working module—412, 422, 432, electronic component—413, 413', 414, 423, 423', 424, main control unit—425, 425', 433, 433', working unit—426, collision detection unit—434, lifting detection unit—435, self—propelled unit—436, mowing unit—437, self—check feedback system—400, 500, 700, 800, self—check unit—401, 501, 701, 801, control unit—402, 502, 702, 802, positioning unit—403, 503, 703, 803, communication unit—404, 504, 704, 804, grade classification unit—505, 805, robotic mower—600, 900, collision detection module—601, 901, lifting detection module—602, 902, server—706, 806, mowing module—603, 903, walking module—604, 904, driving module—605, 905, power supply module—606, 906, charging module—607, 907.

DETAILED DESCRIPTION

The following describes the implementation of the disclosure through specific embodiments, and those skilled in the art can easily understand other advantages and effects of the disclosure from the content disclosed in this specification. The disclosure can also be implemented or applied through other different specific embodiments. Various details in this specification can also be modified or changed based on different viewpoints and applications without departing from the disclosure.

Please refer to FIG. 1 through FIG. 80. It should be noted that figures provided in these embodiments only illustrate a basic idea of the disclosure in a schematic manner. The figures only show the assemblies related to the disclosure instead of drawing according to number, shape and size of the assemblies in actual implementation. In its actual implementation, type, quantity, and ratio of each assembly may be changed at will, and its assembly layout type may also be more complicated.

Please refer to FIG. 1 through FIG. 5. The disclosure provides a self-propelled garden tool, which may be driven for garden work. The garden tool may be, for example, a robotic mower 100, and the robotic mower 100 includes a tool body 10 and a driving structure 101 mounted on the tool body 10 to drive the tool body 10 to walk. The robotic mower 100 includes a first driving device mounted on the tool body 10, and the first driving device drives a cutting blade 51 to realize a cutting function. Of course, the garden tool may also be other types of garden tools that may move automatically, which is not limited here.

The driving structure 101 further includes a second driving device 21 and a driving wheel 31 connected with the second driving device 21. The second driving device 21 includes a driving shaft 211 of a driving motor and a driving gear 212 arranged on the driving shaft 211, and the driving gear 212 is arranged on an outer side of the tool body 10. The driving wheel 31 includes a wheel hub 311 arranged on an outer side of the tool body 10, and internal teeth 312 are arranged on an inner side of the wheel hub 311.

The driving gear 212 is directly engaged with the internal teeth 312, and the driving shaft 211 drives the driving gear 212 to rotate, so that the driving gear 212 directly drives the internal teeth 312 to rotate, and then drives the driving wheel 31 to rotate, which realizes a walking of the robotic mower 100. In this embodiment, the number of teeth of the driving gear 212 is less than the number of teeth of the inner teeth 312, so that a speed of the driving wheel 31 may be reduced.

In this embodiment, the driving gear 212 is coaxially arranged on the driving shaft 211, and an axis of the driving shaft 211 is parallel to an axis of the rotating shaft of the driving wheel 31 and spaced from each other. The second driving device 21 includes a pair of driving motors 213, and the pair of driving motors 213 are spaced left and right along an axial direction of the driving shaft 211. An output shaft of each driving motor 213 is connected with the driving shaft 211, and each driving shaft 211 is provided with a driving gear 212. In other embodiments of the disclosure, the output shaft may also be the same shaft as the driving shaft 211.

Correspondingly, there is also a pair of the driving wheel 31 and they are arranged on both sides of the tool body 10, and each driving wheel 31 is provided with internal teeth 312, so that each driving gear 212 may be used to be engaged with the internal teeth 312 of the corresponding driving wheel 31 to drive the corresponding driving wheel 31 to walk, thus realizing a power transmission. In the disclosure, the driving motor 213 and the driving wheel 31 are combined into one component, which has advantages of simplifying the mounting method, reducing production, transportation and management costs, and the like.

Compared with traditional technical solution in which the driving motors are mounted inside a machine, a pair of driving motors 213 of the disclosure is mounted on an outer side of the tool body 10, which has advantages of convenient and flexible replacement.

Please refer to FIG. 2. The robotic mower 100 further includes a first control panel 214 housed inside the tool body 10 for controlling the driving motor 213 to work and a cable 215 connecting the first control panel 214 and the driving motor 213. The first control panel 214 is used to control an operation of the driving motor 213, so as to realize a walking, turning, etc. of the robotic mower 100.

Figures 9, 10:
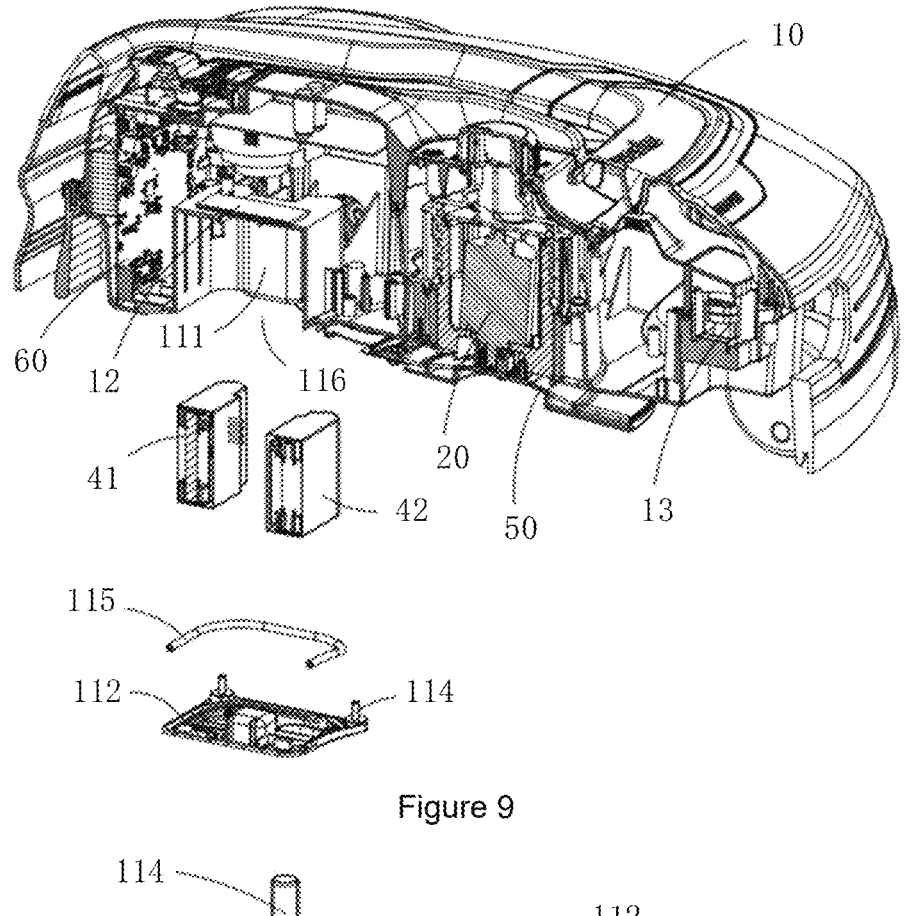
FIG. 9 is a partially exploded view of FIG. 8.
FIG. 10 is a schematic structural view of a compartment cover in FIG. 9.
Figure 11:
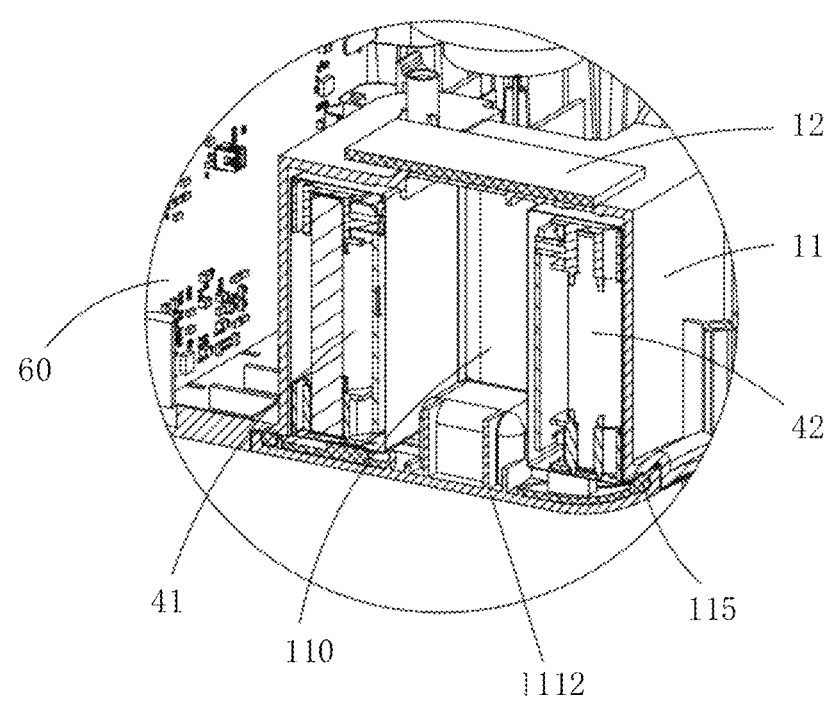
FIG. 11 is an enlarged view of a circled part in FIG. 8.
Figure 12:
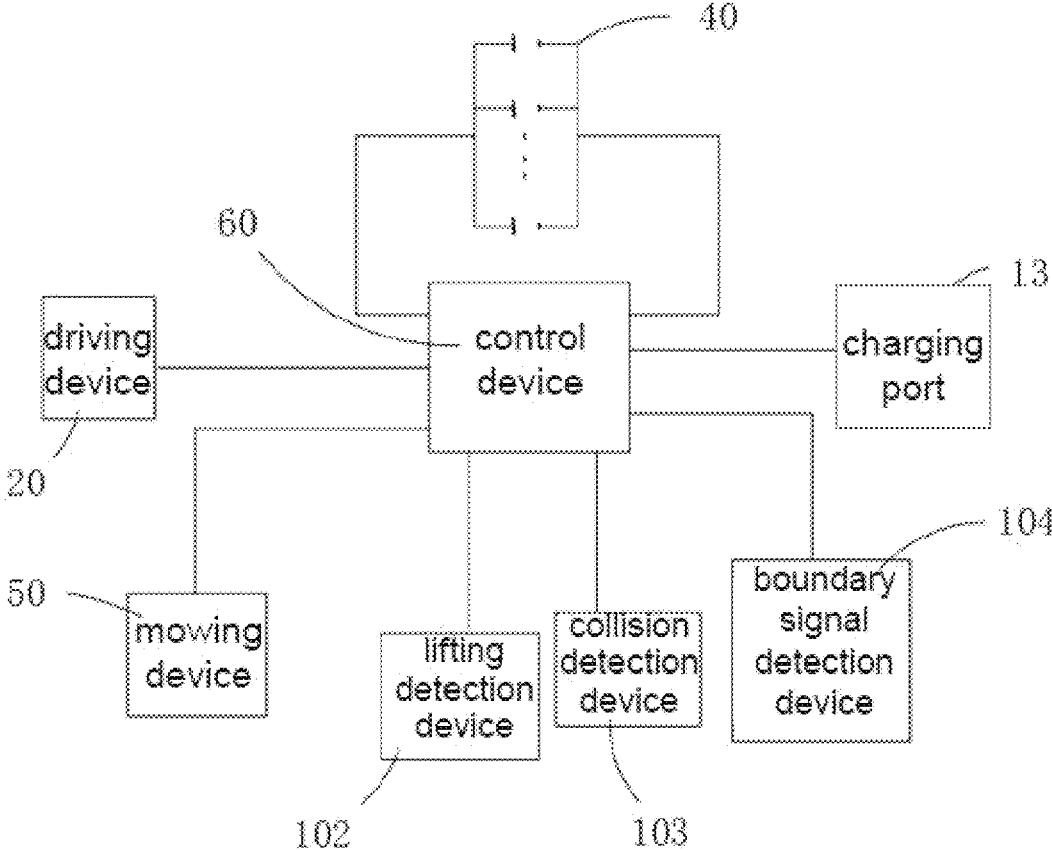
FIG. 12 is a control principle diagram of the disclosure.

In some embodiments, the robotic mower 100 further includes a battery mounted on the tool body 10 (such as a first battery pack 41 and a second battery pack 42 in FIG. 9), such as a lithium battery, as a power supply assembly or a power supply unit to provide power for the driving motor 213. Of course, the robotic mower 100 may also be powered by an external power supply, which is not limited here.

Please refer to FIG. 6 through FIG. 11. The robotic mower 100 further includes the tool body 10 and a battery pack system 40 housed in the tool body 10 (as the power supply assembly or power supply unit of the robotic mower 100). A bottom of the tool body 10 is provided with a battery pack compartment 11, and the battery pack system 40 is pluggably housed in the battery pack compartment 11, so that the battery pack system 40 may be taken out separately for charging, and may also be taken out and applied to other lithium battery products.

The battery pack system 40 includes a first battery pack 41 and a second battery pack 42 connected in parallel. In this embodiment, the first battery pack 41 and the second battery pack 42 are both battery panel packs, which reduces an overall volume of the battery pack system 40, enables an internal structure of the robotic mower 100 to be more and more compact, and meets demands for miniaturization development. The battery pack is a low-voltage battery pack, and the battery pack has a row of batteries.

It may be understood that the battery pack system 40 is not limited to only including the first battery pack 41 and the second battery pack 42. It may also be added a third battery pack, a fourth battery pack or more according to actual needs as long as these battery packs are kept in parallel connection, which is no limited here. The following will take the battery pack system 40 including the first battery pack 41 and the second battery pack 42 as an embodiment for illustration.

The battery pack compartment 11 includes a compartment body 111 integrally arranged with the tool body 10 and a compartment cover 112 for covering the compartment body 111 from bottom to top. The first battery pack 41 and the second battery pack 42 are fixedly housed in an accommodation space 110 formed by the compartment body 111 and the compartment cover 112. The compartment cover 112 is movably connected with the compartment body 111, so that the compartment cover 112 may be opened to take out the first battery pack 41 and the second battery pack 42 from the compartment body 111.

In this embodiment, a bottom of the compartment body 111 is provided with a fixing hole 113. The compartment cover 112 is provided with via holes (not labeled), so that the compartment body 111 and the compartment cover 112 may be fixedly connected by screws 114 passing through the via holes and locked with the fixing holes 113 to ensure that the battery pack system 40 is stably housed in the accommodation space 110 and will not fall. The compartment cover 112 and the compartment body 111 are arranged in a rectangular shape, four corners of the bottom of the compartment body 111 are provided with fixing holes 113, and the four corners of the bottom of the compartment cover 112 are provided with via holes correspondingly, so that the compartment body 111 and the compartment cover 112 may be locked and fixed by four screws 114, and a stability is the best at this time.

Of course, the fixing holes 113 may also be arranged only at two diagonals corners of the bottom of the compartment body 111, and at the same time via holes are arranged at two diagonal corners of the bottom of the compartment cover 112. At this time, only two screws 114 are needed to lock and fix the compartment body 111 and the compartment cover 112, and the stability is also better.

In addition, the compartment cover 112 and the compartment body 111 may also be connected by a rotating shaft, so that the compartment cover 112 may be opened or closed relative to the compartment body 111, and the battery pack system 40 may be easily loaded or removed. Alternatively, the compartment body 111 and the compartment cover 112 may also be fixed by a buckle connection as long as it can be ensured that the first battery pack 41 and the second battery pack 42 may not fall from the accommodation space 110 during normal use. No more embodiments will be given here.

A sealing component 115 is further arranged between the compartment body 111 and the compartment cover 112, and the sealing component 115 surrounds a closing part of the compartment body 111 and the compartment cover 112 for sealing a gap between the compartment body 111 and the compartment cover 112. The bottom of the compartment body 111 is provided with an opening 116 through which the first battery pack 41 and the second battery pack 42 are inserted into the accommodation space 110, and the compartment cover 112 is used to cover the opening 116. A surrounding edge of the compartment cover 112 is provided with a ring of clipping grooves 117, the clipping grooves 117 are relatively located on a periphery of the opening 116, and the sealing component 115 is clamped and fixed in the clipping grooves 117, so that after the compartment body 111 and the compartment cover 112 are assembled, the opening 116 may be sealed by the sealing member 115, so as to prevent external dust or water vapor from entering the accommodation space 110 from the opening 116, which will affect the first battery pack 41 and the second battery pack 42.

A top of the battery pack compartment 11 is provided with a circuit board 12, and a first conductive component (not shown) and a second conductive component (not shown) are integrated on the circuit board 12. The first conductive component is used for electrical contact with the first battery pack 41, and the second conductive component is used for electrical contact with the second battery pack 42. In the disclosure, the first conductive component and the second conductive component are connected in parallel through a circuit, so that a parallel connection of the first battery pack 41 and the second battery pack 42 may be realized, which realizes a parallel connection of the battery packs. Specifically, both the first conductive component and the second conductive component are pins, and both the first conductive component and the second conductive component extend from the top of the battery pack compartment 11 into an interior of the battery pack compartment 11 (which means protruding into an interior of the accommodation space 110).

A purpose of setting the first battery pack 41 and the second battery pack 42 in parallel is: 1. after multiple battery packs are connected in parallel, a power storage capacity of the power supply is increased, a working time of the robotic mower 100 is increased, and a working efficiency of the robotic mower 100 is improved; 2. as the working time increases, charging times of the battery pack are reduced, and a duration life of the battery pack system 40 is prolonged; 3. the power supply of the robotic mower 100 is composed of multiple battery packs connected in parallel, so the battery pack system 40 may be used on other lithium battery products; 4. since the robotic mower 100 may be charged by itself, when the battery pack system 40 runs out of power on other lithium battery products, it may be charged in the robotic mower 100, and multiple battery packs may be charged at the same time.

The tool body 10 is further provided with a charging port 13, the charging port 13 is electrically connected with the battery pack system 40, and the charging port 13 and the battery pack system 40 are separately located at front and rear ends of the tool body 10. For example, since the battery pack system 40 is relatively heavy, the charging port 13 is arranged at the front end of the tool body 10, and the battery pack system 40 is arranged at the rear end of the tool body 10. Certainly, in other embodiments, specific positions of the charging port 13 and the battery pack system 40 may also be arranged at other positions according to actual conditions as long as the battery pack system 40 may be charged, which is not limited here.

Please refer to FIG. 6 through FIG. 12. The robotic mower 100 further includes a control device 60, a driving device 20, a mowing device 50, a lifting detection device 102, a collision detection device 103, a boundary signal detection device 104 and a walking device 30 arranged in the tool body 10. Wherein, the battery pack system 40, the charging port 13, the driving device 20, the mowing device 50, the lifting detection device 102, the collision detection device 103, the boundary signal detection device 104 and the walking device 30 are all connected with the control device 60 respectively and controlled by the control device 60. After the battery pack system 40 is connected with the control device 60, it may be used as a power source of the robotic mower 100 to provide power for the robotic mower 100. The control device 60 may be the control panel 214 shown in FIG. 2 or other independent control devices connected with the control panel 214.

The lifting detection device 102 is used to detect a relative displacement of an outer housing of the tool body 10 in a vertical direction, and sends a corresponding detection signal to the control device 60 to regulate a working state of the robotic mower 100 (including triggering an alarm and/or stopping working), in order to ensure safety performance. The collision detection device 103 is used to detect the relative displacement of the outer housing of the tool body 10 in a horizontal direction, and sends a corresponding detection signal to the control device 60 to regulate the working state of the robotic mower 100 (including adjusting a line or stopping working), in order to ensure the safety performance. The boundary signal detection device 104 is used to detect obstacles around the robotic mower 100 and feedback to the control device 60 when an obstacle is detected, and the control device 60 controls a steering of the walking device 30 to avoid the obstacle. It may be understood that specific structures of the lifting detection device 102, the collision detection device 103 and the boundary signal detection device 104 may all adopt conventional technical solutions, which will not be described in detail or limited here.

The walking device 30 includes a front wheel and a rear wheel, and the front wheel is a steering wheel 32, which may be one or two, and is used to drive the robotic mower 100 to turn under a control of the control device 60. The rear wheel is a driving wheel 31 and is provided with two, which are used for self-propelling under a driving of the control device 60 and the driving device 20, and then drive the whole robotic mower 100 to walk. In this embodiment, the charging port 13 is arranged close to the front wheel, and the battery pack system 40 is arranged close to the rear wheel and located between the two rear wheels.

When power of the battery pack system 40 is exhausted, the charging device (such as a charging station 200 in FIG. 41 and FIG. 42) may be electrically connected with the charging port 13. At this time, the control device 60 will control a current at the charging port 13 to be transmitted to the battery pack system 40 to charge the battery pack system 40.

The disclosure arranges the battery pack compartment 11 at a bottom of the robotic mower 100, so that two or more battery packs may be inserted into the battery pack compartment 11. At the same time, all the battery packs in the battery pack compartment 11 are connected in parallel as the power source of the robotic mower 100 through a parallel circuit connection, which not only increases the power storage capacity of the power supply, but also improves the working time and work efficiency of the robotic mower 100. Moreover, the battery pack system 40 may be used on other lithium battery products, achieving a purpose of expanding a use range of the battery pack system 40.

Figure 13:
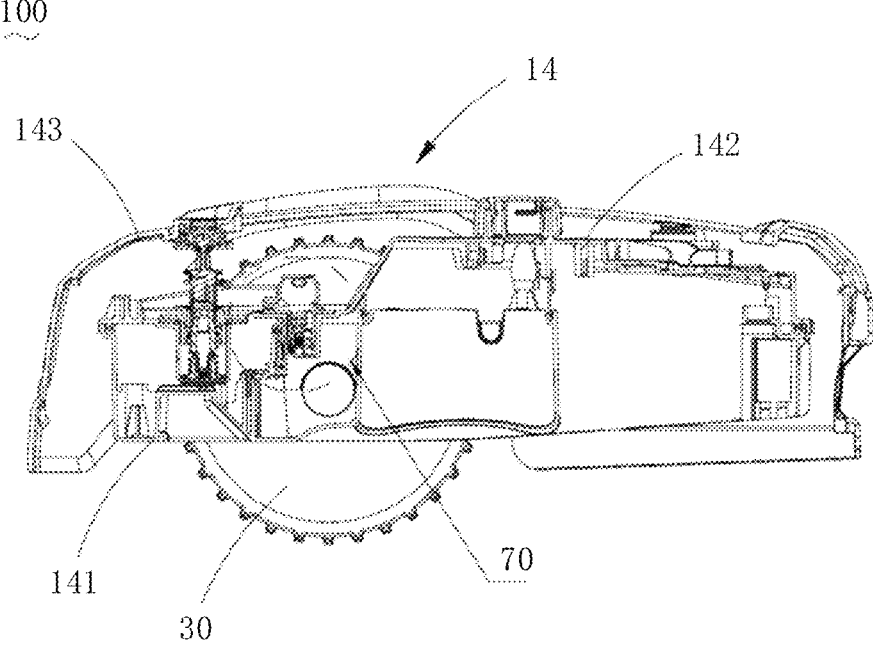
FIG. 13 is a schematic cross-sectional view of the outwork door tool according to another embodiment of the disclosure.
Figure 14:
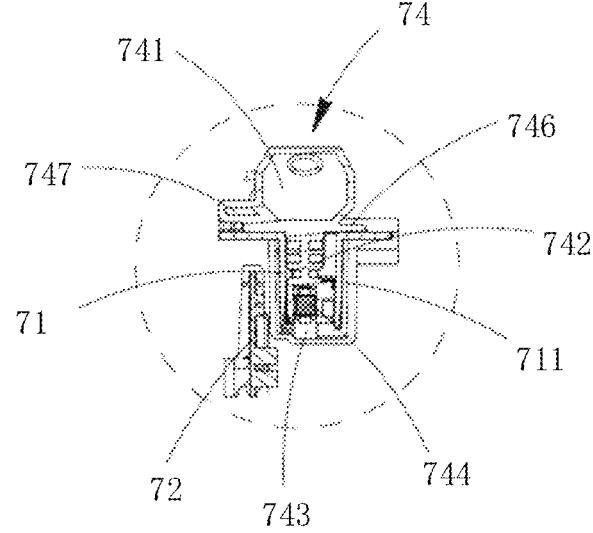
FIG. 14 is a partial enlarged view of a position of a safety key assembly in FIG. 13.
Figure 15:
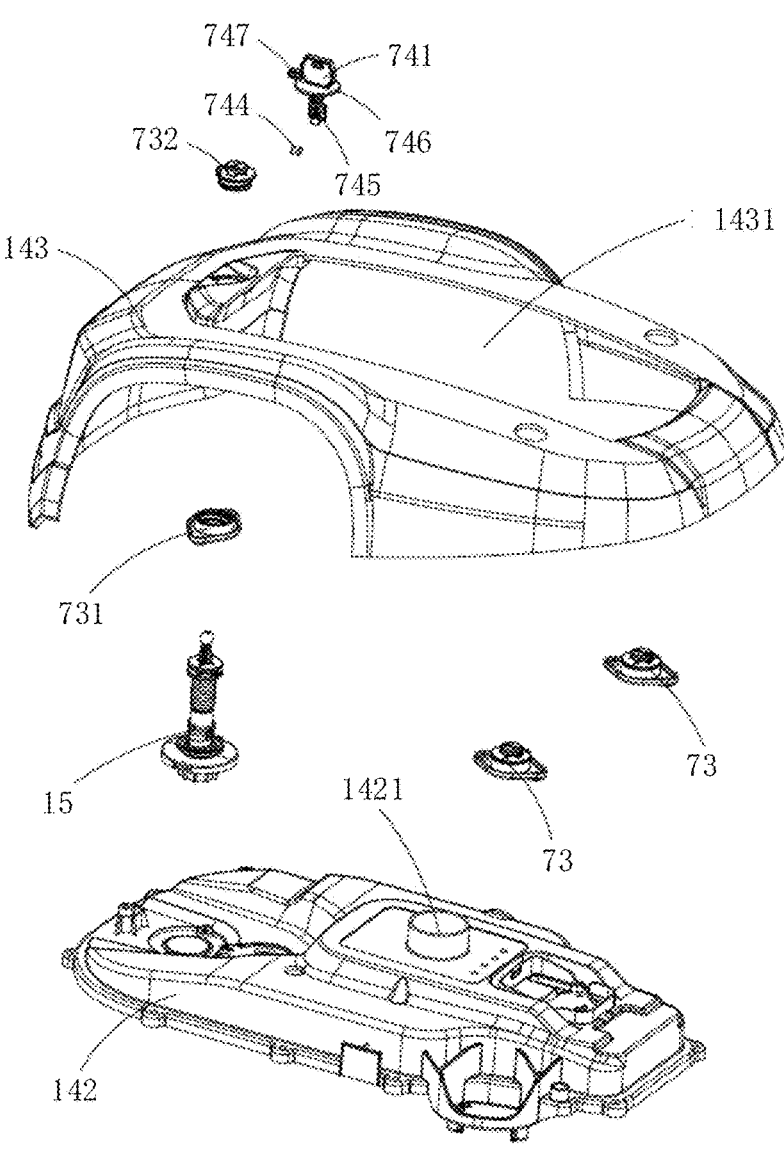
FIG. 15 is an exploded schematic view of a housing assembly and the safety key assembly in FIG. 13.

Please refer to FIG. 13 through FIG. 15. A housing assembly 14 of the robotic mower 100 includes a lower housing 141, an upper housing 142 engaged on the lower housing 141, and an outer housing 143 covering an outer side of the upper housing 142. In the disclosure, the driving device and the power supply assembly are connected and housed in the accommodation space formed by engaging the lower housing 141 and the upper housing 142. Further, a control component 1421 (as shown in FIG. 15) is arranged on the upper housing 142, and the control component 1421 is electrically connected with the driving device to control an operation of the driving device. The outer housing 143 is provided with a through hole 1431 corresponding to the control component 1421, and the control component 1421 is exposed from the through hole 1431, so that the user may control the robotic mower 100 through the control component 1421.

In an embodiment of the disclosure, the control component 1421 is a control panel arranged on a surface of the upper housing 142, and the control panel is provided with control buttons for controlling the operation of the robotic mower 100. It should be understood that, in the disclosure, the control component 1421 is only illustrated as an example of a control panel with control buttons, and in other embodiments of the disclosure, the control component 1421 may also be another control structures for controlling the operation of the robotic mower 100, which is not limited to this.

Figure 16:
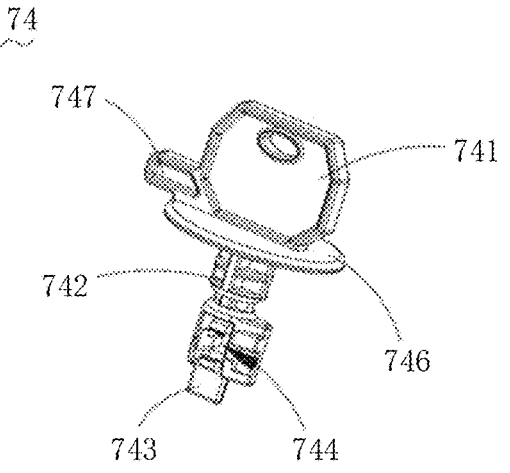
FIG. 16 is a structural schematic view of another angle of the key structure in FIG. 14.
Figure 17:
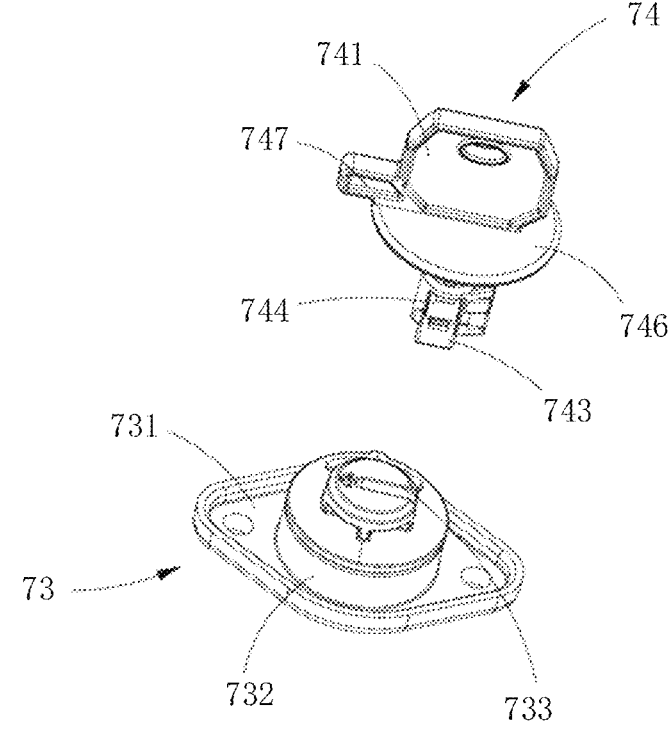
FIG. 17 is a structural schematic view of a combination of the key structure and the connecting assembly in FIG. 13.
Figure 18:
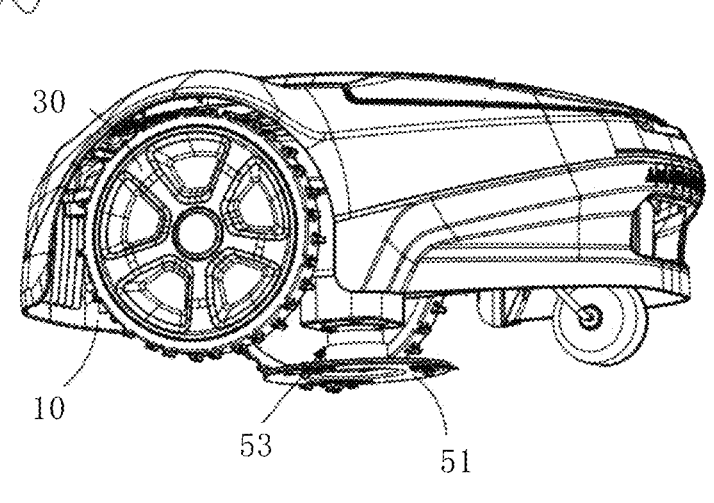
FIG. 18 is a perspective view of the garden tool according to a fourth embodiment of the disclosure.
Figure 19:
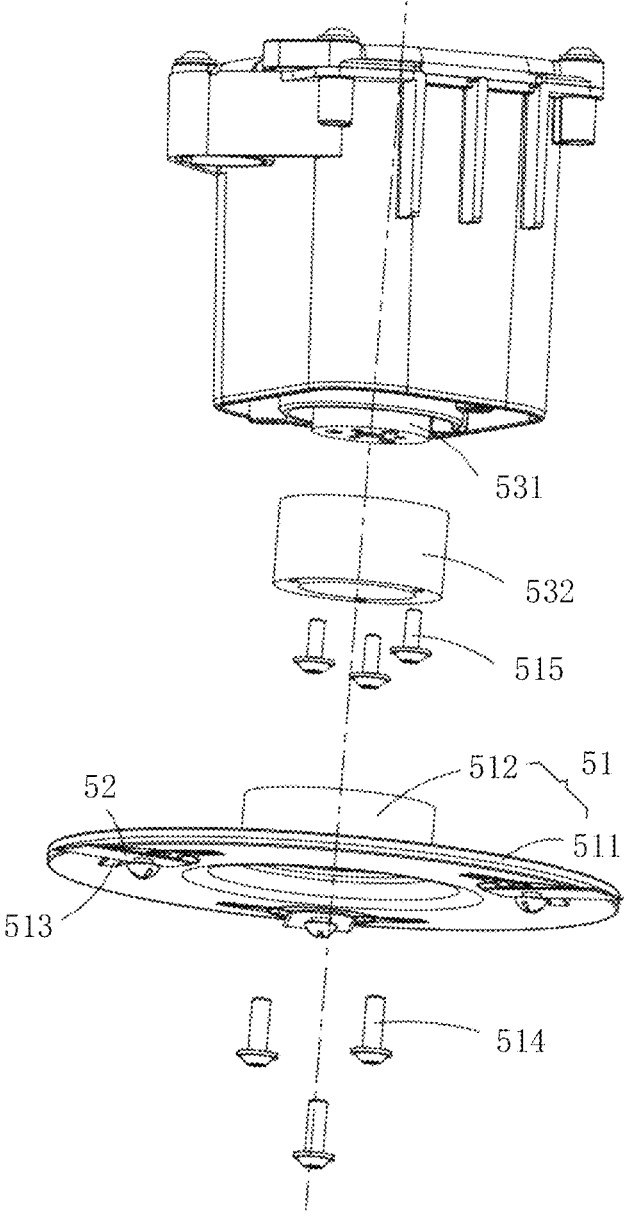
FIG. 19 is an exploded view of a motor, the connecting assembly and a cutting blade of a mower shown in FIG. 18.
Figure 20:
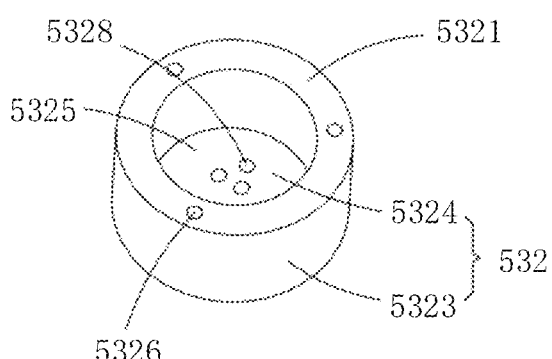
FIG. 20 is a perspective view of a second connecting component in FIG. 19.
Figure 21:
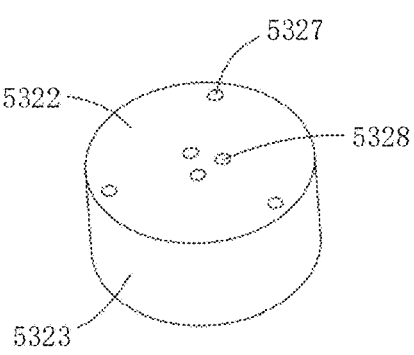
FIG. 21 is another perspective view of the second connecting component shown in FIG. 20.

Please refer to FIG. 16 and FIG. 17 combined with FIG. 14. The robotic mower 100 of the disclosure is further provided with a safety key assembly 70 for controlling a safe start of the robotic mower 100. The safety key assembly 70 includes a housing 71, a magnetic switch 72 connected with the housing 71, and a key structure 74 plugged into the housing 71.

In the disclosure, the housing 71 is a part of the housing assembly 14, and in an embodiment of the disclosure, the housing 71 is integrated with the upper housing 142. Furthermore, the housing 71 (which means the upper housing 142) is further provided with a housing groove 711 for housing the key structure 74, and a projection of the housing groove 711 in the vertical direction is located inside a projection of the through hole 1431 in the vertical direction, so that the key structure 74 inserted into the housing groove 711 is exposed from the through hole 1431 on the outer housing 143.

The magnetic switch 72 is arranged on an outer wall of the housing groove 711, and is connected with the driving device for control. The key structure 74 is plugged into the housing groove 711, and may be switched between a starting position and a shut-off position. When the key structure 74 is rotated to the starting position, it may control the magnetic switch 72 to be in an on state, and further control the power supply assembly and the driving device to be powered on, so that the robotic mower 100 may be used to perform corresponding outdoor work.

The key structure 74 includes a twist handle 741 and a plug-in part 742 connected with one end of the twist handle 741. The twist handle 741 is used to drive the plug-in part 742 to switch between the starting position and the shut-off position.

On one hand, the plug-in part 742 can be inserted into the housing groove 711 to trigger the magnetic switch 72 to realize a shut-off control of the robotic mower 100, and on the other hand, it may also be used to realize a connection or detachment of the connection assembly 73.

An end of the plug-in part 742 away from the twist handle 741 is provided with a locking member 743 and an unlocking member 744, and along an insertion direction of the plug-in part 741 and the robotic mower 100, the locking member 743 is located at an end of the plug-in part 741, the unlocking member 744 and the locking member 743 are arranged in a front and rear misalignment.

Along the insertion direction of the plug-in part 742, the plug-in part 742 is further provided with a housing part 745 above the locking member 743, the unlocking member 744 is housed in the housing part 745, and an extending direction of the unlocking member 744 is perpendicular to an extension direction of the plug-in part 742. The unlocking member 744 is a magnetic unlocking member with magnetism, an N pole and an S pole of the magnetic unlocking member are respectively located on both sides of the extending direction of the unlocking member 744, and a centerline of the magnetic switch 72 and a centerline of the magnetic unlocking member are located on the same straight line. With this arrangement, it may ensure that the unlocking member 744 has a small volume, and at the same time, enables a magnetic pole of the unlocking member 744 to be arranged closer to the magnetic switch 72, so as to ensure an unlocking effect of the safety key assembly 70.

In one embodiment of the disclosure, a blocking plate 746 is arranged between the twist handle 741 and the plug-in part 742. When using the safety key assembly 70 of the disclosure, the blocking plate 746 can resist against an edge of the housing 71 or the housing groove 711 to prevent the plug-in part 742 from excessively protruding into the housing groove 711, which causes damages on the safety key assembly 70 or the upper housing 142, in order to ensure the duration life of the robotic mower 100.

In some embodiments, a surface of the blocking plate 746 is further provided with a pointing structure 747. Pointing marks (not shown) corresponding to the pointing structure 747 are arranged on the upper housing 142. When and only when the pointing structure 747 points to the pointing marks, the plug-in part 742 may be plugged into the housing groove 711 along the insertion direction, and the key structure 74 is in the shut-off position at this moment.

The connecting assembly 73 is used to connect the upper housing 142 and the outer housing 143, and fix a relative position between the upper housing 142 and the outer housing 143. And in the disclosure, multiple sets of connecting assemblies 73 are arranged at the same time, and each set of connecting assemblies 73 includes a first base 731 directly or indirectly connected with the upper housing 142 and a locking component 732 penetrating through the outer housing 143 and clamped with the outer housing 143. The locking component 732 is threadedly connected with the first base 731 to securely connect the upper housing 142 and the outer housing 143.

In one embodiment of the disclosure, a connecting column 15 is arranged between the upper housing 142 and the outer housing 143 to limit a connection distance between the upper housing 142 and the outer housing 143 (as shown in FIG. 15). The first base 731 is connected with an end of the connecting column 15, and is connected with the upper housing 142 through the connecting column 15, so as to realize a locked connection between the upper housing 142 and the outer housing 143 through being matched with the locking member 732, and at the same time, the connection distance between the upper housing 142 and the outer housing 143 is limited to facilitate heat dissipation and use of the robotic mower 100.

The locking component 732 passes through the outer housing 143 and is clamped on the outer housing 143, and may rotate relative to the outer housing 143 to facilitate a locking connection between the locking component 732 and the first base 731. Further, a surface of the locking component 732 is further provided with a rotating member 733. In the disclosure, the rotating member 733 is arranged in a shape of a depression or a protrusion, so as to facilitate the user to drive the locking component 732 to rotate through a matching of the key structure 74 and the rotating member 733, which realizes a locking connection with the first base 731.

The locking member 743 is used to complete a disassembly or fastening of the connecting assembly 73, and the locking member 743 is in a shape of a depression or a protrusion which may be engaged with the rotating member 733. With this arrangement, the key structure 74 may be matched with the connecting assembly 73 through the locking member 743, and a locking of the connecting assembly 73 may be completed by further rotating the key structure 74.

It should be noted that a structure of the safety key assembly 70 is only exemplary and should not be limited thereto.

Further, in a specific embodiment of the disclosure, it only takes the housing 71 and the upper housing 142 of the safety key assembly 70 being integratedly arranged as an example for illustration. In other embodiments of the disclosure, the housing 71 and the upper casing 142 may also be arranged separately. At this time, the safety key assembly 70 may also be arranged on a handle or other locations of the robotic mower 100 as long as an electrical connection between the magnetic switch 72 and the driving device is stable.

Specifically, when using the robotic mower 100 of the disclosure, first the key structure 74 is inserted into the housing groove 711 arranged on the upper housing 142 according to the pointing mark. At this time, the key structure 74 is in the shut-off position, and the magnetic switch 72 is in a shut-off state. Further, the plug-in part 742 is rotated by the twist handle 741, so that the key structure 74 is rotated to the starting position. At this time, the unlocking member 744 acts on the magnetic switch 72, so that the magnetic switch 72 is in an on state, which further controls the driving device and the power supply assembly to be powered on, and the user may control the robotic mower 100 through the control component 1421 to realize corresponding garden work.

Further, when the housing assembly 14 of the robotic mower 100 needs to be disassembled or fastened, the key structure 74 needs to be rotated from the starting position to the shut-off position first, the driving device and the power supply assembly are controlled to be powered off, and the key structure 74 is taken out from the housing groove 711. At this time, the user may disassemble or fasten the connecting assembly 73 through the locking member 743 arranged at an end of the key structure 74, so as to realize a disassembly and assembly of the housing assembly 14. And at this time, since the key structure 74 has been disassembled from the housing groove 711, the robotic mower 100 is in a power-off state, which prevents the user from getting an electric shock due to accidentally touching a live driving device or power supply component when disassembling the housing assembly 14, and effectively improves a use safety of the robotic mower 100.

The safety key assembly 70 of the disclosure arranges the locking member 743 and the unlocking member 744 in the key structure 74 at the same time, so that the safety key assembly 70 of the disclosure may be used to control a start and stop of the driving device of the robotic mower 100. It may also be used to connect or release the housing assembly 14 of the robotic mower 100, which effectively improves a practicability of the safety key assembly 70, and at the same time enables the robotic mower 100 with the safety key assembly 70 not only to have good practicability but also have better safety in use.

Please refer to FIG. 18 through FIG. 24. The robotic mower 100 includes the cutting blade 51, a motor 221 (as a first driving device) for driving the cutting blade 51 to rotate, a first connecting assembly 53 connecting the motor 221 and the cutting blade 51, and the tool body 10 housing the motor 221. The motor 221 is housed in the tool body 10, and the cutting blade 51 is located at the bottom of the tool body 10.

The first connecting assembly 53 includes a first connecting component 531 connected with the motor 221 and a second connecting component 532 connected with the cutting blade 51. The cutting blade 51 is provided with a matching surface 516 (first matching surface) which is assembled with the second connecting component 532. The second connecting component 532 is provided with a first mounting surface 5321 and a second mounting surface 5322 abutting against the matching surface 516 of the cutting blade 51. The matching surface 516 abuts and is matched with one of the first mounting surface 5321 and the second mounting surface 5322, so as to realize an assembly and fixing of the cutting blade 51 and the second connecting component 532. In this embodiment, an area of the matching surface 516 is larger than an area of the first mounting surface 5321, and an area of the second mounting surface 5322 is equal to the area of the matching surface 516. Of course, in other embodiments, the areas of the matching surface 516, the first mounting surface 5321 and the second mounting surface 5322 may be designed according to actual needs, which is not limited here.

The cutting blade 51 includes a cutting blade base 511 and a protruding platform 512 protruding from a middle of the cutting blade base 511 to one side. The matching surface 516 is formed inside the protruding platform 512 and located on a top of the cutting blade base 511. The cutting blade 51 is further provided with a matching hole (not labeled), and the matching hole penetrates through the cutting blade base 511 and the protruding platform 512 at the same time, so that a fixing component 514 passes through the matching hole to assemble and fix the cutting blade 51 with the second connecting component 532. A side of the cutting blade base 511 away from the protruding platform 512 is provided with a blade mounting part 513, and there are several blade mounting parts 513 and they are evenly distributed on the cutting blade base 511. The robotic mower 100 further includes a blade 52, which is freely rotatably mounted on the blade mounting part 513 for mowing. The blade mounting part 513 is provided with a blade mounting hole (not shown), and screws, bolts, pins or rivets matched with the blade mounting hole to position the blade 52 on the blade mounting part 513.

The cutting blade 51 is driven to rotate by the motor 221 and drives the blade 52 mounted thereon to work, and the cutting blade 51 is a disc-shaped component. The shape of the cutting blade 51 is circular, and the circular cutting blade 51 rotates smoothly because of its uniform mass distribution. Of course, it may also be in a triangle-shaped, a square-shaped, etc. according to actual needs, which is not limited here.

The motor 221 is used to provide power for a rotation of the cutting blade 51, and the motor 221 is provided with an output shaft 222 for outputting power. The first connecting component 531 is arranged in a cylindrical shape and fixedly connected with the output shaft 222. Specifically, the first connecting component 531 is sleeved on an outside of an end of the output shaft 222, and the other end of the first connecting component 531 is connected with the second connecting component 532 to transmit power output by the motor 221 to the cutting blade 51 through the first connecting component 531 and the second connecting component 531, and then drives the cutting blade 51 to rotate. In this embodiment, the first connecting component 531 is housed in the tool body 10.

The second connecting component 532 is arranged in a cylindrical shape, including a cylinder body 5323 arranged in an annular shape and a second base 5324 that seals a bottom of the cylinder body 5323. The first mounting surface 5321 is formed on a top end of the cylinder body 5323, and the second mounting surface 5322 is formed on a bottom end of the second base 5324, so that a height difference between the first mounting surface 5321 and the second mounting surface 5322 is formed. When the matching surface 516 abuts against the first mounting surface 5321, there is a first distance between the cutting blade 51 and the motor 221, and when the matching surface 516 abuts against the second mounting surface 5322, there is a second distance between the cutting blade 51 and the motor 221, and the first distance is greater than the second distance. In other words, there is a distance between the first mounting surface 5321 and the second mounting surface 5322, an existence of the distance enables the first distance not to be equal to the second distance, which increases a mowing height within a certain range.

The second connecting component 532 is further provided with a docking surface 5325 which is in contact with the first connecting component 531. When the matching surface 516 abuts against the first mounting surface 5321, the first connecting component 531 is in contact with the second mounting surface 5322. When the matching surface 516 abuts against the second mounting surface 5322, the first connecting component 531 is in contact with the docking surface 5325. In this embodiment, the first mounting surface 5321 is an upper surface of the cylinder body 5323, and the second mounting surface 5322 is a lower surface of the second base 5324. The docking surface 5325 is an upper surface of the second base 5324 inside the cylinder body 5323, and a height difference between the first mounting surface 5321 and the second mounting surface 5322 is substantially equal to a height of the second connecting component 532.

The first mounting surface 5321 is provided with a first mounting hole 5326, so that when the matching surface 516 of the cutting blade 51 abuts against the first mounting surface 5321, the cutting blade 51 and the second connecting component 532 may be assembled and fixed through the fixing component 514 passing through the matching hole and the first mounting hole 5326. The second base 5324 is provided with a second mounting hole 5327 corresponding to the matching hole, so that when the matching surface 516 of the cutting blade 51 abuts against the second mounting surface 5322, the cutting blade 51 and the second connecting component 532 may be assembled and fixed through the fixing component 514 passing through the matching hole and the second mounting hole 5327. In this embodiment, the fixing component 514 is a screw, and the matching holes, the first mounting hole 5326 and the second mounting hole 5327 are correspondingly screw holes.

The second mounting holes 5327 are evenly distributed on a peripheral edge of the second base 5324. A fixing hole 5328 is opened at a middle position of the second base 5324. The fixing hole 5328 penetrates through the second base 5324, so that the second connecting component 532 and the first connecting member 531 may be assembled and fixed through the connecting component 515 passing through the fixing hole 5328. In this embodiment, the connecting component 515 is a screw, and the fixing hole 5328 corresponds to a screw hole. Of course, the first connecting component 531 is also correspondingly provided with a screw hole (not labeled) to be matched with the fixing hole 5328, which will not be described in detail here.

Figure 22:
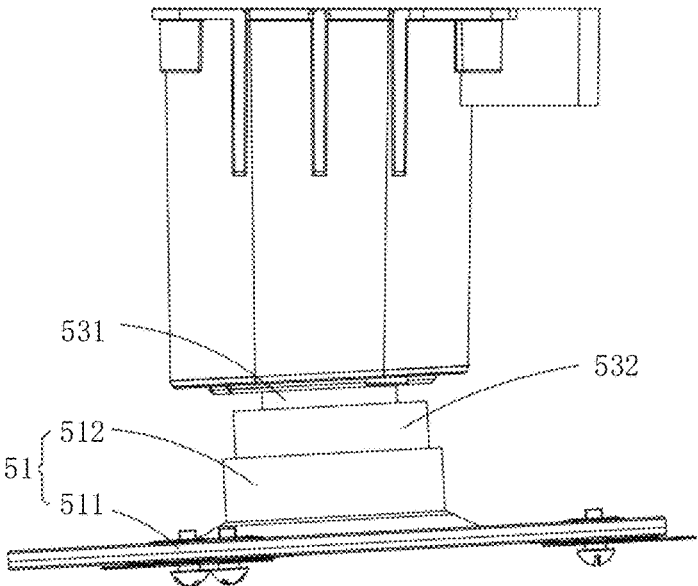
FIG. 22 is a perspective view of the cutting blade in FIG. 19 when it abuts against a first mounting surface of the second connecting component.
Figure 23:
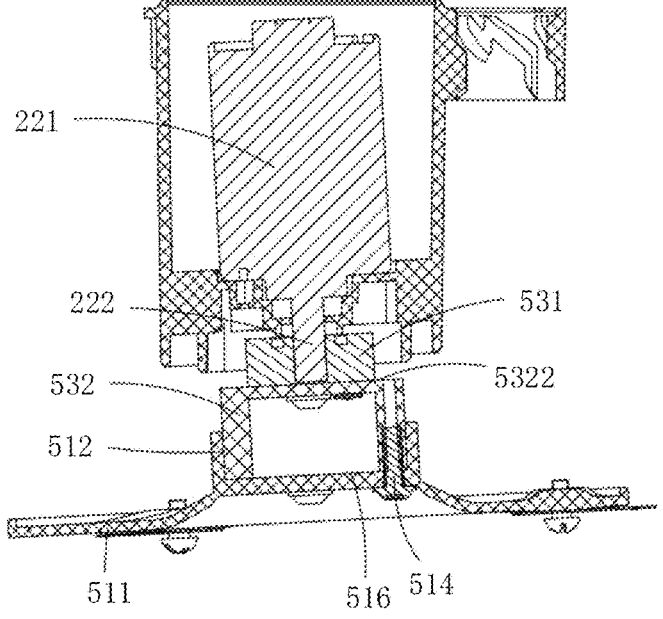
FIG. 23 is a sectional view of FIG. 22.

Please refer to FIG. 22 and FIG. 23. When the matching surface 516 of the cutting blade 51 abuts against the first mounting surface 5321 of the second connecting component 532, a lower surface of the first connecting component 531 contacts the second mounting surface 5322. At this time, three fixing components 514 may be used to respectively pass through the corresponding matching holes and the first mounting hole 5326 to assemble and fix the cutting blade 51 with the second connecting component 532. In this state, the first distance (approximately equal to the height of the second connecting component 532) between a lower surface of the motor 221 and an upper surface of the cutting blade base 511 is relatively large, and the mowing height is relatively high.

Figure 24:
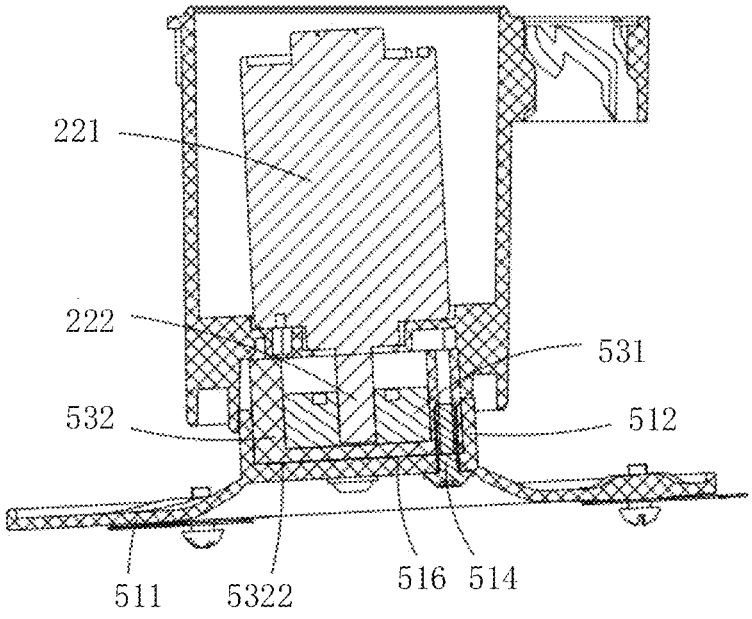
FIG. 24 is a cross-sectional view of the cutting blade in FIG. 19 when it abuts against a second mounting surface of the second connecting component.
Figure 25:
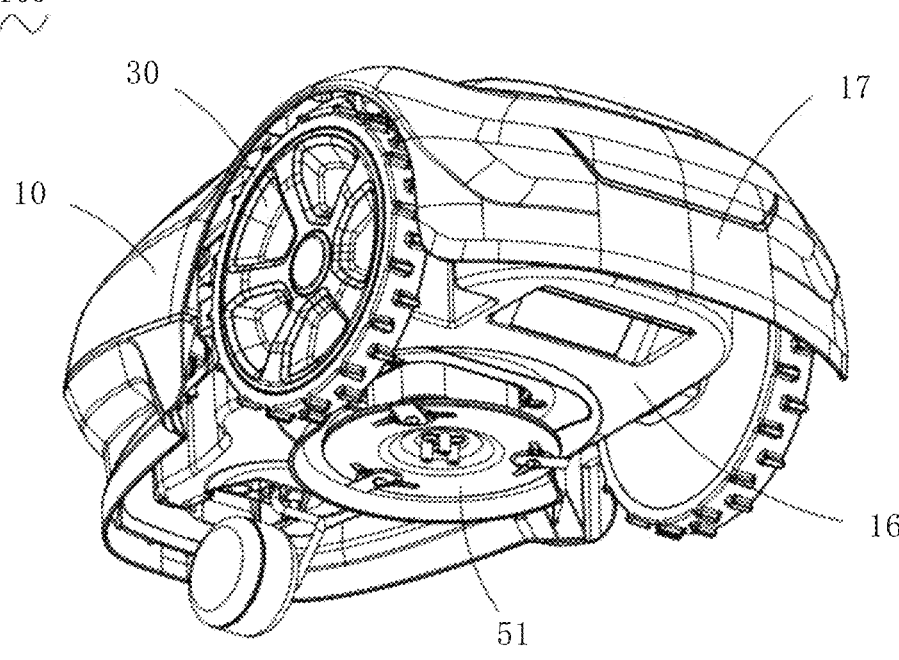
FIG. 25 is a perspective view of the outwork door tool according to a fifth embodiment of the disclosure.
Figure 26:
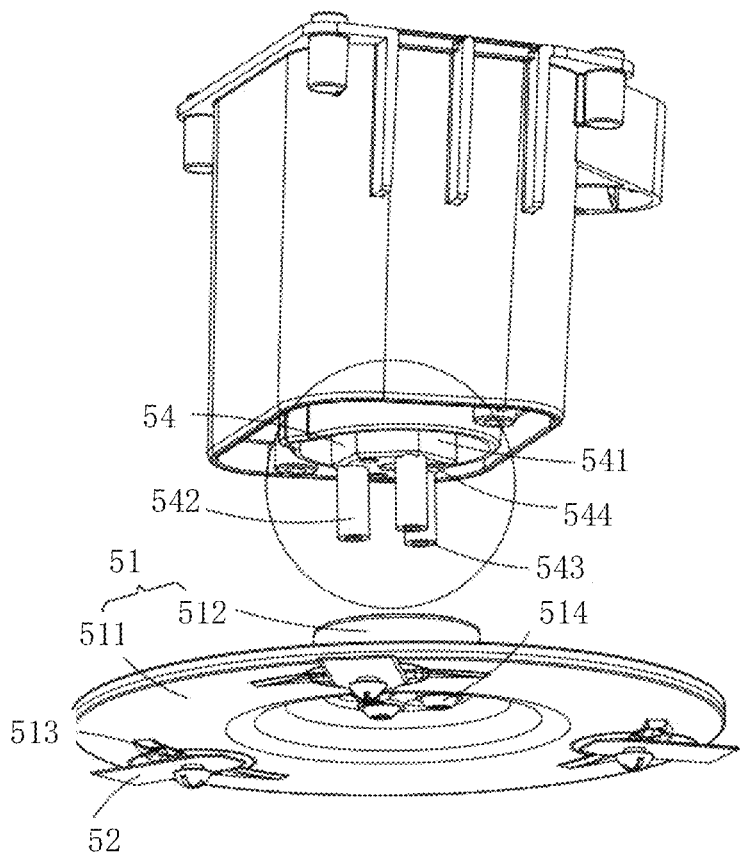
FIG. 26 is an exploded view of the motor, connecting component and cutting blade of the mower shown in FIG. 25.
Figure 27:
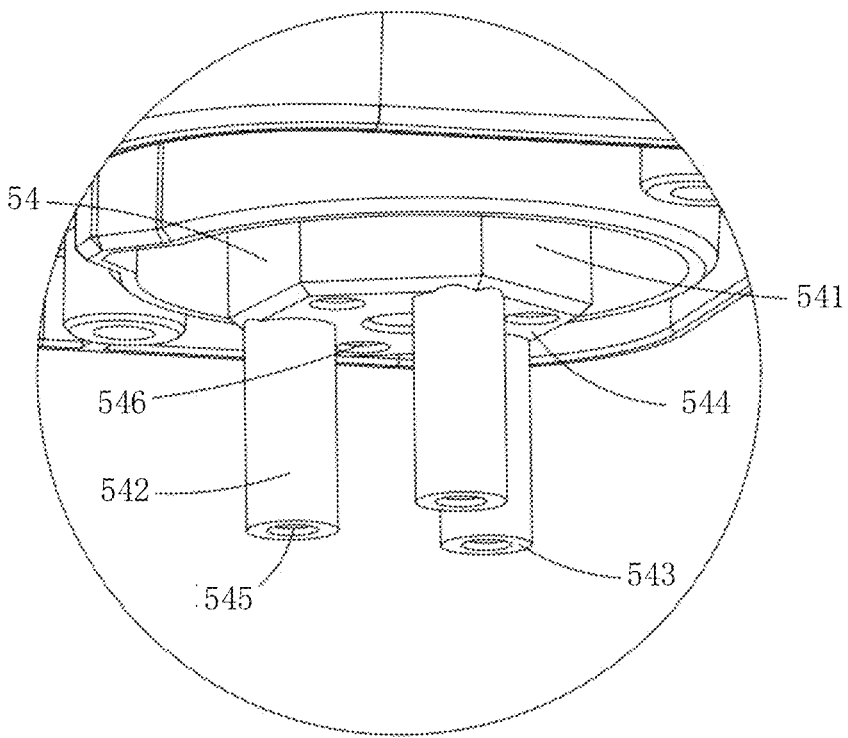
FIG. 27 is a partially enlarged view of a circled part in FIG. 26.

Please refer to FIG. 24. When the matching surface 516 of the cutting blade 51 abuts against the second mounting surface 5322 of the second connecting component 532, the lower surface of the first connecting member 531 contacts the docking surface 5325. At this time, the three fixing components 514 may also be used to respectively pass through the corresponding matching holes and the second mounting hole 5327 to assemble and fix the cutting blade 51 with the second connecting component 532. In this state, the second distance (approximately equal to a thickness of the second base 5324) between the lower surface of the motor 221 and the upper surface of the cutting blade base 511 is relatively small, and the mowing height is relatively low.

It may be seen that the disclosure provides a design which may increase or decrease a height of the cutting blade 51. Through adding the first connecting component 531 and the second connecting component 532 between the motor 221 and the cutting blade 51, the cutting blade 51 is fixed by using the two mounting surfaces on the second connecting component 532. And there is a certain height difference between these two mounting surfaces, and this height difference is exactly a height difference of mowing height, thereby when the cutting blade 51 is mounted and fixed with different mounting surfaces, a height position of cutting blade 51 is different, which just increases a range of mowing height.

Please refer to FIG. 25 through FIG. 29. In one embodiment of the disclosure, the robotic mower 100 includes the cutting blade 51, the motor 221 that drives the cutting blade 51 to rotate, a second connecting assembly 54 that connects the motor 221 with the cutting blade 51, and the tool body 10 that houses the motor 221.

The cutting blade 51 is provided with the matching surface 516 (second matching surface) assembled with the second connecting assembly 54, and the second connecting assembly 54 is provided with a third mounting surface 543 and a fourth mounting surface 544 abutting against the matching surface 516 of the cutting blade 51. The matching surface 516 abuts and fits with one of the third mounting surface 543 and the fourth mounting surface 544, so as to realize an assembly and fixation of the cutting blade 51 with the second connecting assembly 54. In this embodiment, the area of the matching surface 516 is less than or equal to an area of the third mounting surface 543, and the area of the third mounting surface 543 is equal to an area of the fourth mounting surface 544. In this way, when the matching surface 516 is matched with the third mounting surface 543 or the fourth mounting surface 544, there will be no interference which may cause difficulties to mount. Of course, in other embodiments, the areas of the matching surface 516, the third mounting surface 543 and the fourth mounting surface 544 may be designed according to actual needs, which is not limited here.

The cutting blade 51 includes the cutting blade base 511 and the protruding platform 512 protruding from a middle of the cutting blade base 511 to one side. The matching surface 516 is formed inside the protruding platform 512 and located on a top of the cutting blade base 511. The cutting blade 51 is further provided with a matching hole (not labeled), and the matching hole penetrate through the cutting blade base 511 and the protruding platform 512 at the same time, so that the fixing component 514 passes through the matching hole to assemble and fix the cutting blade 51 with the second connecting assembly 54. The side of the cutting blade base

511 away from the protruding platform 512 is provided with the blade mounting part 513, and there are several blade mounting parts 513 and they are evenly distributed on the cutting blade base 511. The robotic mower 100 further includes the blade 52, which is freely rotatably mounted on the blade mounting part 513 for mowing. The blade mounting part 513 is provided with the blade mounting hole (not shown), and screws, bolts, pins or rivets matched with the blade mounting hole to position the blade 52 on the blade mounting part 513.

The cutting blade 51 is driven to rotate by the motor 221 and drives the blade 52 mounted thereon to work, and the cutting blade 51 is a disc-shaped component. The shape of the cutting blade 51 is circular, and the circular cutting blade 51 rotates smoothly because of its uniform mass distribution. Of course, it may also be in a triangle-shaped, a square-shaped, etc. according to actual needs, which is not limited here.

The motor 221 is used to provide power for a rotation of the cutting blade 51, and the motor 221 is provided with the output shaft 222 for outputting power. One end of the second connecting assembly 54 is connected with the output shaft 222 and the other end is connected with the cutting blade 51 for transmitting the power output by the motor 221 to the cutting blade 51 and then driving the cutting blade 51 to rotate.

The second connecting assembly 54 includes a body part 541 assembled and fixed with the motor 221 and a protruding column 542 extending vertically downward from a bottom end of the body part 541. The third mounting surface 543 is located at a bottom end of the protruding column 542, and the fourth mounting surface 544 is located at the bottom end of the body part 541, so that a height difference is formed between the third mounting surface 543 and the fourth mounting surface 544. Therefore, when the matching surface 516 abuts against the third mounting surface 543, there is a third distance between the cutting blade 51 and the motor 221, when the matching surface 516 abuts against the fourth mounting surface 544, there is a fourth distance between the cutting blade 51 and the motor 221, and the third distance is greater than the fourth distance. In other words, there is a distance between the third mounting surface 543 and the fourth mounting surface 544, an existence of the distance enables the third distance not to be equal to the fourth distance, and increases the mowing height within a certain range.

In this embodiment, there are three protruding columns 542 that are evenly distributed on the bottom end of the body part 541. The third mounting surface 543 is composed of lower surfaces of the three protruding columns 542. The fourth mounting surface 544 is a lower surface of the body part 541. A height difference between the third mounting surface 543 and the fourth mounting surface 544 is substantially equal to a height of the protruding column 542.

A bottom of each protruding column 542 is provided with a third mounting hole 545 in an upward depression, so that when the matching surface 516 of the cutting blade 51 abuts against the third mounting surface 543, the fixing component 514 may be used to pass through the matching hole and the third mounting hole 545 to assemble and fix the cutting blade 51 with second connecting assembly 54. The fourth mounting surface 544 is provided with a fourth mounting hole 546, so that when the matching surface 516 of the cutting blade 51 abuts against the fourth mounting surface 544, the fixing component 514 may be used to pass through the matching hole and the fourth mounting hole 546 to assemble and fix the cutting blade 51 with the second connecting assembly 54. In this embodiment, the fixing component 514 is a screw, and the matching holes, the third mounting hole 545 and the fourth mounting hole 546 are correspondingly screw holes.

Figure 28:
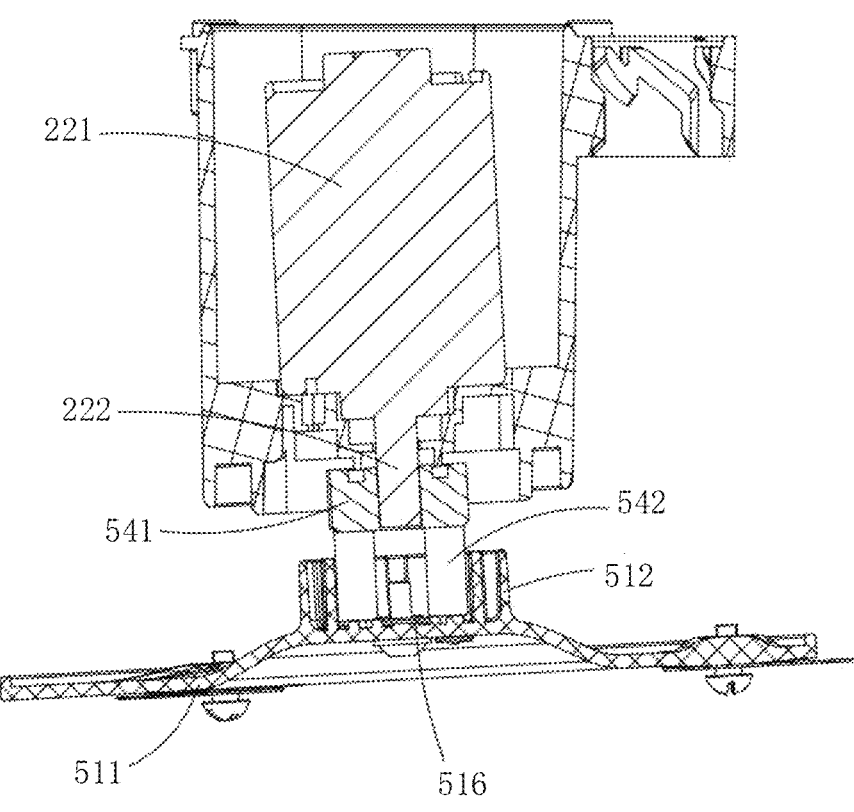
FIG. 28 is a cross-sectional view of the cutting blade in FIG. 26 when it is mounted on a third mounting surface of the connecting component.

Please refer to FIG. 28. When the matching surface 516 of the cutting blade 51 abuts against the third mounting surface 543 of the second connecting assembly 54, three fixing components 514 are used to respectively pass through the corresponding matching holes and the third mounting holes 545 to assemble and fix the cutting blade 51 with the second connecting assembly 54. At this time, the third distance between the lower surface of the motor 221 and the upper surface of the cutting blade base 511 (approximately equal to the height of the protruding column 542) is relatively large, and the mowing height is relatively high.

Figure 29:
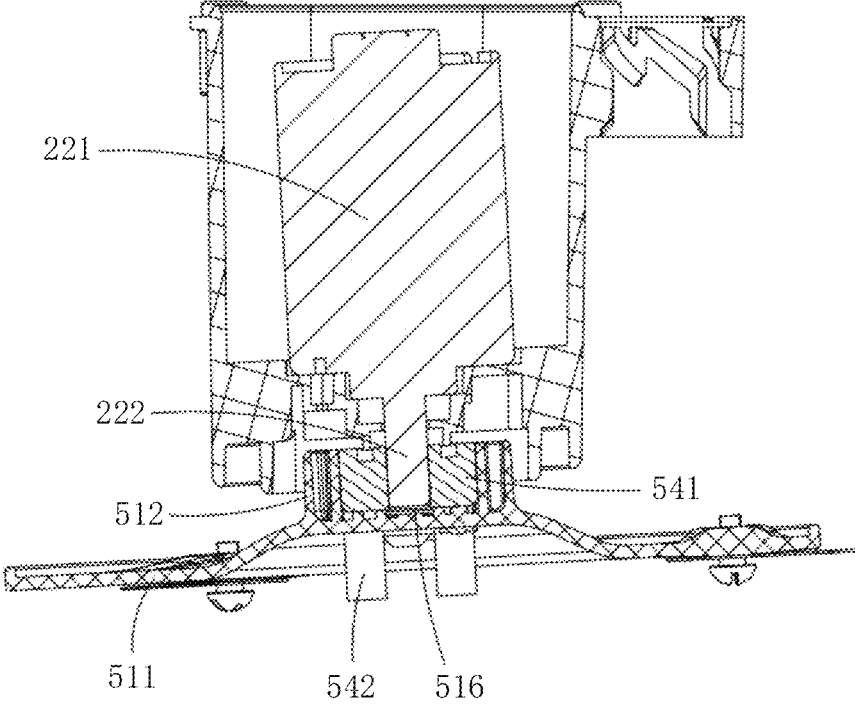
FIG. 29 is a cross-sectional view of the cutting blade in FIG. 26 when it is mounted on a fourth mounting surface of the connecting component.

Please refer to FIG. 29. When the matching surface 516 of the cutting blade 51 abuts against the fourth mounting surface 544 of the second connecting assembly 54, the three fixing components 514 may also be used to respectively pass through the corresponding matching holes and the fourth mounting hole 546 to assemble and fix the cutting blade 51 with the second connecting assembly 54. At this time, the three protruding columns 542 all pass through the cutting blade base 511 to reach a bottom of the cutting blade base 511, and the fourth distance (approximately equal to zero) between the lower surface of the motor 221 and the upper surface of the cutting blade base 511 is relatively small, and the mowing height is relatively low.

It may be seen that the disclosure provides the design which may increase or decrease a height of the cutting blade 51. Through adding the second connecting assembly 54 between the motor 221 and the cutting blade 51, the cutting blade 51 is fixed by using the two mounting surfaces on the second connecting assembly 54. And there is the certain height difference between these two mounting surfaces, and this height difference is exactly the height difference of mowing height, thereby when the cutting blade 51 is mounted and fixed with different mounting surfaces, a height position of cutting blade 51 is different, which just increases the range of mowing height.

Figure 30:
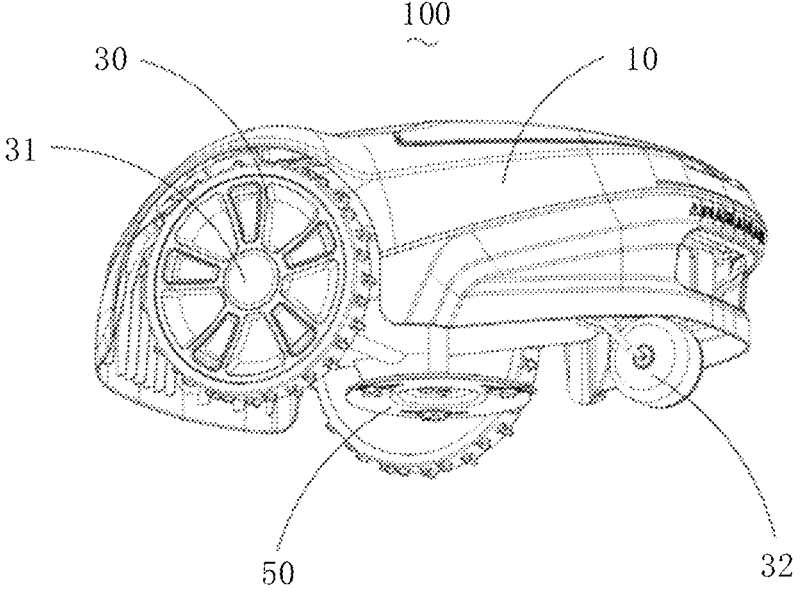
FIG. 30 is a schematic perspective view of the outwork door tool according to a sixth embodiment of the disclosure.
Figure 31:
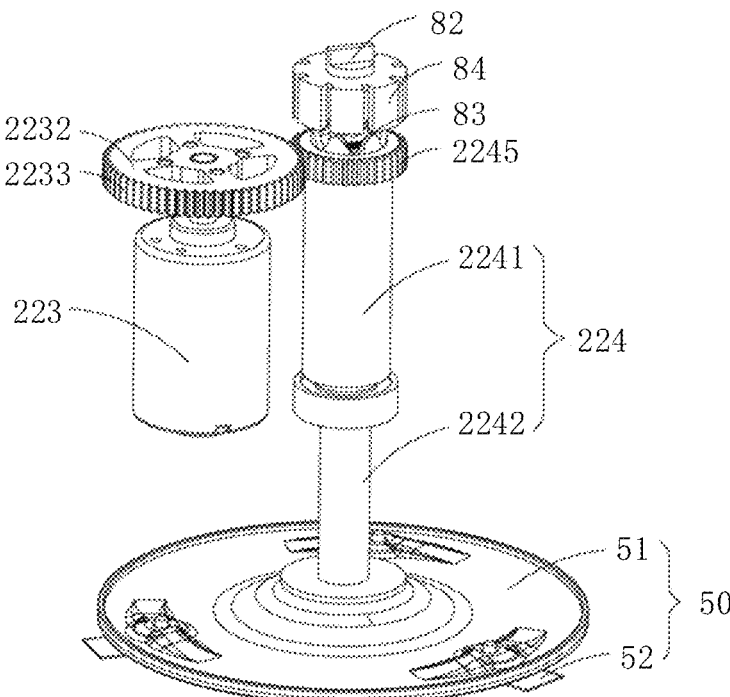
FIG. 31 is a schematic structural view of a driving assembly and a cutting assembly.

Please refer to FIG. 30 and FIG. 31. The disclosure provides the robotic mower 100, specifically the mower, including the tool body 10, a mowing device 50, a first drive assembly 22 for driving the mowing device 50, a height adjustment assembly 80 for adjusting a height of the mowing device 50 from the ground, and the walking device 30.

Please refer to FIG. 31. The mowing device 50 includes the cutting blade 51 and the blade 52 pivotally mounted on a periphery of the cutting blade 51. When the mowing device 50 is working, a plane where the blade 52 is located is a working plane.

Please refer to FIG. 31, FIG. 32, FIG. 33 and FIG. 34. The first driving assembly 22 includes a prime mover 223 fixedly mounted on the tool body 10 and a transmission mechanism 224 for transmitting power output by the prime mover 223 to the mowing device 50. The prime mover 223 may be an electric motor, a gasoline engine or the like. The prime mover 223 further includes an output shaft 2231 and an output wheel 2232 fixedly mounted on the output shaft 2231. The output wheel 2232 is provided with output gear teeth 2233. The transmission mechanism 224 includes a transmission rod 2241 matched with the prime mover 223 and a transmission shaft 2242 mounted on the transmission rod 2241 and rotatable driven by the transmission rod 2241. The transmission rod 2241 is in a hollow cylindrical shape, and a through groove 2243 penetrating through the transmission rod 2241 along an axial direction of the transmission shaft

2242 is arranged on the transmission rod 2241. A guiding rail 2244 arranged along an axial direction of the transmission rod 2241 is arranged on a side wall of the through groove 2243. In this embodiment, the number of the guiding rails 2244 is four, but in other embodiments, the number of the guiding rails 2244 may be set as required. An end of the transmission rod 2241 away from the transmission shaft 2242 is further provided with a transmission wheel 2245 matched with the output wheel 2232, so that the transmission rod 2241 is driven to rotate through a matching of the output wheel 2232 and the transmission wheel 2245. The transmission wheel 2245 is provided with transmission wheel teeth 2246 engaged with the output teeth 2233. In this embodiment, the output wheel 2232 and the transmission wheel 2245 transmit power through the output teeth 2233 and the transmission wheel teeth 2246, but in other embodiments, the output wheel 2232 and the transmission wheel 2245 may also transmit ower through a belt. A side of the transmission wheel 2245 facing away from the transmission shaft 2242 is provided with a first locking tooth 2247, and a side facing the transmission shaft 2242 is provided with a first matching tooth 2248.

Figure 32:
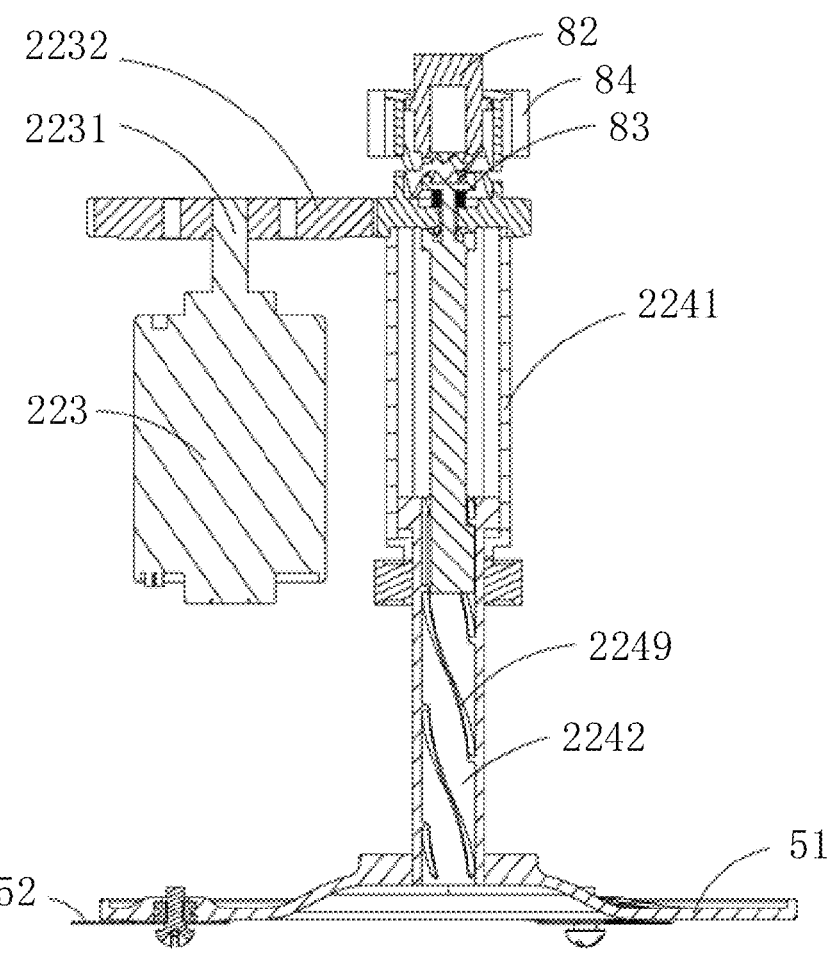
FIG. 32 is a cross-sectional view of the driving assembly and the cutting assembly shown in FIG. 31 after matching.
Figure 33:
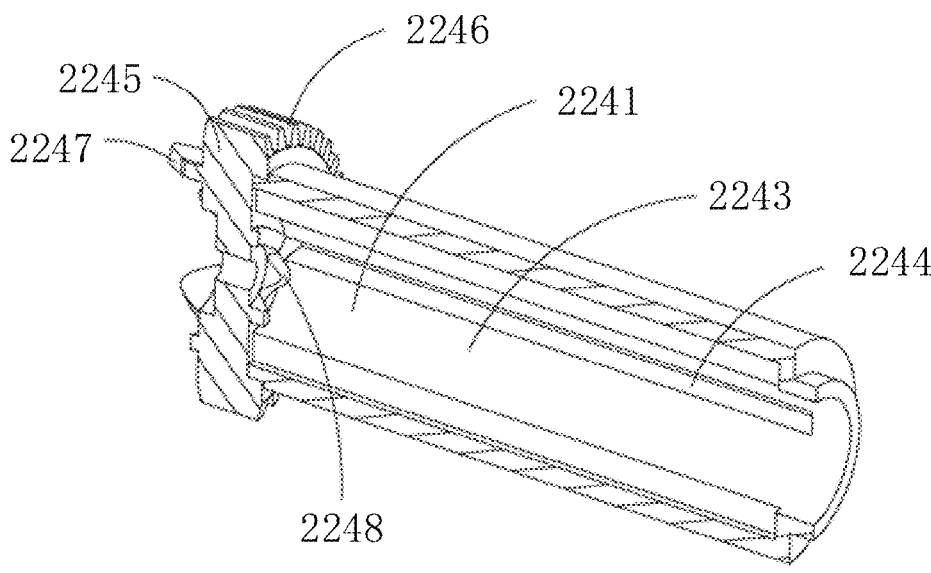
FIG. 33 is a sectional view of a transmission rod.
Figure 34:
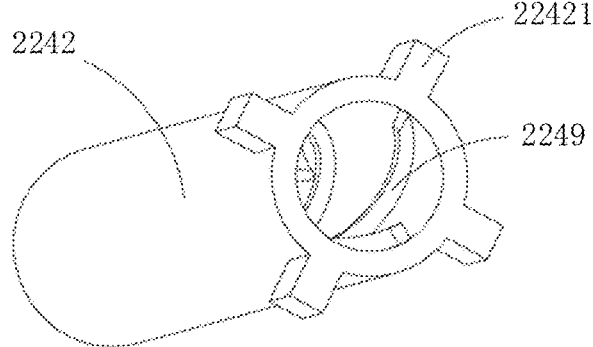
FIG. 34 is a schematic perspective view of a transmission shaft.
Figure 35:
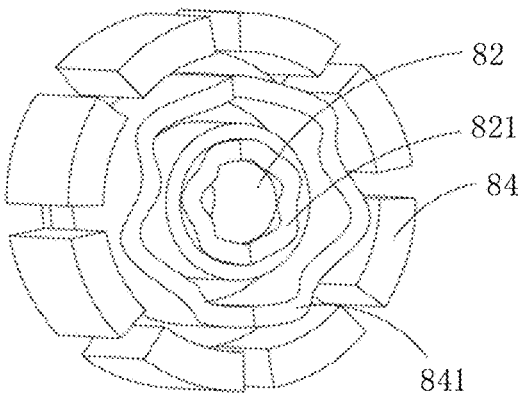
FIG. 35 is a schematic view of a matching of a height adjustment knob and a locking knob.
Figure 36:
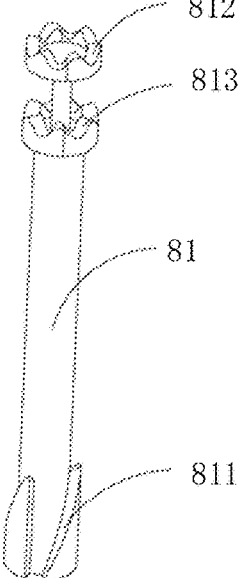
FIG. 36 is a perspective structural schematic view of a height adjustment rod.
Figure 37:
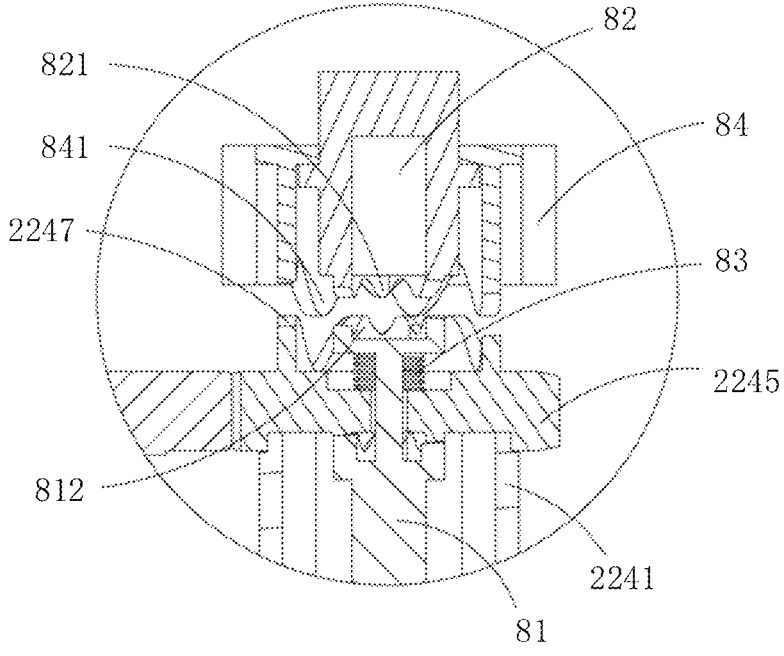
FIG. 37 is a partially enlarged view of FIG. 32.

Please refer to FIG. 32 and FIG. 34. The transmission shaft 2242 may slide along the transmission rod 2241 in the axial direction of the transmission shaft 2242, and the mowing device 50 is fixedly mounted on an end of the transmission shaft 2242 away from the transmission rod 2241. The transmission shaft 2242 is roughly in a shape of a hollow cylinder, and its inner wall is provided with an internal height adjustment thread 2249. An outer wall of the transmission shaft 2242 is provided with a guiding part 22421 matched with the guiding rail 2244 to guide the transmission shaft 2242 to slide along the guiding rail 2244. In this embodiment, the guiding rail 2244 is a depression groove, and the guiding part 22421 is a protrusion matched with the depression groove. However, in other embodiments, the guiding rail 2244 may also be a protrusion, and the guiding part 22421 may also be a depression groove matched with the protrusion.

In this embodiment, the guiding rail 2244 is arranged on an inner wall of the transmission rod 2241, and the transmission shaft 2242 is at least partly located inside the transmission rod 2241. But it may be understood that, in other embodiments, the guiding rail 2244 may also be arranged on an outer wall of the transmission rod 2241, at this time, the guiding part 22421 is arranged on the inner wall of the transmission shaft 2242, and the transmission rod 2241 is at least partly located inside the transmission shaft 2242.

Please refer to FIG. 31, FIG. 32, FIG. 35 and FIG. 36. The height adjustment assembly 80 is used to drive the mowing device 50 to move in a direction perpendicular to the working plane (which means the axial direction of the transmission shaft 2242), so as to adjust the ground a distance of the mowing device 50 from the ground. The height adjustment assembly 80 has a height adjustment rod 81, a height adjustment knob 82, a first elastic component (not shown), a second elastic component 83 and a locking knob 84. The height adjustment rod 81 may drive the transmission shaft 2242 to slide along the transmission rod 2241, and the height adjustment knob 82 may drive the height adjustment rod 81 to rotate. The first elastic component is matched with the height adjustment knob 82, the second elastic component 83 is matched with the height adjustment rod 81, and the locking knob 84 is matched with the transmission wheel 2245. One end of the height adjustment rod 81 is matched with the transmission shaft 2242, and the other end of the height adjustment rod 81 passes through the through groove 2243 and protrudes out of the through groove 2243 to be matched with the height adjustment knob 82. One end of the height adjustment rod 81 close to the transmission shaft 2242 is provided with an external height adjustment thread 811 matched with the internal height adjustment thread 2249, so that the driving shaft 2242 is driven to move along the guiding rail 2244 through a matching of the internal height adjustment thread 2249 and the external height-adjustment thread 811, which adjusts the distance of the mowing device 50 from the ground. One end of the height adjustment rod 81 away from the external height adjustment thread 811 is further provided with a first driving tooth 812 and a second matching tooth 813, and the first driving tooth 812 and the second matching tooth 813 are located on both sides of the transmission wheel 2245. The height adjustment knob 82 is slidably mounted on the tool body 10 and may slide along the axial direction of the height adjustment rod 81. A side of the height adjustment knob 82 facing the height adjustment rod 81 is provided with a second driving tooth 821 matched with the first driving tooth 812. One end of the first elastic component is mounted on the tool body 10, and the other end of the first elastic component is mounted on the height adjustment knob 82, so that the height adjustment knob 82 is reset. The second elastic component 83 is located between the transmission wheel 2245 and the second matching tooth 813. The locking knob 84 is provided with a second locking tooth 841 matched with the first locking tooth 2247 to lock the transmission wheel 2245. The locking knob 84 is provided with a housing groove 842 for housing the height adjustment knob 82, and the locking knob 84 and the height adjustment knob 82 are coaxial.

When adjusting the distance of the mowing device 50 from the ground, which means the mowing height of the mowing device 50, first the height adjustment knob 82 and the locking knob 84 are pushed in a direction of the height adjustment rod 81, so that the height adjustment knob 82 slides toward the height adjustment rod 81 and abuts against the height adjustment rod 81, and the locking knob 84 abuts against the transmission wheel 2245. At this time, the height adjustment knob 82 and the locking knob 84 are in a first state, the first elastic component and the second elastic component 83 are elastically deformed, the first driving tooth 812 and the second driving tooth 821 are engaged with each other, the first locking tooth 2247 and the second locking tooth 841 are engaged with each other to lock the transmission wheel 2245, and the first matching tooth 2248 and the second matching tooth 813 are disengaged. Since the locking knob 84 may not rotate, the transmission wheel 2245 may not rotate when the first locking tooth 2247 and the second locking tooth 841 are engaged. And since the first matching tooth 2248 and the second matching tooth 813 are disengaged, the height adjustment rod 81 may be rotated under a driving of the height adjustment knob 82, so that the transmission shaft 2242 is driven to slide along the transmission rod 2241 through a matching of the internal height adjustment thread 2249 and the external height adjustment thread 811, which then adjusts the height of the mowing device 50 from the ground. When the height adjustment knob 82 and the locking knob 84 are loosened, the height adjustment knob 82 and the locking knob 84 reset under an action of the first elastic component. At this time, the height adjustment knob 82 and the locking knob 84 are in a second state, the first driving tooth 812 and the second driving tooth 821 are disengaged, the first locking tooth 2247 and the second locking tooth 841 are disengaged to unlock the transmission wheel 2245, and the second elastic component 83 is reset, so that the first matching teeth 2248 and the second matching teeth 813 are engaged with each other. Since the first matching tooth 2248 and the second matching tooth 813 are engaged with each other, the height adjustment rod 81 may rotate under a driving of the transmission wheel 2245.

In this embodiment, the second elastic component 83 is arranged between the first driving tooth 812 and the driving wheel 2245. However, in other embodiments, the second elastic component 83 may also be arranged between the transmission wheel 2245 and the first matching tooth 2248, and at this time, the second elastic component 83 is a tension spring. It will of course be understood that in other embodiments the second elastic component 83 may also be arranged on a side of the first matching tooth 2248 away from the first driving tooth 812. At this time, one end of the second elastic component 83 is mounted on the height adjustment rod 81 and the other end of the second elastic component 83 is mounted on the transmission rod 2241.

In other embodiments, the outer wall of the transmission shaft 2242 may further be provided with an external height adjustment thread (not shown). At this time, the height adjustment assembly 80 includes an adjustment sleeve (not shown). The adjustment sleeve is fixedly mounted at one end of the transmission rod 2241 near the transmission shaft 2242, and an internal wall of the adjustment sleeve is provided with an internal height adjustment thread matched with the external height adjustment thread of the transmission shaft 2242, so that the transmission shaft 2242 is driven to move along the guiding rail 2244 by a matching of the outer height adjustment thread and the internal height adjustment thread, which adjusts the distance of the mowing device 50 from the ground.

It should be understood that in other embodiments the transmission mechanism 224 may further include a bearing (not shown) fixedly mounted on the transmission shaft 2242 and a bearing base (not shown) mounted on the tool body 10 and matched with the bearing. The tool body 10 is provided with a travelling groove (not shown) matched with the bearing base. The height adjustment assembly 80 drives the bearing base to move along the travelling groove so as to drive the transmission shaft 2242 to move along the guiding rail 2244 to adjust the distance of the mowing device 50 from the ground.

Of course, it should be understood that in other embodiments the transmission mechanism 224 may also be a worm gear (not shown) which is matched with the prime mover 223 and a worm (not shown) matched with the worm gear, and an end of the worm facing away from the worm gear is provided with the mowing device 50. In the embodiment, the worm is driven by a worm to rotate in order to drive the mowing device 50 to work. When adjusting the distance of the mowing device 50 from the ground, the worm is driven to move in a direction perpendicular to the working plane by the height adjustment assembly 80.

Compared with the conventional art, the robotic mower 100 of the disclosure directly adjusts the distance of the mowing device 50 from the ground through the height adjustment assembly 80 without adjusting a position of the heavy motor, thereby reducing a bearing capacity of the height adjustment assembly 80 and enabling the height adjustment assembly 80 not easy to be damaged.

Figure 38:
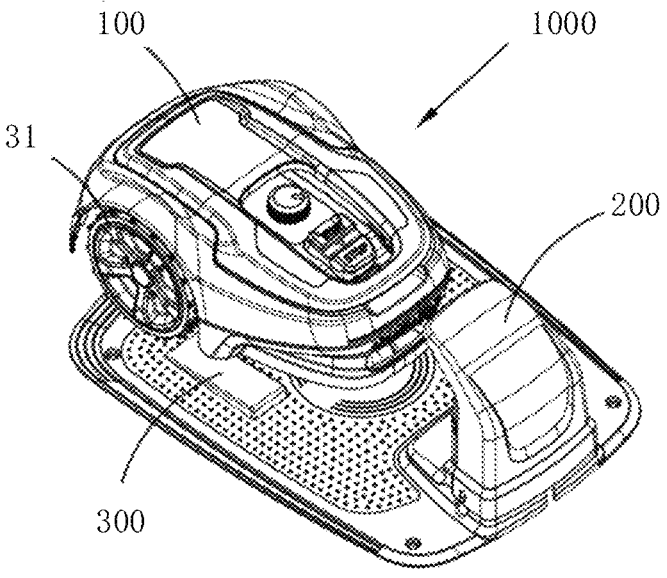
FIG. 38 is a perspective view of the garden tool of the disclosure.

Please refer to FIG. 38. An electric tool 1000 system includes the robotic mower 100 and the charging station 200. The charging station 200 is provided with an anti-theft alarm system 300.

Figure 39:
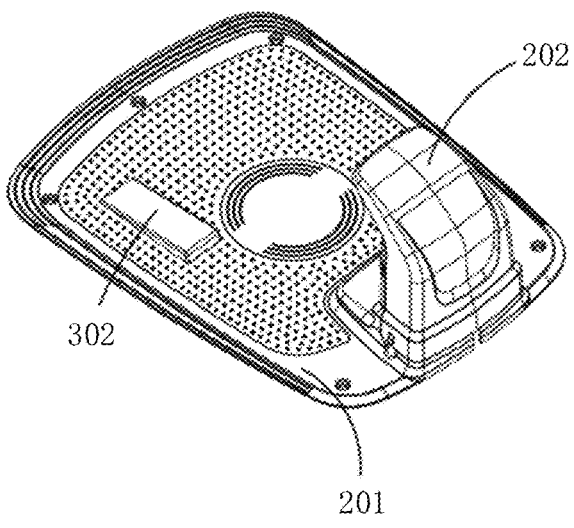
FIG. 39 is a perspective view of a charging control terminal of the garden tool of the disclosure.
Figure 40:
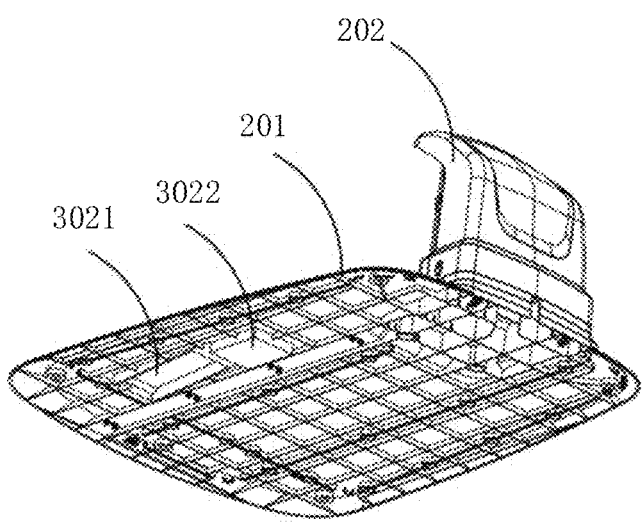
FIG. 40 is a perspective view from another angle of the charging control terminal shown in FIG. 39.

Please refer to FIG. 38 through FIG. 40. The charging station 200 includes a bottom plate 201 and a charging center 202 arranged on the bottom plate. When the robotic mower 100 enters the charging station 200 and charges, an area in which the driving wheel 31 is located is defined as a sensing area, and a sensing device 302 is arranged at a position of the sensing area. The sensing device 302 includes a movable part 3021 and a sensor 3022. The movable part 3021 is movably mounted on the bottom plate 201. When the movable part 3021 is subjected to an external force, there is a relative movement between the movable part 3021 and the bottom plate 201. At this time, the sensor 3022 senses the relative movement between the movable part 3021 and the bottom plate 201 and transmits a sensed signal to the anti-theft alarm system 300. In this embodiment, the movable part 3021 is a rotatable part 3021 pivoted on the bottom plate 201 by a pin connecting shaft 3023. The rotatable part 3021 may rotate clockwise or counterclockwise with respect to the pin connecting shaft 3023.

Figure 41:
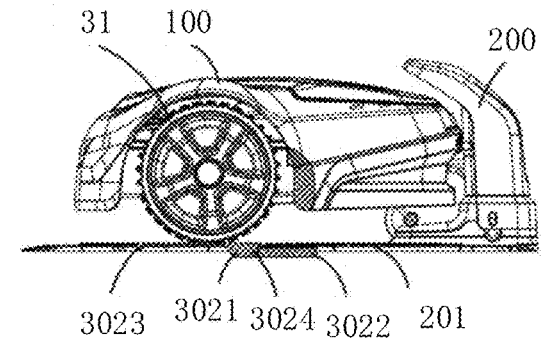
FIG. 41 is a schematic view of the garden tool shown in FIG. 38 driving into the charging control terminal.
Figure 42:
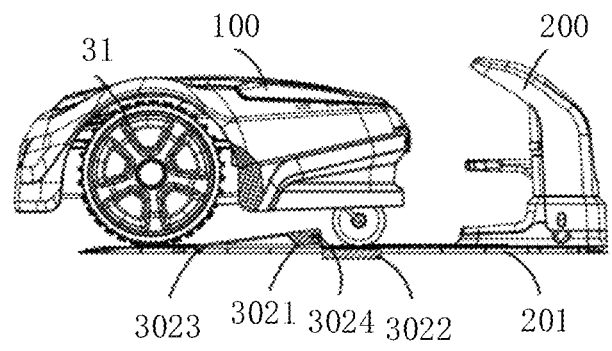
FIG. 42 is a schematic view of the garden tool shown in FIG. 38 exiting the charging control terminal.
Figure 43:
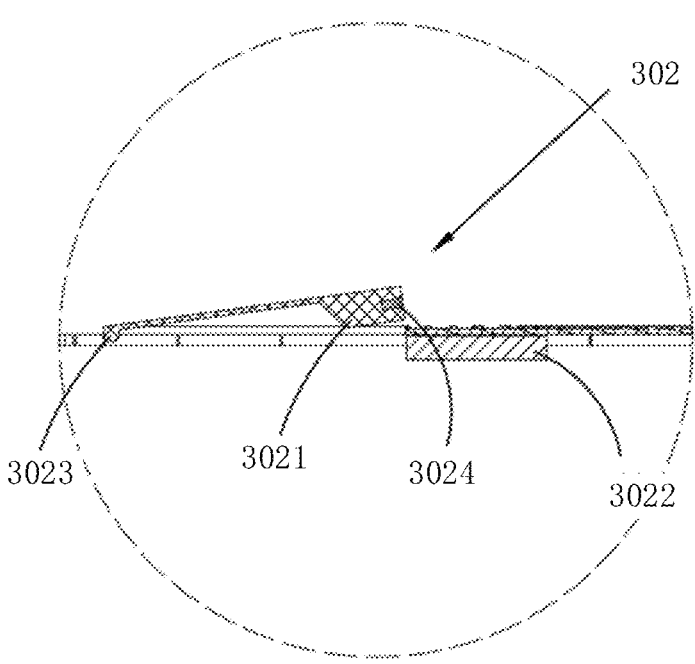
FIG. 43 is a partial enlarged view of the charging control terminal.
Figure 44:
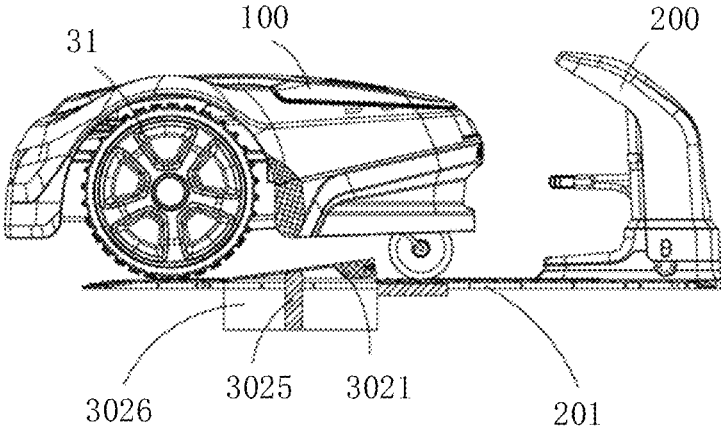
FIG. 44 is a schematic view of a matching between the garden tool and the charging control terminal of the disclosure.

Please refer to FIG. 41. When the robotic mower 100 enters the charging station 200, the driving wheel 31 rolls the rotatable part 3021, and the rotatable part 3021 rotates clockwise around the pin connecting shaft 3023. Please refer to FIG. 42. When the robotic mower 100 leaves the charging station 200, the driving wheel 31 leaves the sensing area. At this time, the rotatable part 3021 rotates counterclockwise around the pin connecting shaft 3023 and returns to an initial position. A spring-back operation of the rotatable part 3021 may be achieved by an elastic component such as a spring. In particular, please refer to FIG. 43, a sensing component 3024 is embedded in the rotatable part 3021, and the sensing component 3024 and the sensor 3022 are matched with each other to transmit a sensing signal to the anti-theft alarm system 300. Of course, it should be understood that in other embodiments the movable part 3021 may also be of other structures. For example, please refer to FIG. 44, the movable part 3021 may be mounted on the bottom plate 201 through a third elastic component 3025. When the driving wheel 31 rolls the movable part 3021, the third elastic component 3025 is elastically deformed, and the movable part 3021 enters a housing cavity 3026. When the driving wheel 31 leaves the movable part 3021, the movable part 3021 is reset under an action of the third elastic component 3025.

Figures 45, 46:
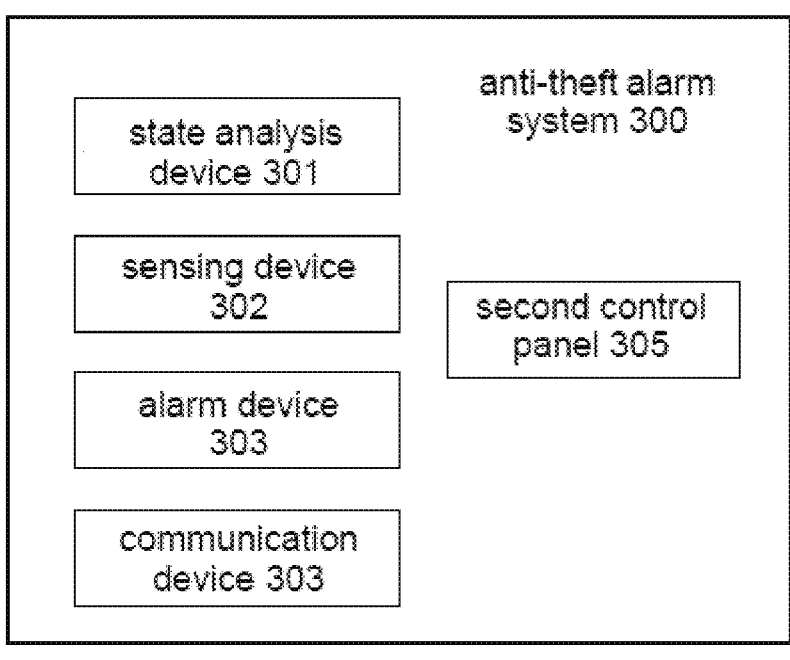
FIG. 45 is a structural schematic view of an anti-theft alarm system of the disclosure.
FIG. 46 is a logic control view when the anti-theft alarm system of the disclosure works.

Please refer to FIG. 45. The anti-theft alarm system 300 of the electric tool the disclosure includes a state analysis device 301 for judging a current state of the robotic mower 100, the sensing device 302 for monitoring whether the electric tool is located at the charging station 200, an alarm device 303 for alarming, a communication device 304 for transferring signals between devices, and a second control panel 305. As mentioned above, the sensing device 302 is arranged on the charging station 200. When the sensing device 302 detects that the robotic mower 100 is located at the charging station 200 and the current state of the robotic mower 100 is in a non-working state, the second control panel 305 will control the alarm device 303 to be in a standby state. When the sensing device 302 detects that the robotic mower 100 leaves the charging station 200 and the current state of the robotic mower 100 is in the working state, the second control panel 305 controls the alarm device 303 to be in the standby state. When the sensing device 302 detects that the robotic mower 100 leaves the charging station 200 and the current state of the robotic mower 100 is in a non-working state, the second control panel 305 controls the alarm device 303 to give an alarm.

The following describes a working process of the anti-theft alarm system 300 in conjunction with a logic control diagram shown in FIG. 46.

In this embodiment, the second control panel 305 first sets the non-working state including charging and charging end (a power of the charging control terminal is turned off). Setting the working state means that the robotic mower 100 moves in the working area and performs working tasks. In the working state, the second control panel 305 maintains signal connection with the sensing device 302 and the alarm device 303, and controls the alarm device 303 to be in a standby state. In the non-working state, the second control panel 305 confirms whether the robotic mower 100 is located at the charging station 200 through the sensing device 302. If the robotic mower 100 is in the charging station 200, at this moment, the sensing device 302 is triggered, and the second control panel 305 controls the alarm device 303 to remain in the standby state. If the robotic mower 100 is not in the charging station 200, the sensing device 302 is not triggered at this time, and the second control panel 305 sends an alarm signal to the alarm device 303 to start the alarm. It should be noted that a triggering of the sensing device 302 herein means that the robotic mower 100 is detected to be in the sensing area of the charging station 200. In other embodiments, the sensing device 302 may also be designed to work in reverse. However, no matter whether the triggering starts when the robotic mower 100 drives into the charging station 200 or leaves the charging station 200, its core idea remains unchanged.

In combination with the above description, the anti-theft alarm method of the electric tool 1000 of the disclosure includes the following operations:

determining the current state of the robotic mower 100 through the state analysis device 301 of the anti-theft alarm system 300, the current state including the working state and the non-working state;

the alarm device entering a dormant state if the current state is the working state;

the alarm device entering the standby state if the current state is the non-working state;

during a standby process, determining a current position of the robotic mower 100 by the sensing device of the anti-theft alarm system 300, and when it is detected that the robotic mower 100 is located at the charging station 200, the alarm device continuing to maintain the standby state;

when detecting the robotic mower 100 leaves the charging station 200, the second control board 305 transmitting a control signal to the alarm device 303 to start the alarm.

It should be noted that, in different embodiments, the anti-theft alarm system 300 may be activated during a whole process of using the robotic mower 100, which means that the anti-theft alarm system 300 is always in the working state, it may also be activated after the robotic mower 100 drives into the charging station 200, which means that the anti-theft alarm system 300 protects the electric tool during a charging process. In any way, a core idea of the anti-theft alarm process of the disclosure has not changed. The disclosure provides the anti-theft alarm system in the electric tool, so that a safety of the electric tool is significantly increased when it is used outdoors.

It should be noted that a technical solution for controlling the alarm device 303 in this embodiment may also be applied to the robotic mower 100 in other embodiments of the disclosure.

Figure 47:
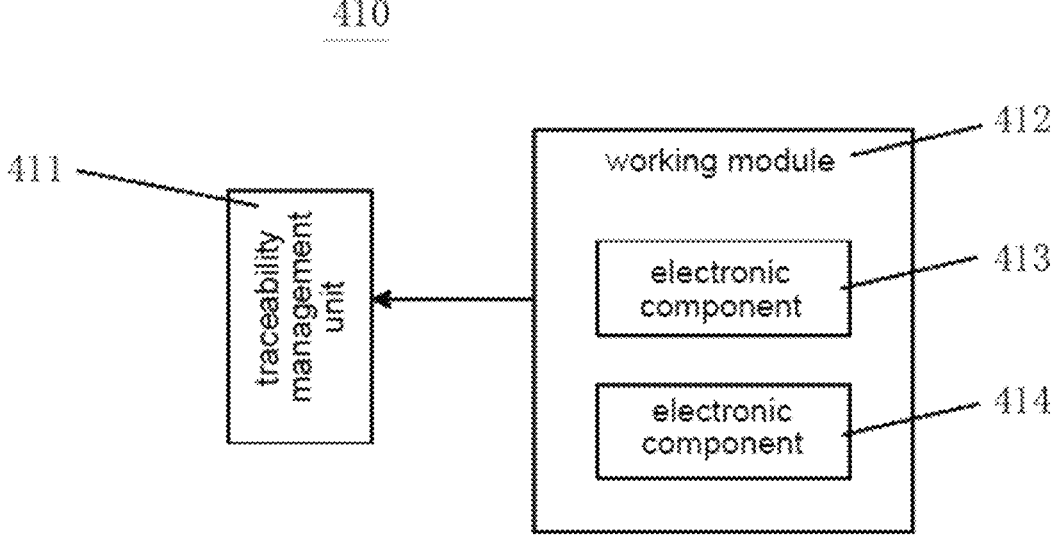
FIG. 47 is a schematic view of an information traceability system in a specific embodiment of the disclosure.

Please refer to FIG. 47, which is an information traceability system 410 according to a specific embodiment of the disclosure. The information traceability system 410 is applied in the robotic mower 100 to monitor a maintenance and usage of each electrical component in the robotic mower 100. The information traceability system 410 includes a working module 412 and a traceability management unit 411. The working module 412 includes an electronic component 413 and an electronic component 414, each electronic component 413 and 414 is provided with initial information data. The traceability management unit 411 is connected with the working module 412 by signal, records working information data of each electronic component 413 and 414, and the traceability management unit 411 obtains the initial information data of each electronic component 413 and 414. The traceability management unit 411 monitors a running state and maintenance state of the robotic mower 100 according to the initial information data and the working information data of each electronic component 413 and 414. Wherein, the initial information data includes factory code, factory time, factory state, factory information or initial version information. The working information data includes working running data, update version information, update time information or working status information.

Figure 48:
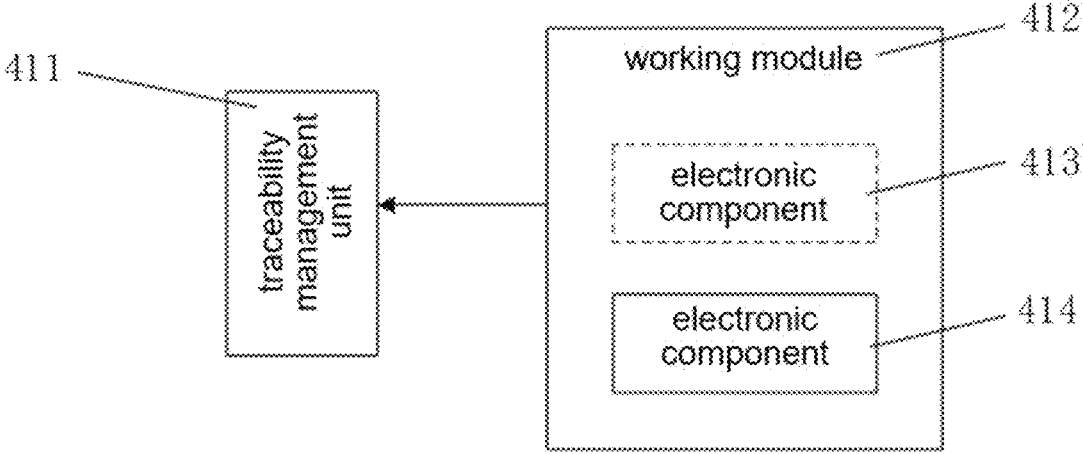
FIG. 48 is a schematic view of the information traceability system after electronic components are replaced in a specific embodiment of the disclosure.

Please refer to FIG. 48. when the electronic component 413 in the working module 412 in the information traceability system 410 is replaced with an electronic component 413', the traceability management unit 411 obtains initial information data of the replaced electronic component 413', replaces the initial information data of the electronic component 413 before the replacement, and records working information data of the electronic component 413' after the replacement, so as to monitor the running state and maintenance state of the robotic mower 100 after maintenance.

Generally, when the electronic component 413 is replaced, the information data of the replaced electronic component 413' cannot be continuously monitored and traced, thereby increasing a maintenance difficulty of the robotic mower 100 after maintenance. In this disclosure, the initial information data and working information data of the replaced electronic component 413' are continuously recorded and stored, so that the running state and maintenance state of a repaired robotic mower 100 can be well monitored, and a quality of after-sales service is improved, which improves the user's experience.

Figure 49:
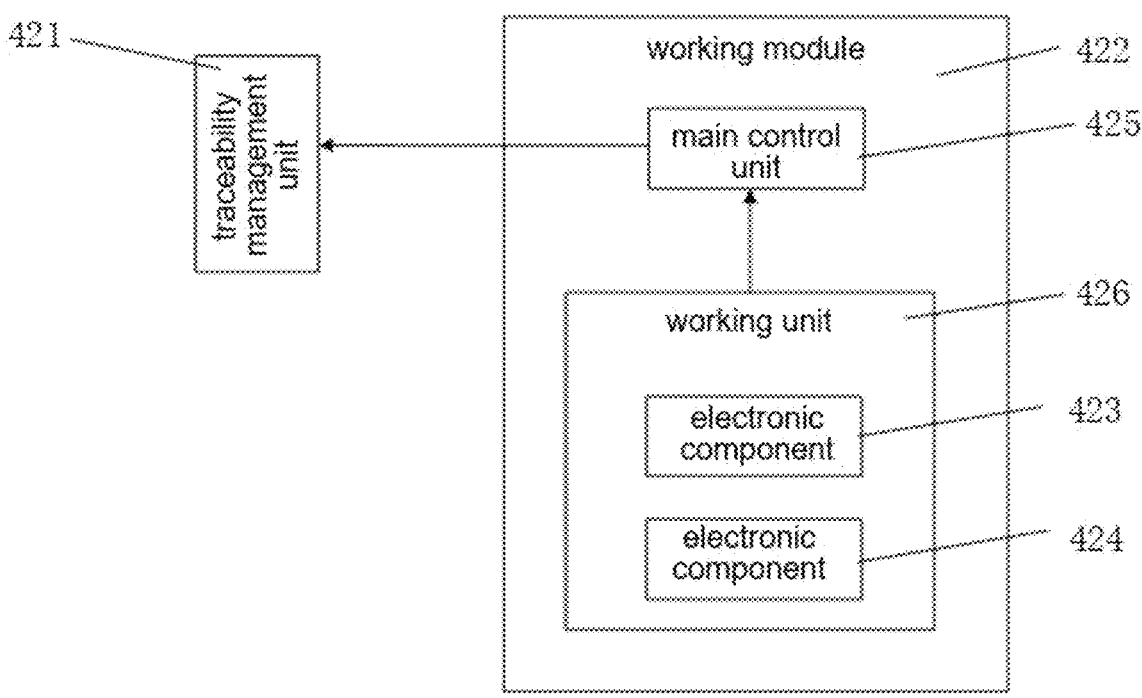
FIG. 49 is a schematic view of the information traceability system in another specific embodiment of the disclosure.

Please refer to FIG. 49, which is an information traceability system 420 of another specific embodiment of the disclosure. The information traceability system 420 is applied in the robotic mower 100 to monitor the maintenance and usage of each electrical component in the robotic mower 100. The information traceability system 420 includes a working module 422 and a traceability management unit 421. The working module 422 includes an electronic component 423 and an electronic component 424 with initial information data. The traceability management unit 421 is connected with the working module 422 by signal, records working information data of each electronic component 423 and 424, and the traceability management unit 421 obtains the initial information data of each electronic component 423 and 424. The traceability management unit 421 monitors the running state and maintenance state of the robotic mower 100 according to the initial information data and the working information data.

Wherein, the working module 422 includes a main control unit 425 and a working unit 426, and the working unit 426 includes the electronic component 423 and an electronic component 424. The main control unit 425 is connected with the working unit 426, and the main control unit 425 is configured to obtain the initial information data of each electronic component 423 and 424 in the working unit 426, and the main control unit 425 is further configured to record the working information data of each electronic components 423 and 424 in the working unit 426. The traceability management unit 421 is connected with the main control unit 425 by signal, and is used to receive the initial information data and working information data of the electronic components 423 and 424 transmitted by the main control unit 425, so as to monitor the running state and maintenance state of the robotic mower 100. In this embodiment, the main control unit 425 uniformly reads and records the initial information data and working information data of each electronic component in all working units, which facilitates a management of each working unit.

Figure 50:
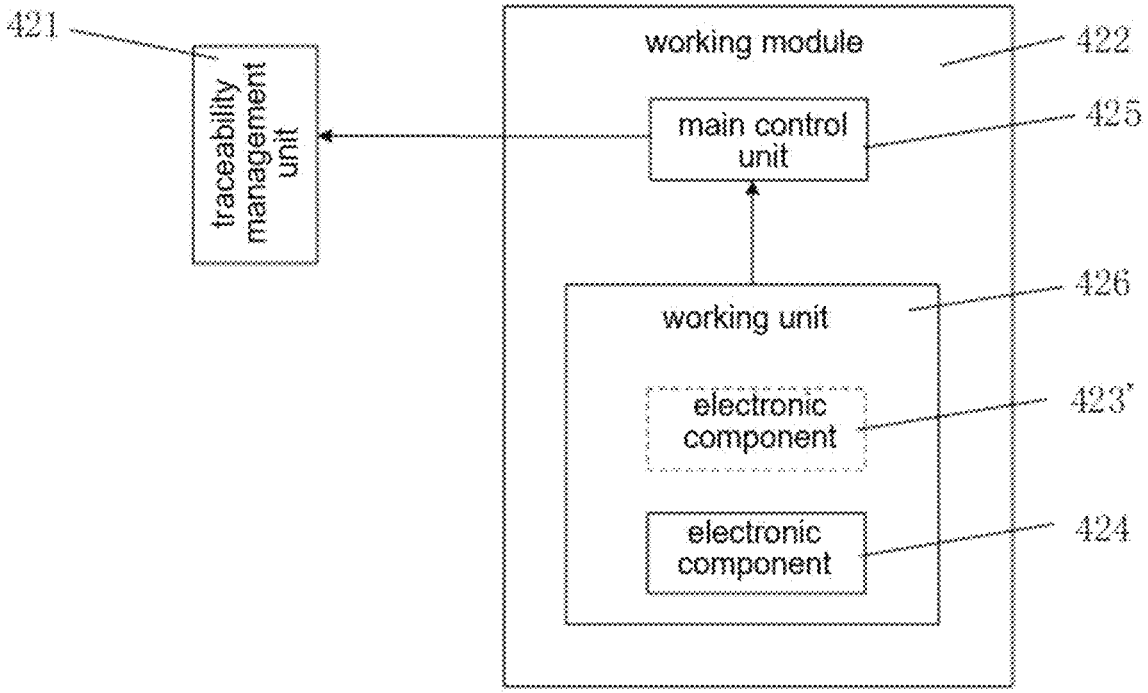
FIG. 50 is a schematic view of the information traceability system after electronic components are replaced in another specific embodiment of the disclosure.

Please refer to FIG. 50. When the electronic component 423 in the working unit 426 in the working module 422 is replaced with an electronic component 423', the traceability management unit 421 obtains the initial information data of the replaced electronic component 423' through the main control unit 425, replaces the initial information data of the electronic component 423 before the replacement, and records the working information data of the electronic component 423' after the replacement, so as to monitor the running state and maintenance state of the robotic mower 100 after maintenance.

Generally, when the electronic component 423 is replaced, the information data of the replaced electronic component 423' cannot be continuously monitored and traced, thereby increasing the maintenance difficulty of the robotic mower 100 after maintenance. In this disclosure, the initial information data and working information data of the replaced electronic component 423' are continuously recorded and stored, so that the working state and maintenance state of a repaired robotic mower 100 can be well monitored, and a quality of after-sales service is improved, which improves the user's experience.

Figure 51:
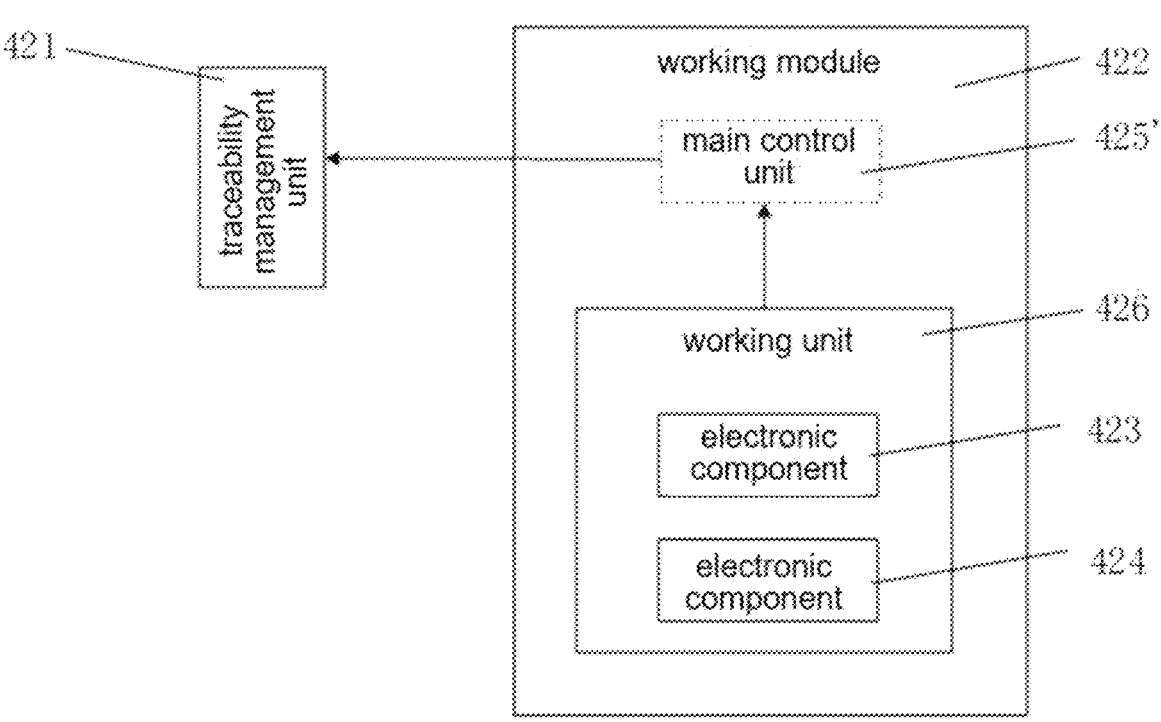
FIG. 51 is a schematic view of the information traceability system after replacing a main control unit in another specific embodiment of the disclosure.

Please refer to FIG. 51. After the main control unit 425 in the working module 422 is replaced by a main control unit 425', the traceability management unit 421 obtains the initial information data of the replaced main control unit 425', replaces the initial information data of the main control unit 425 before the replacement, and records the working information data of the main control unit 425' after the replacement, so as to monitor the running state and maintenance state of the robotic mower 100 after maintenance.

In this embodiment, even after the main control unit 425 is replaced, the traceability management unit 421 can still obtain and record the initial information data and working information data of each electronic component 423 and 424 in the working unit 426. And the initial information data and working information data of the main control unit 425' after replacement can be recorded, so that the working state and maintenance state of a repaired robotic mower 100 can be well monitored, and a quality of after-sales service is improved, which improves the user's experience.

Further, the replaced main control unit 425' reads the initial information data of each electronic component 423 and 424 in the working unit 426, and records the working information data of each electronic component 423 and 424, so as to monitor the running state and maintenance state of the robotic mower 100 after maintenance.

Figure 52:
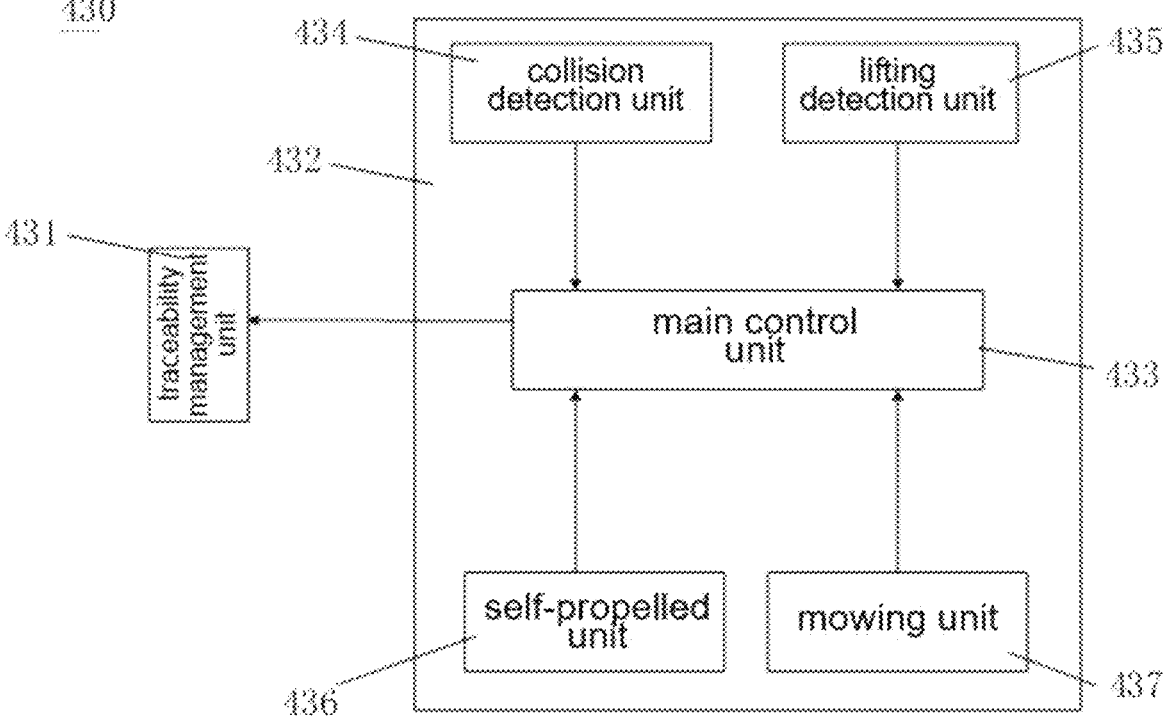
FIG. 52 is a schematic view of the information traceability system in yet another specific embodiment of the disclosure.

Please refer to FIG. 52, which is an information traceability system 430 of another specific embodiment of the disclosure. In this embodiment, the robotic mower 100 is an example of a robotic mower. The information traceability system 430 is applied in the robotic mower to monitor the maintenance and usage of each electrical component in the robotic mower. The information traceability system 430 includes a working module 432 and a traceability management unit 431. The working module 432 includes a main control unit 433 and four working units, the four working units are respectively a collision detection unit 434, a lifting detection unit 435, a self-propelled unit 436 and a mowing unit 437. The main control unit 425 is respectively connected with the collision detection unit 434, the lifting detection unit 435, the self-propelled unit 436 and the mowing unit 437. The main control unit 433 is configured to obtain initial information data of the collision detection unit 434, the lifting detection unit 435, the self-propelled unit 436 and the mowing unit 437, and the main control unit 433 is also configured to record working information data of the collision detection unit 434, the lifting detection unit 435, the self-propelled unit 436 and the mowing unit 437. The traceability management unit 431 is connected with main control unit 433 by signal, is used to receive the initial information data and the working information data of collision detection unit 434, lifting detection unit 435, self-propelled unit 436 and mowing unit 437 delivered by main control unit 433, so as to monitor the running state and maintenance state of the robotic mower.

Figures 53, 54:
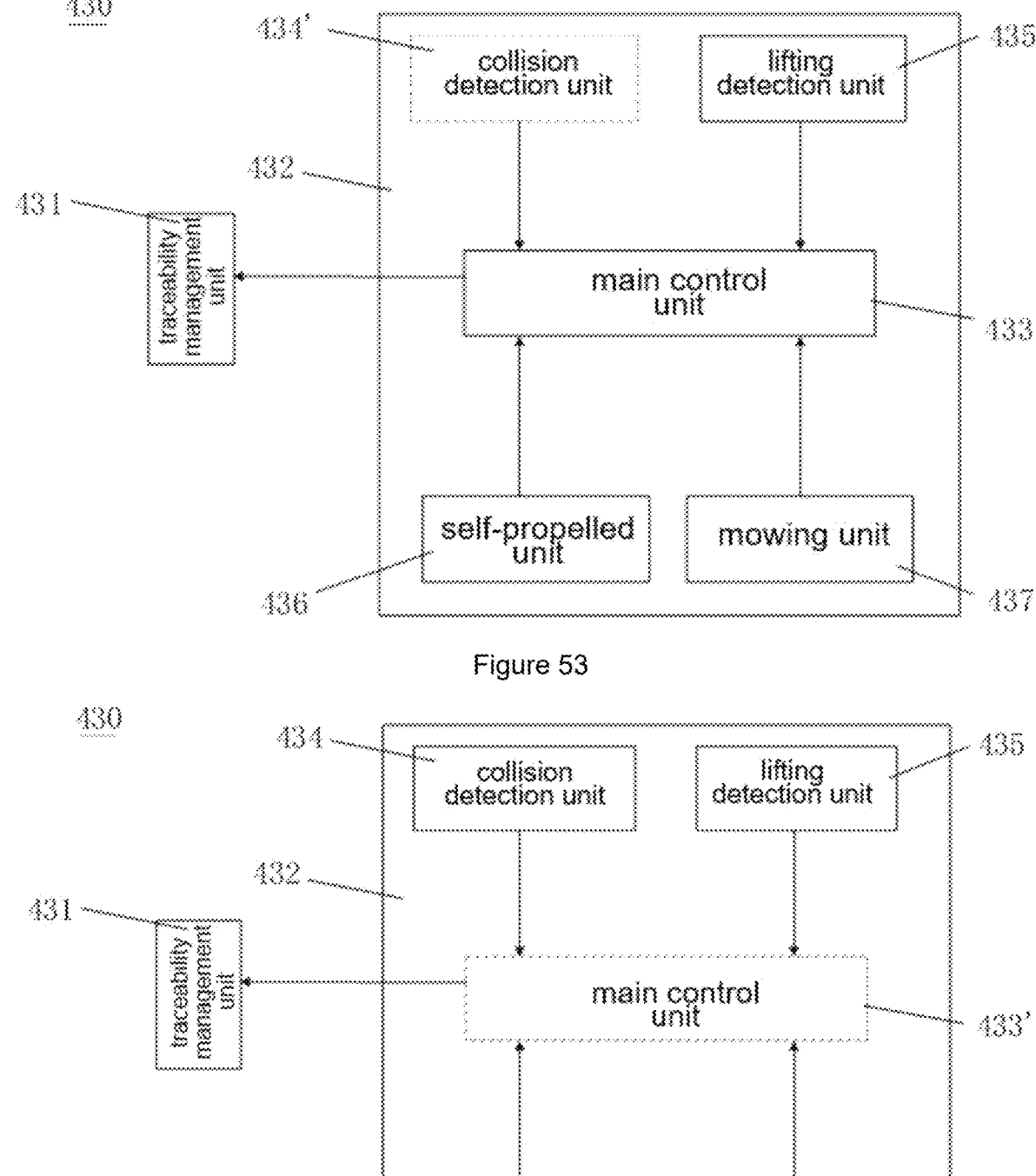
FIG. 53 is a schematic view of the information traceability system after replacing a working unit in yet another specific embodiment of the disclosure.
FIG. 54 is a schematic view of the information traceability system after replacing the main control unit in yet another specific embodiment of the disclosure.

Please refer to FIG. 53. When the collision detection unit 434 is replaced with a collision detection unit 434', the traceability management unit 431 obtains initial information data of the replaced collision detection unit 434' through the main control unit 433, replaces the initial information data of the collision detection unit 434 before the replacement, and records the working information data of the collision detection unit 434' after the replacement to monitor the running state and maintenance state of a repaired robotic mower, so that the running state and maintenance state of a repaired robotic mower may be well monitored, and a quality of after-sales service is improved, which improves the user's experience.

Please refer to FIG. 54. After the main control unit 433 in the working module 432 is replaced by a main control unit 433', the traceability management unit 431 obtains the initial information data of the replaced main control unit 433', replaces the initial information data of the main control unit 433 before the replacement, and records the working information data of the main control unit 433' after the replacement, so as to monitor the running state and maintenance state of the robotic mower after maintenance.

In this embodiment, even after the main control unit 425 is replaced, the traceability management unit 431 can still obtain and record the initial information data and working information data of the collision detection unit 434, the lifting detection unit 435, the self-propelled unit 436 and the mowing unit 437 in the working module 432. And the initial information data and working information data of the main control unit 433' after replacement can be recorded, so that the working state and maintenance state of a repaired robotic mower can be well monitored, and a quality of after-sales service is improved, which improves the user's experience.

Another specific embodiment of the disclosure provides an information traceability system. The information traceability system is applied in the robotic mower 100 to monitor the maintenance and usage of each electrical component in the robotic mower.

In a specific embodiment of the disclosure, the information traceability system includes a traceability management unit and a working module connected with the traceability management unit by signal. Wherein, the traceability management unit evaluates a maintenance and use state of the robotic mower 100 through obtaining initial information data and working information data of each electronic component in the work module, so as to determine the running state of the robotic mower 100. Wherein, the initial information data includes factory code, factory time, factory state, factory information or initial version information. The working information data includes working running data, update version information, update time information or working status information.

It should be noted that the garden device in a specific embodiment of the disclosure includes a housing and a plurality of electronic components housed in the housing. In a specific embodiment of the disclosure, the electronic component is applied in a self-propelled unit, a mowing unit, a power supply unit, a collision detection unit or a lifting unit. For example, the electronic component is at least a power supply component, a control component, a walking component, an anti-collision component, a lifting detection component and a driving detection component housed in the housing. In fact, the electronic component further includes electronic elements in the garden device for enabling the garden device to complete corresponding garden tasks, wherein the electronic component 443 is only exemplary and should not be limited here.

The traceability management unit includes a display part, a signal receiving part connected with the display part, and a data processing part electrically connected with the display part and the signal receiving part respectively. The signal receiving part is connected with the working module by signal to receive maintenance and use state information of the garden device transmitted by the working module, which is further processed by the data processing part and finally displayed by the display part, so that it is convenient for the user/maintainer to determine a running condition of the garden device, and then make statistics on maintenance reasons of the garden device or determine whether the garden device may be maintained/upgraded again.

In one embodiment of the disclosure, the display part is an intelligent display device such as a computer and a mobile phone. In another embodiment of the disclosure, the display part may also be another device for performing image/information display, which means that a specific type of the display part may be selected according to actual needs as long as it ensures that the information can be received and displayed through communicating with the signal receiving part.

The working module includes a main control unit, a working unit, a data acquisition unit, a data storage unit and a communication module. The main control unit is configured to accept/obtain initial information data and working information data of each electronic component in the working unit. The initial information data includes factory code, factory time, factory state, factory information or initial version information. The working information data includes working operation data, update version information, update time information or working state information. In one embodiment of the disclosure, the working module includes the main control unit, the data acquisition unit connected with the main control unit and the communication module. In another embodiment of the disclosure, the communication module may also be arranged outside the working module and not part of the working module.

In some embodiments, the working module further includes the data storage unit. In an embodiment of the disclosure, the data storage unit is electrically connected with the data acquisition unit and the communication module respectively, so as to store the initial information data, working information data of each electronic component and the version information and replacement information of the main control unit acquired by the data acquisition unit.

The main control unit is a core component of the working module to control an operation of the data acquisition unit and the communication module. Further the data acquisition unit is electrically connected with each electronic component to obtain initial information data and/or working information data of each electronic component, respectively. In one embodiment of the disclosure, the initial information data includes at least the factory code, factory information and initial version information of each electronic component, and the version information and replacement information of the main control unit.

Further, when the robotic mower 100 is powered on, the data acquisition unit is further used for obtaining the working information data of each electronic component after being powered on. In a specific embodiment of the disclosure, the working information data includes at least the update version information, the update time information, the working state information of each electronic component, version information after a replacement of the main control unit, and a replacement time and reason of the main control unit.

In one embodiment of the disclosure, the initial information data and the working information data of the same electronic component are matched by a factory code, and the factory code of the same electronic component is unique and unchanged so as to prevent a matching confusion between the initial information data and the working information data of different electronic components.

In one embodiment of the disclosure, when the electronic component in the robotic mower 100 is replaced, the main control unit may control the data acquisition unit to re-collect initial information data of the replaced electronic component. At this time, the traceability management unit may also record the initial information data and the working information data of the electronic component before the replacement so as to record a replacement time and a replacement reason of the electronic component, which is convenient for the user or the maintainer to count and determine the easily damaged electronic component in the robotic mower 100 and corresponding damage reasons.

Further, when the main control unit needs to be replaced, a replaced main control unit may control the data acquisition unit to collect its own version information and replacement information and further carry out a communication matching with the traceability management unit through the communication module to ensure a normal operation of the information traceability system. Similarly, when the main control unit is replaced, the traceability management unit may also record the version information and replacement information of the main control unit before the replacement, so as to facilitate the user or the maintainer to count and judge the damage reasons and a duration life of the main control unit in the robotic mower 100.

In an embodiment of the disclosure, the data acquisition unit further includes a scanning unit and the scanning unit is detachably connected with the data acquisition unit. Further the scanning unit may scan by an information tag attached to each electronic component to obtain the initial information data of each electronic component by a matching of the information tag and the scanning unit. The information tag is a paper/electronic tag containing the initial information data of the electronic component. In the disclosure, the information tag includes at least one of a two-dimensional code, an RFID tag and a bar code tag. It should be noted that a limitation on a type of information tag is only schematic, which is not limited here.

The communication module is used for realizing a communication connection between the traceability management unit and the working module. In one embodiment of the disclosure, the communication module communicates with the signal receiving part to receive the initial information data and the working information data of each electronic component and the version information and the replacement information of the main control unit.

In a specific embodiment of the disclosure, the communication module may be a wired communication module, it may also be a wireless communication module. When the communication module is a wired communication module, the communication module and the signal receiving unit are connected with each other and transmit data through a signal transmission line. Further, when the communication module is a wireless communication module, the wireless communication module may be one or more of a Zig-Bee communication module, a bluetooth communication module, a wireless broadband communication module, an ultra-wide-band communication module and a near field communication module.

In some embodiments, the working module further includes the data storage unit electrically connected with the data acquisition unit and the communication module to store the initial information data and working information data of each electronic component of the data acquisition unit and version information and replacement information of the main control unit, respectively, which further prevent the information/information data obtained by the data acquisition unit from being lost. When the data storage unit is arranged in the working module, the communication module may directly receive various types of the information/information data collected by the data acquisition unit for data transmission, on the other hand, it may also read various types of the information/information data collected by the data acquisition unit stored in the data storage unit and transmit them again.

Please refer to FIG. 55, which is a flowchart of a method for tracing information of the electronic component in a specific embodiment of the disclosure.

The method for tracing information of the electronic component is applied to the robotic mower 100, and includes following operations:

S101: obtaining the initial information data of each electronic component.

Wherein, the initial information data includes factory code, factory time, factory state, factory information or initial version information.

There are many electronic components mounted in the robotic mower 100. Before the robotic mower 100 leaves a factory, the initial information data of the electronic components in the robotic mower 100 are retrospectively monitored through the traceability management unit. For example, each electronic component is provided with a unique and unchanged factory code, and there is a one-to-one correspondence between the electronic components and the factory codes. After the robotic mower 100 is repaired later, the electronic components will be replaced, and the factory codes of the replaced electronic components will also be changed accordingly. In addition, the factory time of each electronic component will also be obtained by the traceability management unit, and different batches of robotic mowers 100 may be identified according to the factory time. The factory state will also be obtained by the traceability management unit, and according to the factory state, it may be identified which quality inspection and adjustments of the robotic mower 100 has been performed before delivery. Similarly, the factory information will also be obtained by the traceability management unit, which can identify a specific production place of the robotic mower 100 and a source of the raw materials. The initial version information is different version information of the robotic mower 100, for example, the same robotic mower 100 will be set with different version information according to different countries and regions where it is sold. In another embodiment of the disclosure, an acquisition of the initial information data of the electronic component may be directly obtained by the traceability management unit, or may be obtained through the main control unit in the working module. In addition, the main control unit may obtain through the data acquisition unit as long as the acquisition of the initial information data of the electronic components is accurate and stable. Of course, the obtained initial information data of the electronic components may be saved through a storage medium, and the storage medium may be arranged in the working module for reading and calling by the traceability management unit, or it may be arranged in the traceability management unit, which is directly managed and used by the traceability management unit to further prevent a loss of initial information data of electronic components.

S102: recording the working information data of each electronic component.

The working information data includes work running data, update version information, update time information or working state information.

When the robotic mower 100 is in the working state, the traceability management unit will also record working state data of each electronic component, such as the specific parameters set during a working process, such as a working temperature and so on. In addition, a software of each electronic component may also be updated and upgraded during use, and the updated time and updated version information are also recorded by the traceability management unit. In addition, the working state of the electronic components will also be recorded, such as an overloading of the electronic components, working in a high temperature and high humidity environment, exceeding a preset threshold, etc. In addition, in a specific embodiment of the disclosure, the traceability management unit may also collect the working information data of each electronic component through the main control unit in the working module. In addition, in a specific embodiment of the disclosure, the main control unit collects the working information data of each electronic component through the data acquisition module and transmits the working information data to the traceability management unit in real time for storage.

In another embodiment of the disclosure, the working information data of the electronic components may be obtained directly by the traceability management unit, or may be obtained through the main control unit in the working module. In addition, the main control unit may obtain through the data acquisition unit as long as the acquisition of the working information data of the electronic components is accurate and stable. Of course, the obtained working information data of the electronic components may be saved through a storage medium, and the storage medium may be arranged in the working module for reading and calling by the traceability management unit, or it may be arranged in the traceability management unit, which is directly managed and used by the traceability management unit to further prevent the loss of initial information data of electronic components.

S103: monitoring the running state and maintenance state of the robotic mower 100 according to the initial information data and the working information data.

The traceability management unit monitors the running state and maintenance state of the robotic mower 100 according to the initial information data and working information data of each electronic component. When the traceability management unit monitors an abnormal operation of electronic components, the robotic mower 100 will definitely have abnormal operation. Even if the robotic mower 100 does not appear to be abnormal, there may be potential risks, so the running state and maintenance state of the robotic mower 100 may be discovered in time through the traceability management of the electronic components by the traceability management unit.

Compared with the conventional art, through the traceability management unit, the traceability management unit is connected with the working module, and the traceability management unit obtains the initial information data and the working information data of each electronic component in the robotic mower 100, so that the running and use state of each electronic component is monitored in real-time, which facilitates a monitoring of the maintenance and upgrade of each electronic component in the robotic mower 100, and improves a practicability of the robotic mower 100 with the information traceability system.

Please refer to FIG. 56, which is a flowchart of a method for tracing the information of the electronic component in another specific embodiment of the disclosure.

The method for tracing information of the electronic component is applied to the robotic mower 100, and includes following operations:

S201: obtaining the initial information data of each electronic component.

Wherein, the initial information data includes factory code, factory time, factory state, factory information or initial version information.

There are many electronic components mounted in the robotic mower 100. Before the robotic mower 100 leaves a factory, the initial information data of the electronic components in the robotic mower 100 are retrospectively monitored through the traceability management unit. For example, each electronic component is provided with a unique and unchanged factory code, and there is a one-to-one correspondence between the electronic components and the factory codes. After the robotic mower 100 is repaired later, the electronic components will be replaced, and the factory codes of the replaced electronic components will also be changed accordingly. In addition, the factory time of each electronic component will also be obtained by the traceability management unit, and different batches of robotic mowers 100 may be identified according to the factory time. The factory state will also be obtained by the traceability management unit, and according to the factory state, it may be identified which quality inspection and adjustments of the robotic mower 100 has been performed before delivery. Similarly, the factory information will also be obtained by the traceability management unit, which can identify the specific production place of the robotic mower 100 and a source of the raw materials. The initial version information is different version information of the robotic mower 100, for example, the same robotic mower 100 will be set with different version information according to different countries and regions where it is sold. In another embodiment of the disclosure, an acquisition of the initial information data of the electronic component may be directly obtained by the traceability management unit, or may be obtained through the main control unit in the working module. In addition, the main control unit may obtain through the data acquisition unit as long as the acquisition of the initial information data of the electronic components is accurate and stable. Of course, the obtained initial information data of the electronic components may be saved through the storage medium, and the storage medium may be arranged in the working module for reading and calling by the traceability management unit, or it may be arranged in the traceability management unit, which is directly managed and used by the traceability management unit to further prevent the loss of initial information data of electronic components.

S202: recording the working information data of each electronic component.

The working information data includes work running data, update version information, update time information or working state information.

When the robotic mower 100 is in the working state, the traceability management unit will also record working state data of each electronic component, such as the specific parameters set during the working process, such as the working temperature and so on. In addition, the software of each electronic component may also be updated and upgraded during use, and the updated time and updated version information are also recorded by the traceability management unit. In addition, the working state of the electronic components will also be recorded, such as the overloading of the electronic components, working in the high temperature and high humidity environment, exceeding the preset threshold, etc. In addition, in a specific embodiment of the disclosure, the traceability management unit may also collect the working information data of each electronic component through the main control unit in the working module. In addition, in a specific embodiment of the disclosure, the main control unit collects the working information data of each electronic component through the data acquisition module and transmits the working information data to the traceability management unit in real time for storage.

In another embodiment of the disclosure, the working information data of the electronic components may be obtained directly by the traceability management unit, or may be obtained through the main control unit in the working module. In addition, the main control unit may obtain through the data acquisition unit as long as the acquisition of the working information data of the electronic components is accurate and stable. Of course, the obtained working information data of the electronic components may be saved through a storage medium, and the storage medium may be arranged in the working module for reading and calling by the traceability management unit, or it may be arranged in the traceability management unit, which is directly managed and used by the traceability management unit to further prevent the loss of initial information data of electronic components.

S203: monitoring the running state and maintenance state of the robotic mower 100 according to the initial information data and the working information data.

The traceability management unit monitors the running state and maintenance state of the robotic mower 100 according to the initial information data and working information data of each electronic component. When the traceability management unit monitors the abnormal operation of electronic components, the robotic mower 100 will definitely have abnormal operation. Even if the robotic mower 100 does not appear to be abnormal, there may be potential risks, so the running state and maintenance state of the robotic mower 100 may be discovered in time through the traceability management of the electronic components by the traceability management unit.

Through an arrangement of the traceability management unit, the traceability management unit is connected with the working module, and the traceability management unit obtains the initial information data and the working information data of each electronic component in the robotic mower 100, so that the running and use state of each electronic component is monitored in real-time, which facilitates the monitoring of the maintenance and upgrade of each electronic component in the robotic mower 100, and improves the practicability of the robotic mower 100 with the information traceability system.

S204: obtaining the initial information data of the electronic component after replacement after the electronic component is replaced, replacing the initial information data of the electronic components before replacement, and recording the working information data of the electronic components after replacement so as to monitor the running state and maintenance state of the robotic mower 100 after maintenance.

When the electronic components in the working module are replaced with electronic components, the traceability management unit obtains the initial information data of the electronic components after replacement, replaces the initial information data of the electronic components before replacement, and records the working information data of the electronic components after replacement so as to monitor the running state and maintenance state of the robotic mower 100 after maintenance.

Generally, when the electronic components are replaced, the information data of the replaced electronic components cannot be continuously monitored and traced, which increases the maintenance difficulty of the robotic mower 100 after maintenance. In this case, through continuing to record and store the initial information data and working information data of the replaced electronic components, the working state and maintenance state of the repaired robotic mower 100 may be well monitored, which improves the quality of after-sales service and the user's experience.

This means that for the robotic mower 100 after maintenance, it is still possible to trace information of the replaced electronic components, understand the working state of the robotic mower 100 and the initial information data of the robotic mower 100 (for example, factory time, factory state, etc.) at any time, and analyze the maintenance state of the robotic mower 100 according to the initial information data. When an abnormality occurs, the traceability management unit may help to compare and analyze the damage reasons and reduce a difficulty of troubleshooting according to the initial information data and working information data, which greatly improves an efficiency of the after-sales service and the user's experience with the product so as to get a better sales market.

Figure 57:
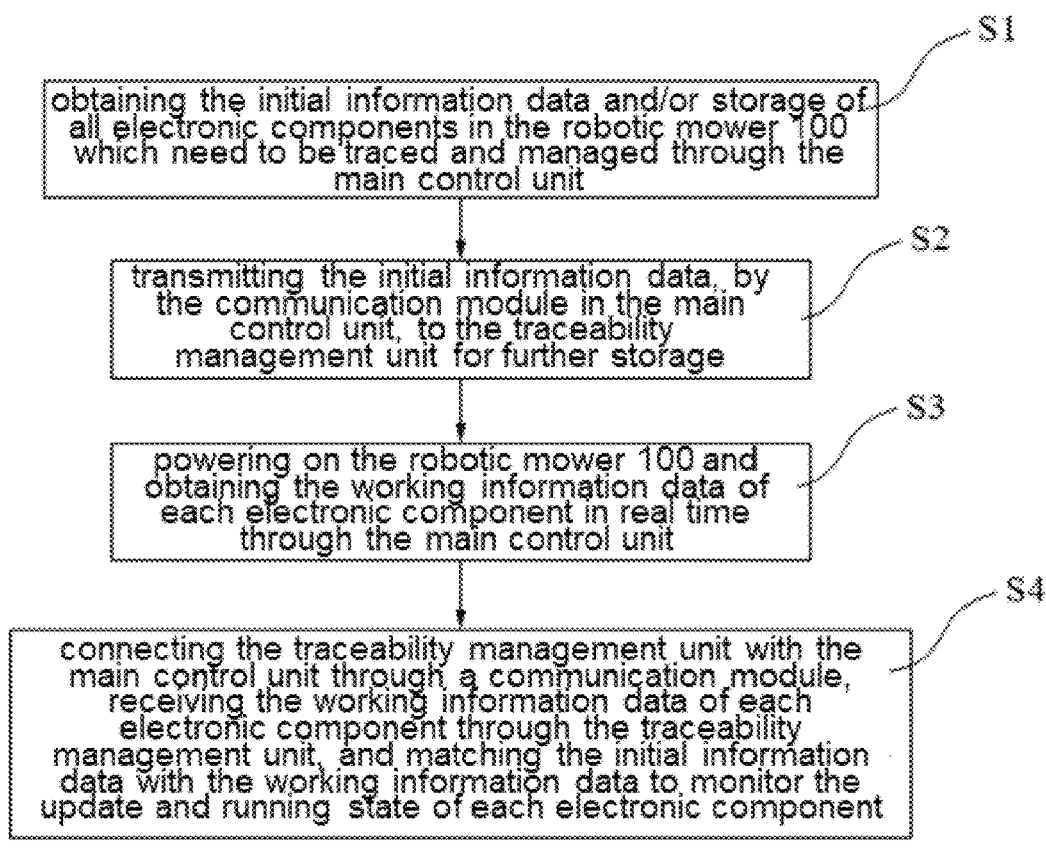
FIG. 57 is a flowchart of a using method for the information traceability system in a specific embodiment of the disclosure.

Please refer to FIG. 57. The disclosure further provides a method of the information traceability system. The using method of the information traceability system mainly includes the following operations:

S1: obtaining the initial information data and/or storage of all electronic components in the robotic mower 100 which need to be traced and managed through the main control unit;

S2: transmitting the initial information data, by the communication module in the main control unit, to the traceability management unit for further storage;

S3: powering on the robotic mower 100 and the main control unit obtaining the working information data of each electronic component in real time, S4: connecting the traceability management unit with the main control unit through a communication module, receiving the working information data of each electronic component through the traceability management unit, and matching the initial information data with the working information data to monitor the update and running state of each electronic component.

S1-S4 are described in detail.

Specifically, in S1, a collection of the initial information data of the electronic component is mainly performed by the data acquisition unit. Further, the data acquisition unit is arranged in the robotic mower 100. And in an embodiment of the disclosure, the data acquisition unit is arranged in one-to-one correspondence with the electronic component. Of course, in other embodiments of the disclosure, one data acquisition unit may also be connected with multiple electronic components respectively, and it is only necessary to ensure that the main control unit collects the information/information data of the electronic components accurately and stably.

In S2, the main control unit transmits the initial information data of each electronic component to the signal receiving part in the traceability management unit through the communication module for reading and storage, which facilitates the traceability management unit to store the information/information data of the electronic component obtained by the data acquisition unit, so as to further prevent the loss of the information/information data of the electronic component.

S3 mainly occurs after the robotic mower 100 is powered on, which means that in the disclosure, the main control unit may control the data acquisition unit to collect the working information data of each electronic component after each electronic component in the robotic mower 100 is powered on, and transmit the working information data to the traceability management unit in real time for storage.

Further, in S4, the traceability management unit is connected with the main control unit through a matching of the module and the signal receiving part. The traceability management unit receives the working information data of each electronic component, and the data processing part in the traceability management unit matches the received and obtained initial information data and working information data of each electronic component to monitor the update and running state of each electronic component.

The electronic component information traceability method may obtain the initial information data and working information data of each electronic component in the robotic mower in real time through arranging the traceability management unit and the main control unit connected with the traceability management unit in the robotic mower 100 by signal. And the running and use state of each electronic component may be monitored in real time through the traceability management unit, which is convenient for monitoring the maintenance and upgrading of each electronic component in the robotic mower 100 and improves the practicality of the robotic mower 100.

Figure 58:
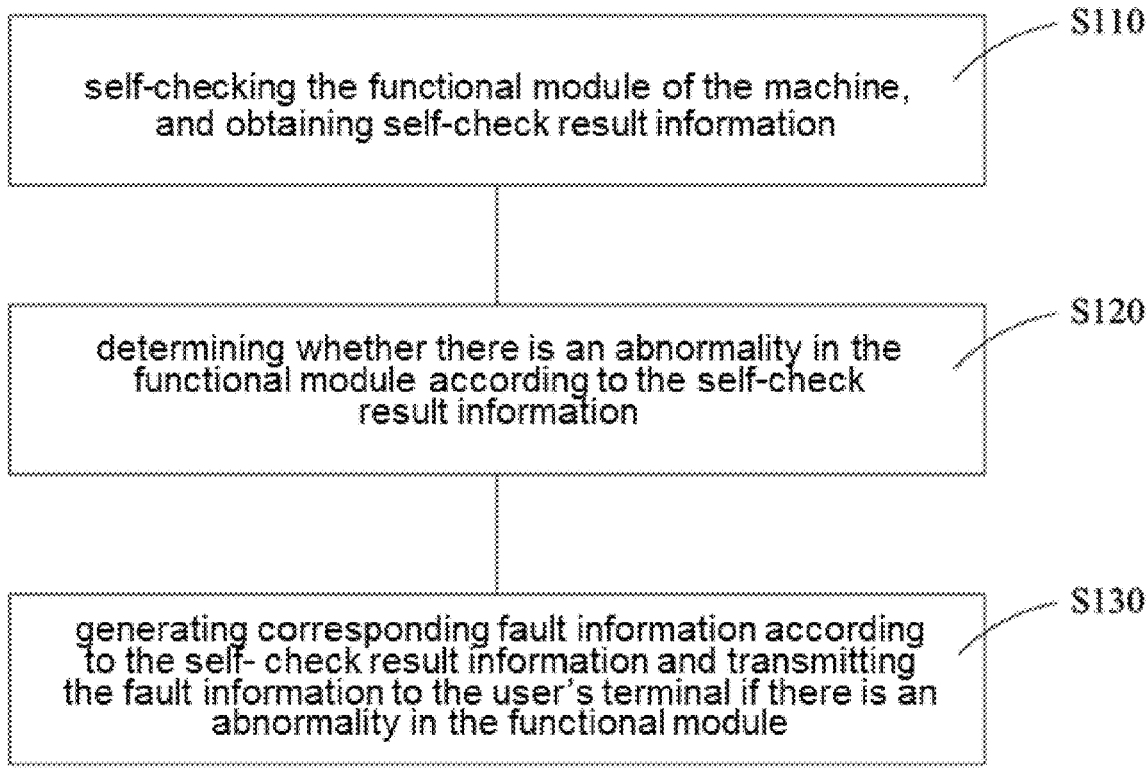
FIG. 58 is a schematic flowchart of a self-check feedback method of a first example of the first embodiment of the disclosure.

Please refer to FIG. 58. The disclosure provides a self-check feedback method, which is used for self-check of functional modules of a machine, so as to discover abnormalities of the functional modules in time, actively push fault information of abnormal functional modules to the user, notify the user to repair in time and not to affect the user's normal use. The machine may be the robotic mower 100 such as a robotic mower, a smart sweeping robot, a riding mower, or the like. The functional modules may be one or more of a collision detection module, a lifting detection module, a power supply module, a driving module, a mowing module, a charging module, and a walking module. Of course, it may be understood that a type and quantity of the functional modules are not limited to the aforementioned functional modules. In practical application, deletion, expansion, etc. may be performed according to actual needs. The self-check feedback method includes following operations:

S110: self-checking the functional module of the machine, and obtaining self-check result information.

S120: determining whether there is an abnormality in the functional module according to the self-check result information.

S130: generating corresponding fault information according to the self-check result information and transmitting the fault information to the user's terminal if there is an abnormality in the functional module.

Further, please refer to FIG. 59, S110 further includes the following operations:

S111: determining whether the machine is powered on.

S112: after turning on the machine and waiting for a preset time T1, self-checking the functional modules of the machine and obtaining self-check result information. A preset time T1 may be set by the user or a manufacturer as required.

Further, please refer to FIG. 60, S120 further includes following operations:

S121: determining whether the functional module is abnormal according to a first self-check result information of the functional module.

S122: if determining that the functional module is abnormal, self-checking the functional module of the machine again, and obtaining a second self-check result information.

S123: determining whether the function module is abnormal according to the second self-check result information.

S124: generating corresponding fault information if the second self-check result information is the same as the first self-check result information.

The fault information usually includes a name of the abnormal functional module and a corresponding fault type. For example, it is assumed that the power supply module is abnormal, it is found that a heat dissipation system of the power module is faulty and cannot effectively dissipate heat for the battery pack after self-check. Then the corresponding fault information may be: the heat dissipation system of the power supply module fails. Here is just an example to illustrate the fault information, not a limitation on the fault information. In practical applications, the fault information may be further specified according to specific situations. For example, it may be clearly pointed out that a heat dissipation fan of the heat dissipation system is damaged, the heat dissipation fan is in poor contact, an air outlet is blocked, and so on. The user's terminal may be a mobile phone, a tablet computer or the like. The user's terminal may be client software. The user registers an account on the client software and associates it with an ID of the machine. The user may repair and maintain the machine according to a reminder of the terminal, thereby avoiding a disadvantage that the conventional machine needs to wait until the user finds that a function is abnormal before realizing that the machine breaks down.

Compared with the conventional art, the self-check feedback method of the disclosure may detect an abnormality of the functional module in time, and actively push the fault information to the user, and notify the user to repair in time.

Please refer to FIG. 61, the disclosure further provides the self-check feedback method of a second embodiment and includes the following operations:

S210: self-checking the functional module of the machine, and obtaining the self-check result information.

S220: determining whether there is an abnormality in the functional module according to the self-check result information.

S230: generating corresponding fault information if there is an abnormality in the functional module.

S240: positioning the machine, obtaining position information of the machine, and selecting a best maintenance point according to the position information.

S250: pushing the fault information and the best maintenance point to the user's terminal.

Further, please refer to FIG. 62, S210 further includes following operations:

S211: setting a self-check time parameter.

S212: self-checking the functional modules of the machine according to the self-check time parameter and obtaining the self-check result information.

The self-check time parameter is a self-check period. It may be set to self-check regularly, for example: self-checking every once in a time T2. The time T2 may be set by the user or the manufacturer as required. It may also be set to self-check according to working hours of the machine, for example: the machine will self-check after every working period T3. The time T3 may be set by the user or the manufacturer as required.

Figure 63:
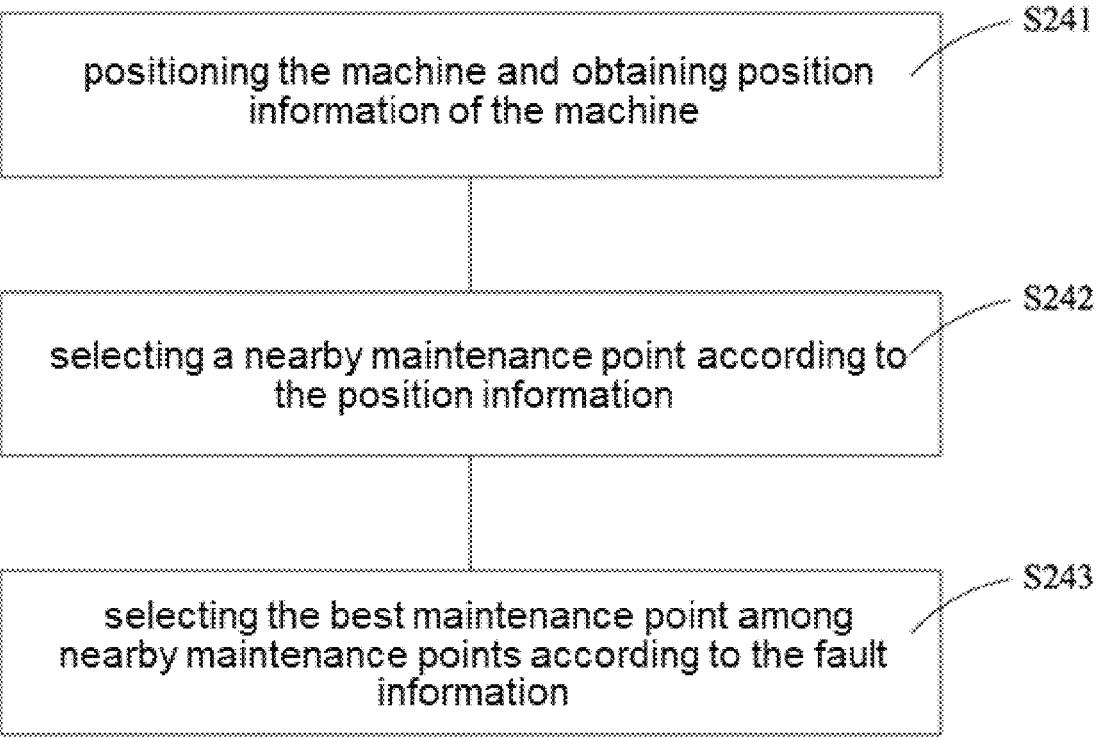
FIG. 63 is a schematic flowchart of S240 of the self-check feedback method shown in FIG. 61.

Further, please refer to FIG. 63, S240 further includes following operations:

S241: positioning the machine and obtaining position information of the machine.

S242: selecting a nearby maintenance point according to the position information.

S243: selecting the best maintenance point among nearby maintenance points according to the fault information.

In practical applications, an after-sales service unit usually arranges several maintenance points, but maintenance capabilities of each maintenance point are usually different. For failures with a high probability of occurrence, such as the walking module, it may be set to be repaired at each maintenance point. While for failures with a low probability of occurrence, it may be set to be repaired at a specific maintenance point for maintenance, such as: control circuit board, battery pack failure. Such an arrangement may reduce a storage pressure of maintenance points for infrequently used parts, thereby reducing operating costs.

Please refer to FIG. 64, the disclosure further provides the self-check feedback method of a third embodiment and includes the following operations:

S310: self-checking the functional module of the machine, and obtaining the self-check result information.

S320: determining whether there is an abnormality in the functional module according to the self-check result information.

S330: generating corresponding fault information if there is an abnormality in the functional module.

S340: classifying the fault information, if the fault information is a first type, then controlling the machine to restart, if the fault information is a second type, skipping to S370.

S350: after the machine is restarted, self-checking the functional modules of the machine again, and obtaining the second self-check result information.

S360: determining whether there are abnormalities in the functional modules of the machine according to the second self-check result information, if there are still abnormalities in the functional modules, then generating corresponding fault information.

S370: pushing the fault information to the user's terminal.

In practical applications, some functional modules will appear abnormal due to interference signals, such as: control chips, sensors, etc. At this time, it only needs to be restarted to initialize these functional modules, and functions of the functional modules may be restored to normal. This arrangement may effectively avoid false reports.

Figure 65:
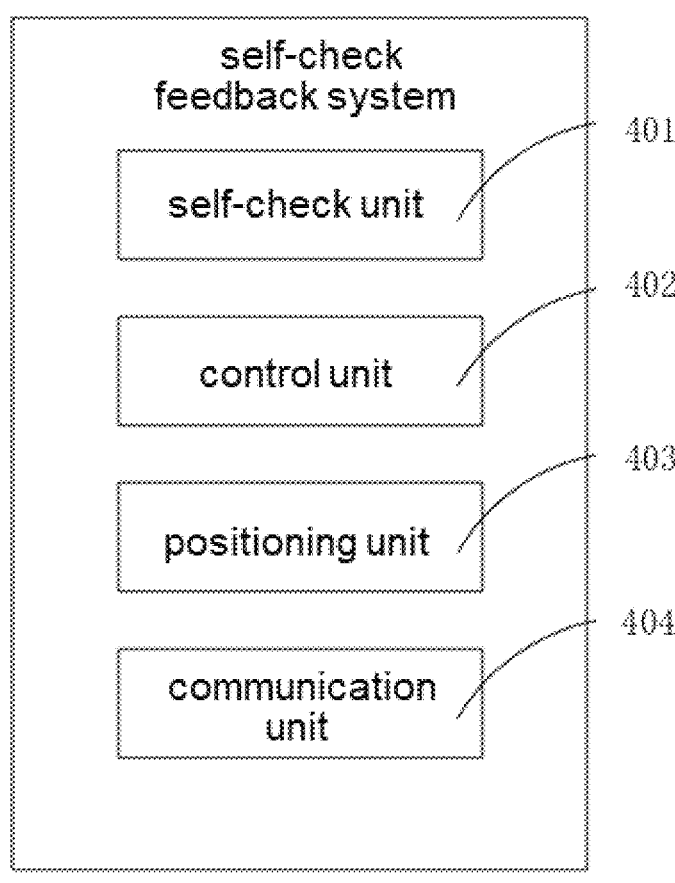
FIG. 65 is a module schematic view of the self-check feedback system of the first example of the first embodiment of the disclosure.

Please refer to FIG. 65. The disclosure further provides a self-check feedback system 400, which is used for self-check of functional modules of the machine, so as to discover abnormalities of the functional modules in time, actively push fault information of abnormal functional modules to the user, notify the user to repair in time and not to affect the user's normal use. The machine may be the robotic mower, the smart sweeping robot, the riding mower, or the like. The functional modules may be one or more of the collision detection module, the lifting detection module, the power supply module, the driving module, the mowing module, the charging module, and the walking module. Of course, it may be understood that the type and quantity of the functional modules are not limited to the aforementioned functional modules. In practical application, deletion, expansion, etc. may be performed according to actual needs. The self-check feedback system 400 includes a self-check unit 401, a control unit 402, a positioning unit 403 and a communication unit 404. The self-check unit 401 is used to self-check the functional modules of the machine, and obtain self-check result information. The self-check unit 401 self-checks the functional modules of the machine according to the self-check time parameter. The self-check time parameter is the self-check period. It may be set to self-check regularly, for example: self-checking every once in a time T2. The time T2 may be set by the user or the manufacturer as required. It may also be set to self-check according to working hours of the machine, for example: the machine will self-check after every working period T3. The time T3 may be set by the user or the manufacturer as required. The control unit 402 determines whether the functional modules of the machine are abnormal according to the self-check result information, if the functional modules are abnormal, corresponding fault information are generated.

When the control unit 402 determines that there is an abnormality in the functional module of the machine, the control unit 402 controls the self-check unit 401 to self-check the functional module again and obtain the second self-check result information. If the control unit 402 still determines that the functional module is abnormal according to the second self-check result information, it generates corresponding fault information.

The positioning unit 403 is used for positioning the machine and obtaining the position information of the machine. The control unit 402 selects the best maintenance point according to the fault information and position information, and pushes the fault information and the best maintenance point to the user's terminal through the communication unit 404.

Figure 66:
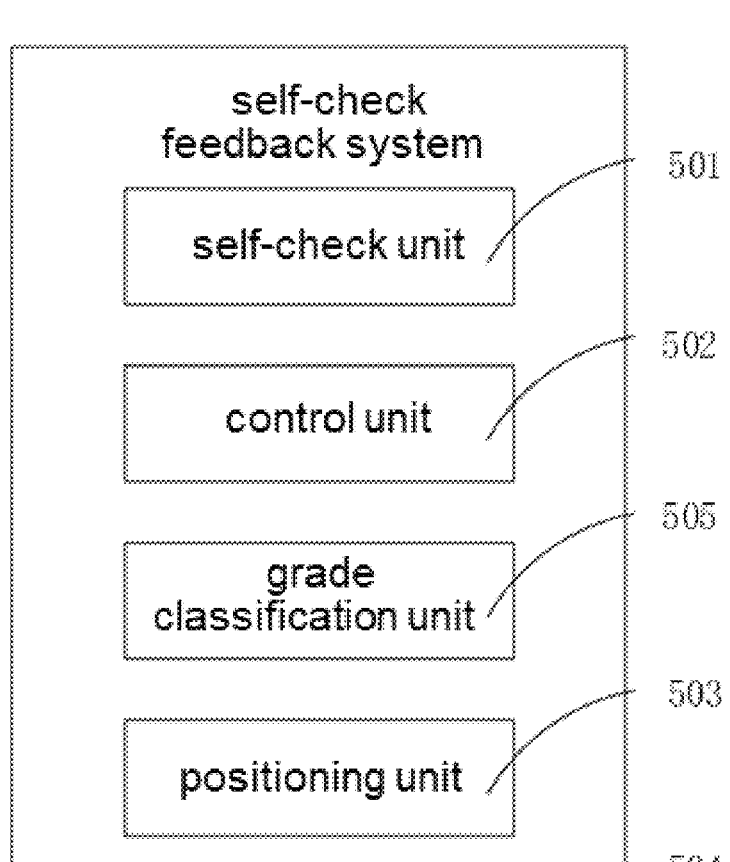
FIG. 66 is a module schematic view of the self-check feedback system of the second example of the first embodiment of the disclosure.

Please refer to FIG. 66. The disclosure further provides a self-check feedback system 500 of the second embodiment, including a self-check unit 501, a control unit 502, a grade classification unit 505, a positioning unit 503 and a communication unit 504. The self-check unit 501 is used to self-check the functional modules of the machine, and obtain the self-check result information. The control unit 502 determines whether the functional modules of the machine are abnormal according to the self-check result information. If there is an abnormality in the functional module, the corresponding fault information will be generated. The grade classification unit 505 classifies the fault information into grades. If the fault information is the first type, the control unit 502 controls the machine to restart. If the fault information is the second type, the control unit 502 controls the communication unit 504 to push the fault information to the user's terminal. A grade classification of the fault information may be classified in advance by the manufacturer according to a probability of occurrence of a fault and a reason of the occurrence. After the machine is restarted, the control unit 502 controls the self-check unit 501 to self-check the functional modules of the machine again and obtain the second self-check result information. If the control unit 502 still determines that the functional module is abnormal according to the second self-check result information, it generates corresponding fault information. The positioning unit 503 is used for positioning the machine and obtaining the position information of the machine. The control unit 502 selects the best maintenance point according to the fault information and the position information, and pushes the fault information and the best maintenance point to the user's terminal through the communication unit 504.

Figure 67:
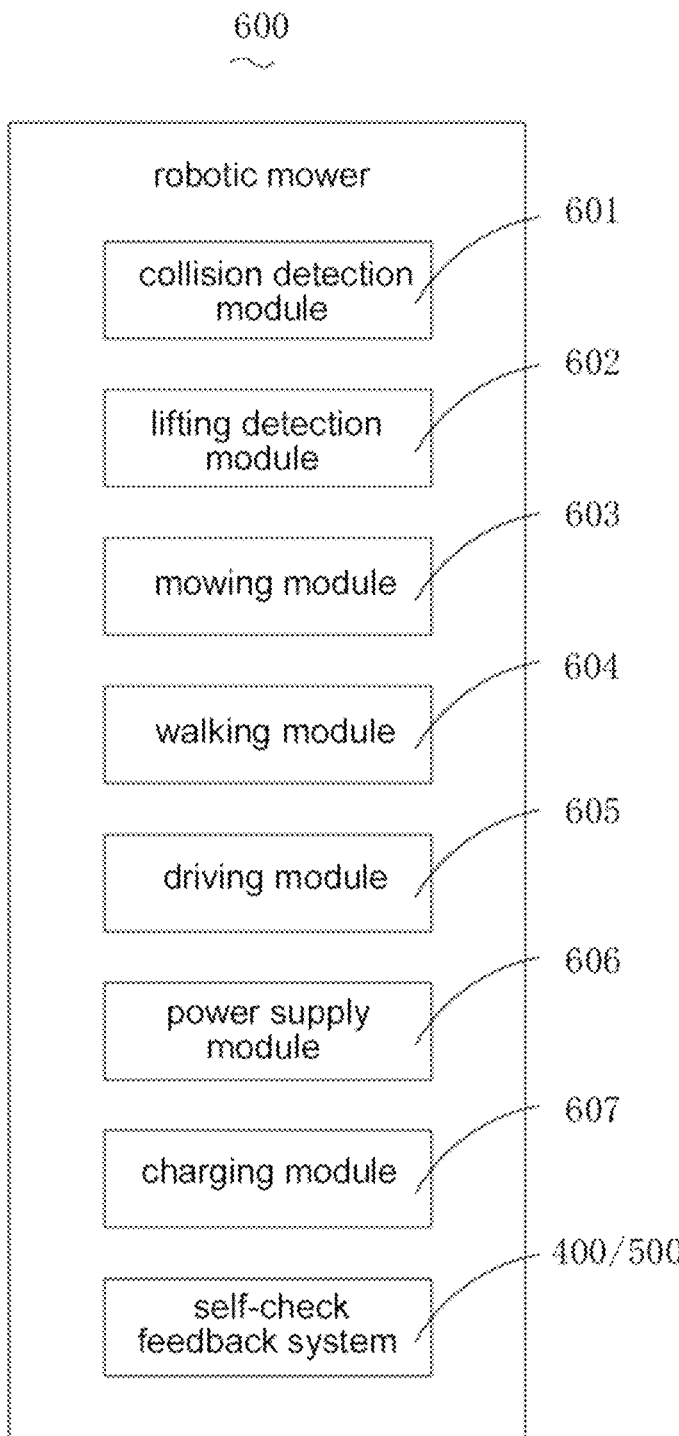
FIG. 67 is a module schematic view of a smart mower according to the disclosure.

Please refer to FIG. 67. The disclosure further provides a robotic mower 600, including a collision detection module 601, a lifting detection module 602, a mowing module 603, a walking module 604, a driving module 605, a power supply module 606, a charging module 607 and the self-check feedback system 400/500. The collision detection module 601 is used to detect whether the robotic mower 600 collides. The lifting detection module 602 is used to detect whether the robotic mower 600 is lifted. The mowing module 603 is used to perform a mowing function of the robotic mower 600. The walking module 604 is used to perform a self-propelling function of the robotic mower 600. The driving module 605 is used to drive the mowing module 603 and the walking module 604 to work. The power supply module 606 is used to supply power for the robotic mower 600. The charging module 607 is used to charge the power supply module 606. The self-check feedback system 400/500 is used to self-check at least one of the collision detection module 601, lifting detection module 602, mowing module 603, walking module 604, driving module 605, power supply module 606, and charging module 607.

Please refer to FIG. 68. The disclosure further provides another self-check feedback method, which is used for self-check of functional modules of the machine, so as to discover abnormalities of the functional modules in time, actively push the fault information of the abnormal functional modules to the user, notify the user to repair in time and not to affect the user's normal use. The machine may be the robotic mower, the smart sweeping robot, the riding mower, or the like. The functional modules may be one or more of the collision detection module, the lifting detection module, the power supply module, the driving module, the mowing module, the charging module, and the walking module. Of course, it may be understood that the type and quantity of the functional modules are not limited to the aforementioned functional modules. In practical application, deletion, expansion, etc. may be performed according to actual needs. The self-check feedback method includes following operations:

S410: self-checking the functional module of the machine, and obtaining the self-check result information.

S420: determining whether there is an abnormality in the functional module according to the self-check result information.

S430: generating corresponding fault information if there is an abnormality in the functional module and pushing the fault information to a server.

S440: pushing the fault information, by the server, to an after-sales terminal and the user's terminal.

Further, please refer to FIG. 69. S410 further includes following operations:

S411: determining whether the machine is powered on.

S412: after turning on the machine and waiting for a preset time T1, self-checking the functional modules of the machine and obtaining self-check result information. The preset time T1 may be set by the user or a manufacturer as required.

Further, please refer to FIG. 70, S420 further includes following operations:

S421: determining whether the functional module is abnormal according to the first self-check result information of the functional module.

S422: if determining that the functional module is abnormal, self-checking the functional module of the machine again, and obtaining the second self-check result information.

S423: determining whether the function module is abnormal according to the second self-check result information.

S424: generating corresponding fault information if the second self-check result information is the same as the first self-check result information.

The fault information usually includes the name of the abnormal functional module and the corresponding fault type. For example, it is assumed that the power supply module is abnormal, it is found that the heat dissipation system of the power module is faulty and cannot effectively dissipate heat for the battery pack after self-check. Then the corresponding fault information may be: the heat dissipation system of the power supply module fails. Here is just an example to illustrate the fault information, not the limitation on the fault information. In practical applications, the fault information may be further specified according to specific situations. For example, it may be clearly pointed out that the heat dissipation fan of the heat dissipation system is damaged, the heat dissipation fan is in poor contact, the air outlet is blocked, and so on. The user's terminal may be the mobile phone, the tablet computer or the like. The user's terminal may be the client software. The user registers the account on the client software and associates it with the ID of the machine. The user may repair and maintain the machine according to a reminder of the terminal, thereby avoiding the disadvantage that the conventional machine needs to wait until the user finds that a function is abnormal before realizing that the machine breaks down.

Compared with the conventional art, the self-check feedback method of the disclosure may detect an abnormality of the functional module in time, and actively push the fault information to the user, and notify the user to repair in time.

Please refer to FIG. 71, the disclosure further provides the self-check feedback method of the second embodiment and includes the following operations:

S510: self-checking the functional module of the machine, and obtaining the self-check result information.

S520: determining whether there is an abnormality in the functional module according to the self-check result information.

S530: generating corresponding fault information if there is an abnormality in the functional module and pushing the fault information to the server.

S540: positioning the machine, obtaining position information of the machine, and pushing the position information to the server.

S550: selecting the maintenance point, by the server, according to the position information and the fault information, pushing the fault information to the after-sales terminal, and pushing the fault information and the maintenance point to the user's terminal.

Further, please refer to FIG. 72, S510 further includes following operations:

S511: setting the self-check time parameter.

S512: self-checking the functional modules of the machine according to the self-check time parameter and obtaining the self-check result information.

The self-check time parameter is a self-check period. It may be set to self-check regularly, for example: self-checking every once in a time T2. The time T2 may be set by the user or the manufacturer as required. It may also be set to self-check according to working hours of the machine, for example: the machine will self-check after every working period T3. The time T3 may be set by the user or the manufacturer as required.

Figure 73:
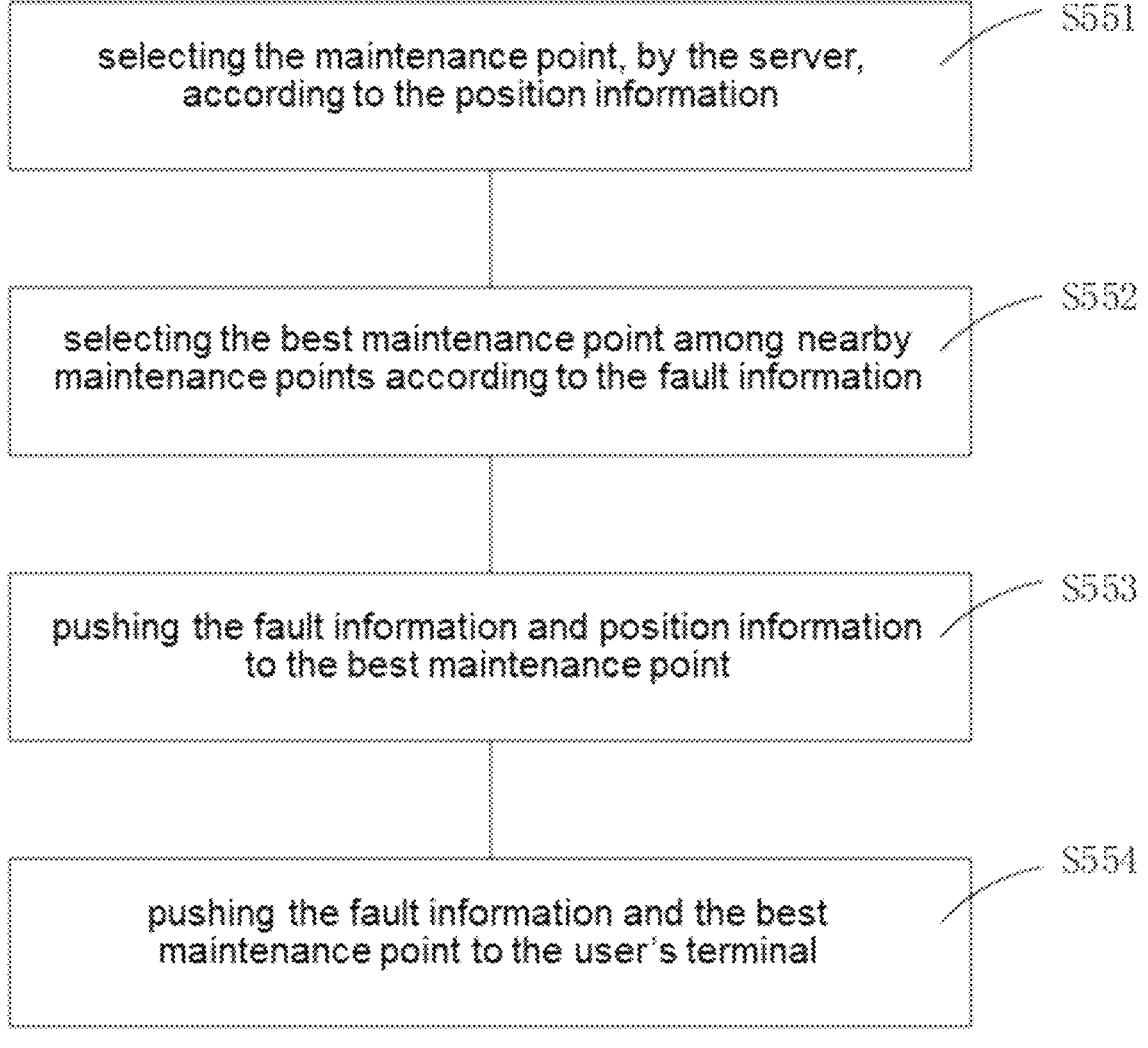
FIG. 73 is a schematic flowchart of S550 of the self-check feedback method shown in FIG. 71.

Further, please refer to FIG. 73, S550 further includes following operations:

S551: selecting the maintenance point, by the server, according to the position information.

S552: selecting the best maintenance point among nearby maintenance points according to the fault information.

S553: pushing the fault information and position information to the best maintenance point.

S554: pushing the fault information and the best maintenance point to the user's terminal.

In practical applications, an after-sales service unit usually arranges several maintenance points, but maintenance capabilities of each maintenance point are usually different. For failures with a high probability of occurrence, such as the walking module, it may be set to be repaired at each maintenance point. While for failures with a low probability of occurrence, it may be set to be repaired at a specific maintenance point for maintenance, such as: control circuit board, battery pack failure. Such an arrangement may reduce a storage pressure of maintenance points for infrequently used parts, thereby reducing operating costs.

Please refer to FIG. 74, the disclosure further provides the self-check feedback method of the third embodiment and includes the following operations:

S610: self-checking the functional module of the machine, and obtaining the self-check result information.

S620: determining whether there is an abnormality in the functional module according to the self-check result information.

S630: generating corresponding fault information if there is an abnormality in the functional module.

S640: classifying the fault information, if the fault information is the first type, then controlling the machine to restart, if the fault information is the second type, skipping to S670.

S650: after the machine is restarted, self-checking the functional modules of the machine again, and obtaining the second self-check result information.

S660: determining whether there are abnormalities in the functional modules of the machine according to the second self-check result information, if there are still abnormalities in the functional modules, then generating the corresponding fault information.

S670: pushing the fault information to the server.

S680: positioning the machine, obtaining position information of the machine, and pushing the position information to the server.

S690: selecting the best maintenance point, by the server, according to the position information, the fault information, and inventory parts information of maintenance points, pushing the fault information to the best maintenance point, and pushing the fault information and the best maintenance point to the user's terminal.

In practical applications, some functional modules will appear abnormal due to interference signals, such as: control chips, sensors, etc. At this time, it only needs to be restarted to initialize these functional modules, and the functions of the functional modules may be restored to normal. This arrangement may effectively avoid false reports.

Further, please refer to FIG. 75. S690 further includes following operations:

S691: generating maintenance part information, by the server, according to the fault information.

S692: selecting the maintenance point, by the server, according to the position information.

S693: obtaining inventory part information of the maintenance point and selecting the best maintenance point, by the server, according to the maintenance part information and the inventory part information.

S694: pushing the fault information and maintenance parts information, by the server, to the best maintenance point.

S695: pushing the fault information and the best maintenance point, by the server, to the user's terminal.

Figure 76:
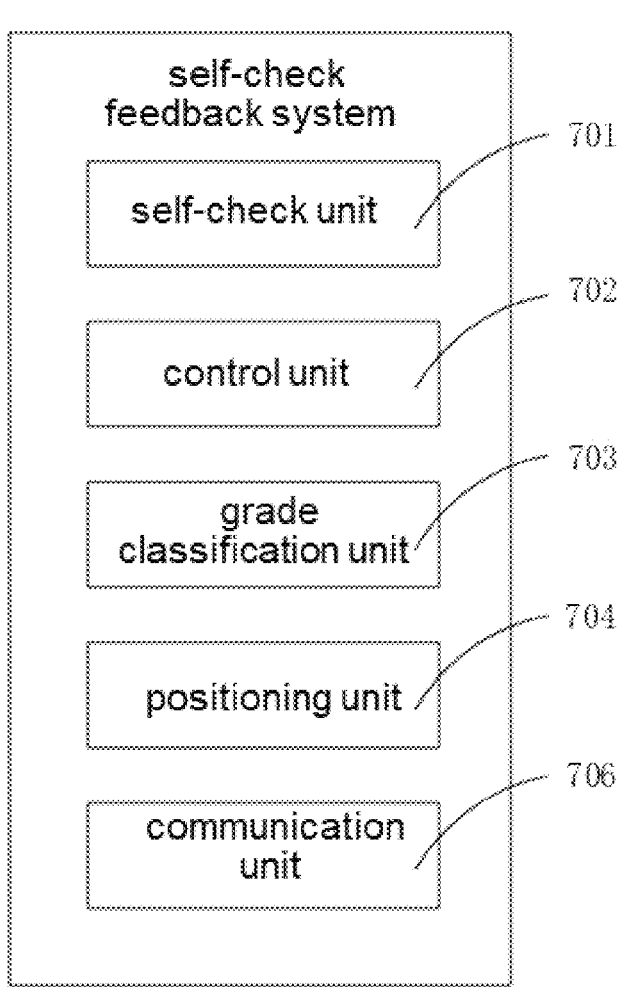
FIG. 76 is a module schematic view of the self-check feedback system according to the second embodiment of the disclosure.

Please refer to FIG. 76. The disclosure further provides a self-check feedback system 700, which is used for self-check of functional modules of the machine, so as to discover abnormalities of the functional modules in time, actively push fault information of abnormal functional modules to the user, notify the user to repair in time and not to affect the user's normal use. The machine may be the robotic mower, the smart sweeping robot, the riding mower, or the like. The functional modules may be one or more of the collision detection module, the lifting detection module, the power supply module, the driving module, the mowing module, the charging module, and the walking module. Of course, it may be understood that the type and quantity of the functional modules are not limited to the aforementioned functional modules. In practical application, deletion, expansion, etc. may be performed according to actual needs. The self-check feedback system 700 includes a self-check unit 701, a control unit 702, a positioning unit 703, a communication unit 704 and a server 706. The self-check unit 701 is used to self-check the functional modules of the machine, and obtain self-check result information. The self-check unit 701 self-checks the functional modules of the machine according to the self-check time parameter. The self-check time parameter is the self-check period. It may be set to self-check regularly, for example: self-checking every once in a time T2. The time T2 may be set by the user or the manufacturer as required. It may also be set to self-check according to working hours of the machine, for example: the machine will self-check after every working period T3. The time T3 may be set by the user or the manufacturer as required. The control unit 702 determines whether the functional modules of the machine are abnormal according to the self-check result information, if the functional modules are abnormal, corresponding fault information are generated.

When the control unit 702 determines that there is an abnormality in the functional module of the machine, the control unit 702 controls the self-check unit 701 to self-check the functional module again and obtain the second self-check result information. If the control unit 702 still determines that the functional module is abnormal according to the second self-check result information, it generates the corresponding fault information.

The positioning unit 703 is used for positioning the machine and obtaining the position information of the machine. The control unit 702 pushes the fault information and position information to the server 706 through the communication unit 704. The server 706 selects the maintenance point according to the position information and the fault information, pushes the fault information to the maintenance point at the after-sales terminal, and pushes the fault information and the maintenance point to the user's terminal.

Please refer to FIG. 77. The disclosure further provides a self-check feedback system 800 of the second embodiment, including a self-check unit 801, a control unit 802, a grade classification unit 805, a positioning unit 803, a communication unit 804 and a server 806. The self-check unit 801 is used to self-check the functional modules of the machine, and obtain the self-check result information. The control unit 802 determines whether the functional modules of the machine are abnormal according to the self-check result information. If there is an abnormality in the functional module, the corresponding fault information will be generated. The grade classification unit 805 classifies the fault information into grades. If the fault information is the first type, the control unit 802 controls the machine to restart. If the fault information is the second type, the control unit 802 controls the communication unit 804 to push the fault information to the server 806. After the machine is restarted, the control unit 802 controls the self-check unit 801 to self-check the functional modules of the machine again and obtain the second self-check result information. If the control unit 802 still determines that the functional module is abnormal according to the second self-check result information, it generates corresponding fault information. The positioning unit 803 is used for positioning the machine and obtaining the position information of the machine. The control unit 802 controls the communication unit 804 to push the position information and fault information to the server 806. The server 806 generates the maintenance part information according to the fault information, and selects a nearby maintenance point according to the position information. Then, the server 806 obtains the inventory part information of the maintenance point, and selects the best maintenance point according to the inventory part information and the maintenance parts information. Finally, the server 806 pushes the fault information and maintenance part information to the best maintenance point, and pushes the fault information and the best maintenance point to the user's terminal.

Figure 78:
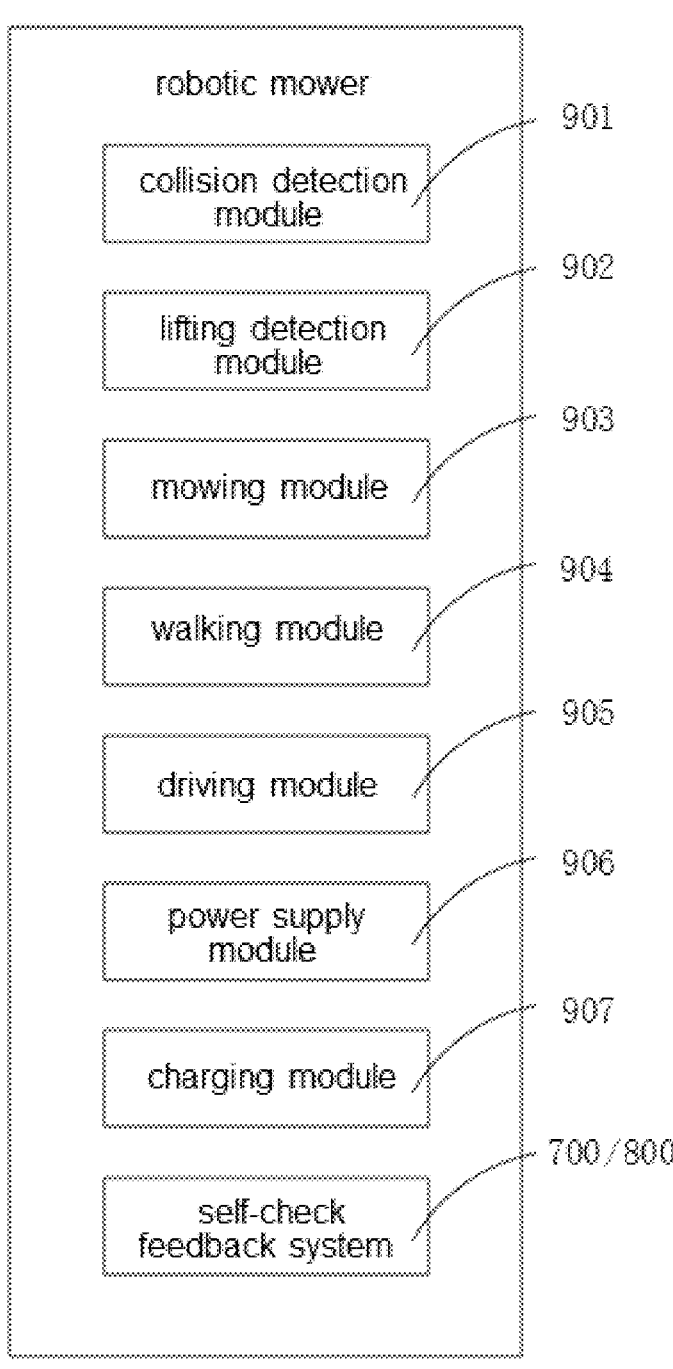
FIG. 78 is a module schematic view of another smart mower of the disclosure.
Figure 79:
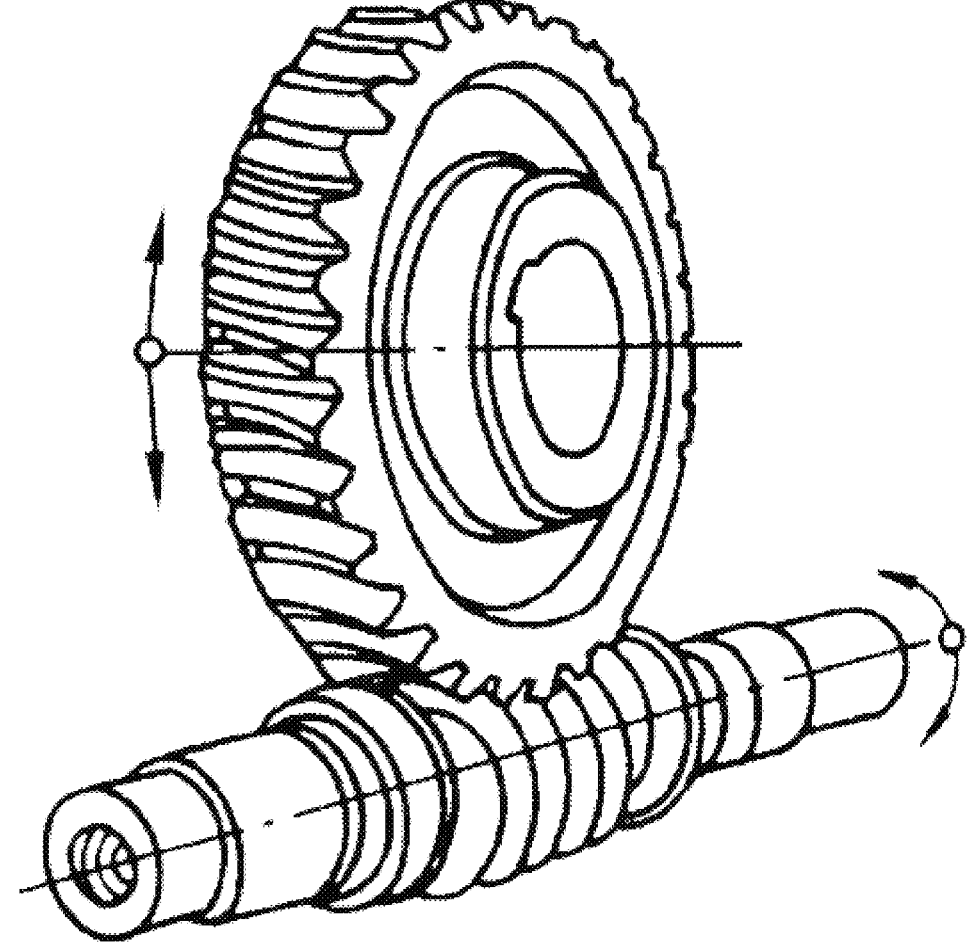
FIG. 79 is a schematic view of a worm and a worm gear.

Please refer to FIG. 78. The disclosure further provides a robotic mower 900, including a collision detection module 901, a lifting detection module 902, a mowing module 903, a walking module 904, a driving module 905, a power supply module 906, a charging module 907 and the self-check feedback system 700/800. The collision detection module 901 is used to detect whether the robotic mower 900 collides. The lifting detection module 902 is used to detect whether the robotic mower 900 is lifted. The mowing module 903 is used to perform the mowing function of the robotic mower 900. The walking module 904 is used to perform the self-propelling function of the robotic mower 900. The driving module 905 is used to drive the mowing module 903 and the walking module 904 to work. The power supply module 906 is used to supply power for the robotic mower 900. The charging module 907 is used to charge the power supply module 906. The self-check feedback system 700/800 is used to self-check at least one of the collision detection module 901, lifting detection module 902, mowing module 903, walking module 904, driving module 905, power supply module 906, and charging module 907.

It should be noted that the self-check feedback system and method of this embodiment may also be used for self-check feedback of each module/unit/device in other embodiments of the disclosure.

The above embodiments are only used to illustrate the technical solutions of the disclosure and not to limit them. Although the disclosure has been described in detail with reference to the preferred embodiments, those of ordinary skill in the art should understand that the technical solutions of the disclosure are capable of being modified or equivalently replaced without departing from the scope of the technical solution of the disclosure.

What is claimed is:

1. A garden tool, comprising:

a tool body, a cutting assembly, being capable of moving along a direction perpendicular to a working plane, a first driving device, comprising a prime mover and a transmission mechanism, the prime mover being fixedly mounted on the tool body, and the transmission mechanism transmitting a power output by the prime mover to the cutting assembly;

a height adjustment assembly, when the height adjustment assembly driving the cutting assembly to move in the direction perpendicular to the working plane, a relative position between the cutting assembly and the prime mover being variable; and an information traceability system, comprising:

a working module, comprising a plurality of electronic components each provided with initial information data, and a traceability management unit, connected with the working module with a signal, configured to record working information data of each electronic component, and obtain the initial information data of each electronic component, wherein, the traceability management unit monitors a running status and a maintenance status of the garden tool according to the initial information data and the working information data.

2. The garden tool according to claim 1, wherein the transmission mechanism comprises a transmission rod and a transmission shaft, the transmission rod is coupled with the prime mover, the transmission shaft is mounted on the transmission rod and is rotatable under a drive of the transmission rod, the transmission shaft is slidable along the transmission rod in an axial direction of the transmission shaft, and the cutting assembly is fixedly mounted on an end of the transmission shaft away from the transmission rod.

3. The garden tool according to claim 2, wherein
the height adjustment assembly comprises a height adjustment rod and a height adjustment knob, the height adjustment rod drives the transmission shaft to slide along the transmission rod, and the height adjustment knob is coupled with the height adjustment rod,
the height adjustment rod is provided with a first driving tooth, the height adjustment knob is provided with a second driving tooth, and the second driving tooth is coupled with the first driving tooth,
when the height adjustment knob is in a first state, the first driving tooth and the second driving tooth are engaged with each other, so that the height adjustment knob drives the height adjustment rod to work,
when the height adjustment knob is in a second state, the first driving tooth and the second driving tooth are out of contact.

4. The garden tool according to claim 3, wherein
the height adjustment knob is slidably mounted on the tool body, and is slidable along an axial direction of the height adjustment rod; when the height adjustment knob is pushed toward the height adjustment rod, the height adjustment knob slides toward the height adjustment rod and resists against the height adjustment rod, so that the first driving tooth and the second driving tooth are engaged with each other, when the height adjustment knob is pushed in a direction away from the height adjustment rod, the first driving tooth and the second driving tooth are disengaged.

5. The garden tool according to claim 2, wherein
the prime mover is provided with an output shaft and an output wheel, the output wheel is mounted on the output shaft, the transmission rod is provided with a transmission wheel, and the transmission wheel is coupled with the output wheel, and the transmission rod is driven to rotate through a coupling of the output wheel and the transmission wheel.

6. The garden tool according to claim 1, further comprising a second driving device and a walking device, wherein
the second driving device is mounted on the tool body, the second driving device comprises a driving shaft and a driving gear arranged on the driving shaft, and
the walking device comprises a driving wheel mounted on the tool body, and the driving wheel is configured to be driven by power output by the second driving device to drive the garden tool to walk,
the driving wheel comprises a hub, and an inner side of the hub is provided with internal teeth,
wherein, a teeth number of the driving gear is less than that of the internal teeth, and the driving gear is directly engaged with the internal teeth to drive the driving wheel to rotate.

7. The garden tool according to claim 6, wherein
the driving gear is coaxially arranged on the driving shaft, and an axis of the driving shaft is parallel to an axis of a rotation shaft of the driving wheel and spaced from each other.

8. The garden tool according to claim 6, wherein
the second driving device comprises a pair of driving motors, each of the driving motors is provided with one driving shaft, each driving shaft is provided with one driving gear, the driving wheel is also provided with a pair and each driving wheel is provided with one internal tooth, so that the driving gears respectively drive the corresponding driving wheels to rotate.

9. The garden tool according to claim 1, further comprising a battery pack system housed in the tool body, wherein
a bottom of the tool body is provided with a battery pack compartment, and the battery pack system is pluggably housed in the battery pack compartment, the battery pack system comprises a first battery pack and a second battery pack connected in parallel with each other, and both the first battery pack and the second battery pack are battery panel packs.

10. The garden tool according to claim 9, wherein
the battery pack compartment comprises a compartment body and a compartment cover, the compartment body is integrated with the tool body, the compartment cover is configured to cover the compartment body from bottom to top, and the first battery pack and the second battery pack are housed in an accommodation space formed by the compartment body and the compartment cover.

11. The garden tool according to claim 10, wherein
a sealing component is further arranged between the compartment body and the compartment cover to seal a gap between the compartment body and the compartment cover.

12. The garden tool according to claim 10, wherein
the compartment cover is movably connected with the compartment body.

13. The garden tool according to claim 1, further comprising a safety key assembly, wherein
the safety key assembly comprises:
a housing, being part of a housing assembly of the tool body,
a magnetic switch, connected with the housing and connected with a second driving device for control,
a connecting assembly, connected with the housing to position a mounting position of the safety key assembly, and
a key structure, comprising a twist handle and a plug-in part connected with a first end of the twist handle,
wherein, the plug-in part is provided with two ends, a first end of the plug-in part is connected with the twist handle, and a second end of the plug-in part is provided with a locking member and an unlocking member, the locking member is configured to disassemble or fasten the connecting assembly, the locking member is located at an end of the plug-in part along an insertion direction of the plug-in part and the garden tool, the unlocking member and the locking member are arranged in a front and rear misalignment, and the plug-in part is capable of being inserted into the housing and trigger the magnetic switch through the unlocking member.

14. The garden tool according to claim 13, wherein
the connecting assembly comprises a connecting base and a locking component, the locking component is threadedly coupled with the connecting base, the locking component is provided with a locking structure, and the locking component is provided with a groove or a protrusion corresponding to the locking structure.

15. The garden tool according to claim 13, wherein
the plug-in part is provided with an accommodation part, the unlocking member is housed in the accommodation part, and an extending direction of the unlocking member is perpendicular to an extending direction of the plug-in part.

16. The garden tool according to claim 13, wherein the unlocking member is a magnetic unlocking member, and an N pole and an S pole of the magnetic unlocking member are respectively located on both sides of the extending direction of the unlocking member.

17. The garden tool according to claim 13, wherein the twist handle is configured to drive the plug-in part to switch between a starting position and a shut-off position, a blocking plate is arranged between the twist handle and the plug-in part, and the blocking plate is capable of resisting against an edge of the housing.

18. The garden tool according to claim 1, further comprising a self-check feedback system, wherein the self-check feedback system comprises:

a self-check unit, configured to perform a self-check on a functional module of the garden tool and obtain self-check result information, a control unit, determining whether the functional module of the garden tool is abnormal according to the self-check result information, if the functional module being abnormal, then generating corresponding fault information, and a communication unit, sending the fault information to a user terminal.

\* \* \* \* \*